US012529468B2

(12) United States Patent
Jang et al.

(10) Patent No.: US 12,529,468 B2
(45) Date of Patent: Jan. 20, 2026

(54) DOORS FOR HOME APPLIANCE AND HOME APPLIANCE INCLUDING THE SAME

(71) Applicant: LG ELECTRONICS INC., Seoul (KR)

(72) Inventors: Jaebong Jang, Seoul (KR); Jinseok Choi, Seoul (KR); DongWoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/816,093

(22) Filed: Aug. 27, 2024

(65) Prior Publication Data

US 2025/0075886 A1 Mar. 6, 2025

(30) Foreign Application Priority Data

Aug. 29, 2023 (KR) .......................... 10-2023-0113787

(51) Int. Cl.
| | | |
|---|---|---|
| F21V 17/16 | (2006.01) | |
| F21V 3/04 | (2018.01) | |
| F21V 19/00 | (2006.01) | |
| F21V 19/02 | (2006.01) | |
| F24C 15/00 | (2006.01) | |
| F24C 15/04 | (2006.01) | |
| F21Y 113/00 | (2016.01) | |
| F21Y 115/10 | (2016.01) | |

(52) U.S. Cl.
CPC ............ *F21V 17/164* (2013.01); *F21V 3/049* (2013.01); *F21V 19/003* (2013.01); *F21V 19/02* (2013.01); *F24C 15/008* (2013.01); *F24C 15/04* (2013.01); *F21Y 2113/00* (2013.01); *F21Y 2115/10* (2016.08)

(58) Field of Classification Search
CPC ...... F21V 17/164; F21V 3/049; F21V 19/003; F21V 19/02; F24C 15/008; F24C 15/04; F21Y 2115/10; F21Y 2113/00
See application file for complete search history.

(56) References Cited

U.S. PATENT DOCUMENTS 7,252,402 B2 * 8/2007 Gotz .................... F24C 15/008
                                                                                         362/89

8,138,459 B2     3/2012 Beausse
(Continued)

FOREIGN PATENT DOCUMENTS

| CN | 109477641 A | 3/2019 |
|---|---|---|
| DE | 833849 C | 3/1952 |

(Continued)

OTHER PUBLICATIONS

Extended European Search Report in European Appln. No. 24196878.3, mailed on Jan. 27, 2025, 9 pages.

*Primary Examiner* — Bao Q Truong
(74) *Attorney, Agent, or Firm* — Fish & Richardson P.C.

(57) ABSTRACT

A door for a home appliance includes a door body disposed in front of a storage space of the home appliance. A lighting device may be disposed at the door body. The lighting device includes a lighting housing with an installation space provided therein, a light source emitting light to the storage space, and a cover plate transmitting light from the light source. Since the lighting device is installed in the door, the lighting device is less affected by the internal environment of the home appliance, and the durability of the lighting device may be improved.

20 Claims, 46 Drawing Sheets

(56) References Cited

U.S. PATENT DOCUMENTS

| | | | |
|---|---|---|---|
| 11,353,219 B2 | 6/2022 | Iwamoto et al. | |
| 11,391,466 B2 * | 7/2022 | Wild | H04N 23/51 |
| 2006/0266347 A1 * | 11/2006 | Gramlich | F24C 15/008 126/39 BA |
| 2010/0139638 A1 * | 6/2010 | Hargrave | F24C 15/008 362/94 |

FOREIGN PATENT DOCUMENTS

| | | | |
|---|---|---|---|
| DE | 202021105944 U1 | 2/2022 | |
| FR | 2474654 A1 * | 7/1981 | F24C 15/04 |

\* cited by examiner

DOORS FOR HOME APPLIANCE AND HOME APPLIANCE INCLUDING THE SAME

CROSS REFERENCE TO RELATED APPLICATIONS

The present application claims priority to Korean Patent Application No. 10-2023-0113787, filed on Aug. 29, 2023, the entire contents of which are incorporated herein for all purposes by reference.

TECHNICAL FIELD

The present disclosure relates to a door for a home appliance.

BACKGROUND

Home appliances may store target objects therein and include doors. For example, home appliances include a cooking appliance, a refrigerator, a clothing treating apparatus, etc. Some home appliances may include storage spaces to store target objects in cabinets creating the external appearance thereof, and doors to open and close the storage spaces. In some cases, a home appliance may include two or more storage spaces and two or more doors opening and closing respective storage spaces.

In some cases, where a door of the home appliance is opaque, when the door closes the corresponding storage space, it is difficult for a user to check a target object stored in the storage space. The door may be opened to check the target object stored in the storage space in the home appliance equipped with the doors.

In some cases of a home appliance such as a refrigerator, an oven, and a clothes dryer, when the door is opened, heated air or cooled air in the home appliance may be discharged outward, thereby causing energy loss. Furthermore, in the case of a home appliance such as a washing machine, when the door is opened, washing water may spill outward. Therefore, the door of the washing machine during a washing operation may remain locked so that the door is prevented from being opened accidentally during the washing operation.

In some cases, the door of some home appliances such as the cooking appliance, the washing machine, the dryer machine, etc. may include a window mounted to the door. When the window is mounted to the door, the state of the target object in the home appliance may be checked through the window. In some cases, even when the window is mounted to the door of the home appliance, it is difficult to properly check a state of the target object when the environment of the home appliance is dark or at night.

Accordingly, recently, technology has been applied to install a lighting device in the home appliance to illuminate a storage space where the target object is stored. Even when the door is closed, the camera may capture the inside part of the storage space to provide the captured image to the user. However, the cooking appliance among the home appliances has a high temperature environment in the storage space, and the washing machine or the dryer machine has an environment with high humidity in the storage space, so the lighting device thereof may be easily damaged.

Meanwhile, a lighting device may include a lighting cover covering a light source such as an LED, protecting the light source, and diffusing light from the light source evenly. The lighting cover may be formed as a separate object made of a transparent material and then assembled with the lighting device.

To prevent the lighting cover from being separated from the lighting device, a separate fastener such as a screw should be used, thereby increasing the number of parts and the number of labor hours. Of course, the lighting cover may be assembled using a locking step structure or a stationary fit structure without a screw. However, in this case, a coupling force for mounting the lighting cover increases, and thus the assemblability of the lighting cover is reduced, which is a problem.

In addition, when the lighting device includes a plurality of light sources, light emitted from the plurality of light sources may overlap in a predetermined region. The light overlapping as described above may only partially brighten the internal part of the storage space to reduce the lighting quality. This problem may be removed by diffusing light from the light source with a lighting cover formed of a translucent material such as an etching glass. However, the cover of a translucent material such as an etching glass, etc. has a problem reducing the overall light source illuminance.

SUMMARY

Accordingly, the present disclosure has been made keeping in mind the above problems occurring in the related art, and an objective of the present disclosure is to dispose a lighting device in a door where temperature and humidity conditions are better than a storage space of a home appliance to increase illuminance of the storage space.

Another objective of the present disclosure is to cover a light source of a lighting device with a cover plate, and allow the cover plate to be easily mounted even without a separate fastener and to maintain a stable mounted state thereof.

Yet another objective of the present disclosure is to prevent excessively high illuminance in a light-overlapping portion even with a plurality of light sources and to secure sufficiently high light amount with the plurality of light sources.

Still another objective of the present disclosure is to uniformize the illuminance in a storage space by efficiently disposing a lighting device in a door.

According to the features of the present disclosure to achieve the above-described objectives, a door for a home appliance of the present disclosure may include a door body disposed in front of a storage space of a home appliance, and a lighting device disposed at the door body. The lighting device may include a lighting housing with an installation space provided therein, a light source emitting light to the storage space, and a cover plate transmitting light from the light source. As described above, the lighting device is installed at the door body, not a main body of the home appliance. Specifically, the lighting device is surrounded by the lighting housing and the cover plate, so the lighting device is less affected by an internal environment of the home appliance, and durability of the lighting device may be improved.

Furthermore, the door body is disposed in front of the storage space and includes a door frame in which a through part is provided at a central portion thereof. A door panel including a plurality of panels may be coupled to the door frame. A lighting device may be disposed between the plurality of panels. Since the lighting device is installed in the door, the lighting device is less affected by the internal environment of the home appliance, and the durability of the lighting device may be improved. Furthermore, in the present disclosure, the lighting device is disposed in the door facing the storage space, so it is easy to illuminate the entire part in the storage space using the lighting device.

In addition, the lighting housing may include a first housing in which the light source is disposed, and a second housing in which the cover plate is disposed. At this point, the second housing may include a cover stopper supporting a first end portion of the cover plate, and the first housing may include a cover support arm supporting a second end portion of the cover plate opposite to the first end portion. As described above, when the two housings are assembled with each other, the two housings support the opposite ends of the cover plate respectively. Therefore, while the cover plate is temporarily fixed to the second housing first, the two housings are assembled with each other, and the cover plate may be naturally assembled.

Furthermore, the cover support arm may protrude from a surface of the first housing toward a surface of the second housing. Therefore, the cover support arm may support the end portion of the cover plate with assembly of the two housings.

In addition, the second housing may include a pair of cover holding parts supporting opposite side surfaces of the cover plate. The pair of cover holding parts may allow sliding-type assembly of the cover plate.

Furthermore, the cover holding parts may simultaneously support two different surfaces of the cover plate. Accordingly, the cover plate may not be separated in a direction toward the first housing.

In addition, the cover plate may be coupled to the pair of cover holding parts while sliding between the pair of cover holding parts. Accordingly, the cover plate may be easily assembled.

Furthermore, a temporary assembly step supporting the second end portion of the cover plate may protrude from the second housing, and a protruding length of the temporary assembly step may be less than a protruding length of the cover stopper. The temporary assembly step may temporarily assemble the cover plate before the cover support arm completely locks and supports the second end portion of the cover plate. Therefore, the cover plate may be easily assembled, and assembly stability thereof may remain high after assembling.

In addition, the cover support arm may be disposed at a position farther from the second end portion of the cover plate than the temporary assembly step. Accordingly, the cover plate may be supported doubly.

Furthermore, the first end portion of the cover plate may pass through the temporary assembly step, slide between the cover holding parts, and then be supported by the cover stopper.

In addition, a length between the first end portion and the second end portion of the cover plate may be shorter than a length between the cover stopper and the temporary assembly step. Accordingly, high fastening force does not occur when the cover plate is assembled, and assemblability may be improved.

Furthermore, the first housing may include a lighting mounting part to which the lighting device is mounted, and the lighting mounting part may include a lighting holding hook locking and fixing one end of a lighting substrate in which the light source is embedded. Accordingly, the lighting substrate may be easily fixed to the second housing.

In addition, the lighting mounting part may include a lighting angle adjusting part on which the lighting substrate is seated, and the lighting angle adjusting part may support the lighting substrate in an inclined direction. The lighting angle adjusting part may preset a light emitted angle of the lighting substrate and the light source.

Furthermore, the lighting device may include a plurality of lighting parts, and the plurality of lighting parts may emit light in different directions. Accordingly, the lighting device may illuminate the wide space evenly in the storage space.

In addition, the lighting device may include the plurality of lighting parts, and light emitted from the plurality of lighting parts may overlap at a central portion of the storage space. When light overlap at the central portion where a stored object is located, the stored object may become brighter, and use convenience and aesthetic feeling of the home appliance may be improved.

Furthermore, the lighting device may include a plurality of lighting parts, and a plurality of cover plates respectively provided in the plurality of lighting parts may be disposed to be directed in different directions. The cover plates in the different directions may expand a light diffusion direction wider.

Furthermore, a first cover plate of the plurality of cover plates may be provided at an angle rotated by a predetermined angle based on a shaft extending in a vertical direction that is a height direction of the door body with respect to a direction toward a front surface of a main body of the home appliance. In addition, a second cover plate of the plurality of cover plates may be provided at an angle rotated by a predetermined angle based on a shaft extending in a transverse direction that is a longitudinal direction of the lighting device with respect to a direction toward the front surface of the main body of the home appliance.

Furthermore, the lighting device may include a plurality of lighting parts, and an image sensing device capturing an image of the storage space may be disposed between the plurality of lighting parts. The image sensing device may capture the internal part of the storage space with illuminance improved by the lighting device to provide a clear image.

In addition, the plurality of lighting parts may be disposed at the same heights in the door, and the plurality of lighting parts may emit light at different vertical inclination angle. Accordingly, the plurality of lighting parts may emit light evenly to an upper portion and a lower portion of the storage space.

Furthermore, the light source and the cover plate may be disposed to be directed in different directions. The cover plate may diffuse light from the light source in a direction different from the light emission angle of the light source.

In addition, the cover plate may be disposed in the installation space, and a part of the cover plate may be exposed outward of the installation space through a cover hole open in the lighting housing.

Furthermore, a first surface of the cover plate facing an external part of the lighting housing and a second surface located opposite to the first surface and facing the light source may have different roughness from each other. Accordingly, light emitted from the light source may be diffused, and an excessively bright area may not occur.

In addition, a roughness of the first surface may be higher than a roughness of the second surface. Then, reduction of a light amount of the light source may be minimized and light may be diffused.

Furthermore, the second housing may include an inclined lighting guide surface that is provided at either portion of the cover hole with the cover hole as a center. The lighting guide surface may reflect light from the light source and guide a direction in which the light is emitted.

As described above, the doors of a home appliance and the home appliance including the same according to the present disclosure have the following effects.

In the present disclosure, the lighting device may be disposed in the door, not at the main body of the home appliance. The illuminance of the storage space can be obtained with the lighting device disposed in the door where the temperature and humidity are better than the storage space of the home appliance as described above, so the durability of the lighting device can be improved.

Furthermore, in the present disclosure, the lighting device is disposed in the door facing the storage space, so it is advantageous to preset an emission angle to illuminate the entire part in the storage space using the lighting device.

In addition, in the present disclosure, the cover plate covering the light source may be disposed between the two housings (the first housing and the second housing). At this point, while the first end portion of the cover plate is fixed to the second housing, the two housings are assembled with each other, and thus the second end portion of the cover plate may be supported by the first housing. When the two housings are assembled with each other, the two housings support the opposite end portions of the cover plate respectively. Therefore, while the cover plate is temporarily fixed to the second housing first, the two housings are assembled with each other, so that a secondary assembly of the cover plate may be naturally performed. As described above, the cover plate does not need to be completely assembled with either housing, so the assemblability of the cover plate is excellent, which is an advantage.

Moreover, in the present disclosure, the plurality of structures may support and fix the cover plate. Therefore, even though a separate fastener is not used, the lighting device can be firmly mounted in the door, so the number of parts and the number of labor hours of the assembly thereof can be reduced.

Furthermore, in the present disclosure, the plurality of lighting parts may emit light in different directions. Accordingly, the plurality of lighting parts may emit light to a wide area evenly and light up the storage space.

In addition, in the present disclosure, the angle adjusting part provided at the first housing may allow a mounting angle of a light source substrate to be preset in an inclined direction. Therefore, the fabricator does not need to perform separate work to adjust an angle of the light source, and assembly of the lighting device can be easily performed.

Furthermore, in the present disclosure, the cover support arm supporting the second end portion of the cover plate may be disposed at a position farther from the second end portion of the cover plate than the temporary assembly step. Then, the temporary assembly step of the second housing and the cover support end of the first housing may support doubly the second end portion of the cover plate. Therefore, mounting stability of the cover plate can remain high, which is an effect.

At this point, the cover support arm can support the second end portion of the cover plate, so it is safe to lower the height of the temporary assembly step. The temporary assembly step of a lower height may improve resistance (fastening force) when the cover plate is assembled, so the assemblability can be improved.

In the present disclosure, the doors of a home appliance may be equipped with the image sensing device and the lighting device, so an image of the storage space may be captured while the illuminance of the storage space is increased. The user can obtain a clearer image of a target object stored in the storage space, so the use convenience and the product quality of the home appliance can be improved.

DETAILED DESCRIPTION

Figure 1:
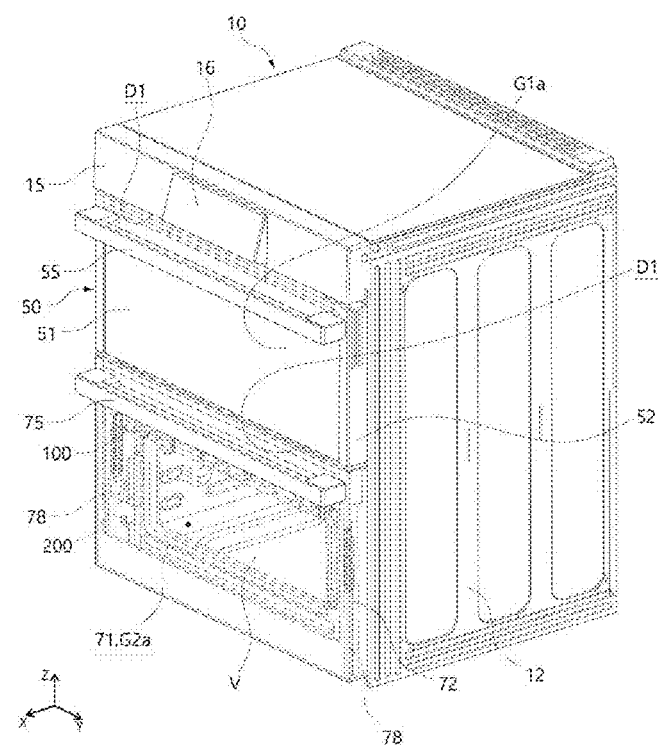
FIG. 1 is a perspective view illustrating an example of a home appliance according to the present disclosure.

Hereinafter, one or more implementations of the present disclosure will be described in detail with reference to the illustrative drawings. Wherever possible, the same reference numerals will be used throughout the drawings and the description to refer to the same or like elements or parts. Furthermore, it is to be noted that, when the detailed description of the functions and configuration of elements related to the present disclosure may make the gist of the present disclosure unclear, a detailed description of those elements will be omitted.

The present disclosure relates to one or more DOOR FOR an appliance, e.g., a home appliance. For example, the home appliance may include storage spaces therein. The doors may be disposed at the front side of the storage spaces to open and close the storage spaces. Herein, the front side may be a direction toward a user when the user is located in front of the home appliance. Referring to FIG. 1, an X-axial direction may be a forward direction. A Y-axial direction may be a width direction of a door 50, 70. A Z-axial direction may be a height direction of the door 50, 70. Hereinbelow, the present disclosure will be described based on the directions.

The home appliance may be applied to the door 50, 70 of a home appliance such as a cooking appliance, a refrigerator, a freezer, a kimchi refrigerator, a plant cultivating apparatus, Styler®, a washing machine, etc., and also be applied to doors of furniture or an entrance door.

In some implementations, the doors include two doors 50 and 70, but may also be applied to a home appliance equipped with one lower door 70. Hereinafter, the present disclosure will describe an example in which two doors 50 and 70 are applied to a cooking appliance. Furthermore, a door at a relatively upper side of the two doors 50 and 70 may be called an upper door 50, and a door at a lower side may be called a lower door 70.

In some implementations, the door 50, 70 may open and close a storage space 31, 41 of the home appliance and may acquire an image in the storage space 31, 41 by an image acquisition module 100. Furthermore, the door 50, 70 may increase the illuminance in the storage space 31, 41. In some examples, the image acquisition module 100 may include an image sensing device 170 and a lighting device 180. The image acquisition module 100 may be provided in the door 50, 70, and the door 50, 70 will be described with a focus on the image acquisition module 100 below.

Referring to FIG. 1, the view illustrates a cooking appliance equipped with the door 50, 70. A main body 10 of the cooking appliance may be roughly shaped into a hexahedral form. In some implementations, the main body 10 of the cooking appliance may include two doors 50 and 70. The two doors 50 and 70 may be disposed at different heights. The two doors 50 and 70 may shield different storage spaces 31 and 41 respectively.

Figure 2:
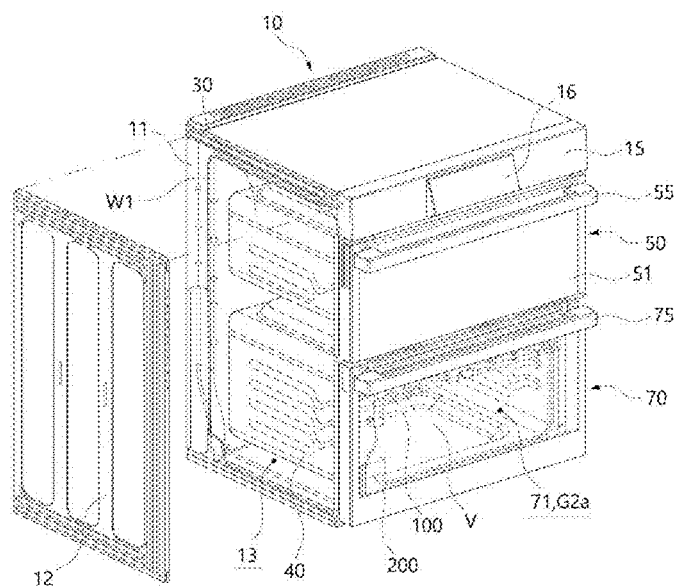
FIG. 2 is a perspective view illustrating an example of a separated side cover.

FIG. 2 illustrates a separated state of a side cover 12 constituting the main body 10 of the cooking appliance. Two cabinets 30 and 40 may be disposed inside the inside space 13 at different heights. The two cabinets 30 and 40 may include the storage spaces 31 and 41 separated from each other. As another example, the inside space 13 may include one cabinet or three or more cabinets 30 and 40. As another example, the two cabinets 30 and 40 may be disposed transversely. Reference numeral 11 indicates a rear cover constituting the main body 10 of the cooking appliance.

In some implementations, an upper panel 15 may be provided at an upper portion of the cooking appliance. The upper panel 15 may include an operating part 16. The operating part 16 may be used to operate functions of the cooking appliance and display a state of the cooking appliance. The upper panel 15 and the upper door 50 may be spaced apart from each other. A panel spacing D1 may be formed between the upper panel 15 and the upper door 50. External air may be introduced into the home appliance through the panel spacing D1, or internal air of the upper door 50 may be discharged.

The upper panel 15 may be connected to a main wire W1. The main wire W1 may connect the operating part 16 to a main controller described below. Otherwise, the main wire W1 may connect the operating part 16 to the image acquisition module 100. The main wire W1 may be connected to a connection wire W2 described below through a connector module 200.

The two cabinets 30 and 40 may be classified into a first cabinet 30 and a second cabinet 40. The first cabinet 30 and the second cabinet 40 may be disposed in the inside space 13 at different heights. The upper storage space 31 may be provided in the first cabinet 30, and the lower storage space 41 may be provided in the second cabinet 40.

The first cabinet 30 and the second cabinet 40 may have different types of cooking structures. For example, the first cabinet 30 may have one heat source, and the second cabinet 40 may have multiple heat sources. As another example, the first cabinet 30 may generate microwaves to cook a cooking object F, and the second cabinet 40 may include a convection heater or an induction heating type heat source.

The upper door 50 may be disposed in front of the first cabinet 30, and the lower door 70 may be disposed in front of the second cabinet 40. In some implementations, the upper door 50 and the lower door 70 may be operated in a kind of pull-down method in which each upper end is vertically swung on a lower end thereof. As another example, the upper door 50 and the lower door 70 may be operated in a side swing method in which each door is opened sideways.

In the upper door 50, a front surface 51 of the upper door 50 may have a structure allowing the upper storage space 31 to be visible. For example, the front surface 51 of the upper door 50 has a glass panel structure, and a user can observe the inside part of the upper storage space 31 through the upper door 50. As another example, the front surface 51 of the upper door 50 may be made of dark materials or be coated with a separate film, thereby preventing the upper storage space 31 from being seen from the outside. Reference numeral 55 may indicate an upper handle 55 to open and close the upper door 50.

The lower door 70 may be disposed below the upper door 50. The lower door 70 may be disposed in front of the second cabinet 40. The lower storage space 41 may be visible through a front surface of the lower door 70. The user can observe the inside of the lower storage space 41 through the front surface of the lower door 70.

Referring to FIG. 1, a door spacing D2 may be formed between the upper door 50 and the lower door 70. The door spacing D2 may be a space formed by spacing an upper end of the lower door 70 and a lower end of the upper door 50 from each other. Through the door spacing D2, external air may be introduced toward the main body 10 of the cooking appliance. In some examples, air passing through the inside part of the lower door 70 may be discharged outward.

In some implementations, the lower door 70 may include a window V. The window V allows the lower storage space 41 to be visible from the outside space and may be made of a transparent material. The window V may be understood as a part of a second front panel G2a constituting the front surface of the lower door 70. The window V may be provided in a central portion of the second front panel G2a. For example, an edge portion of the second front panel G2a may have a material with high surface roughness unlike the window V, or a separate opaque film may be applied to the edge portion of the second front panel G2a. That is, the lower storage space 41 may not be visible through the edge portion of the second front panel G2a that is outside the window V.

As another example, the edge of the second front panel G2a corresponding to the outside part of the window V may be covered by a door frame 72, 77, 80, 90. At this point, the outside part of the window V may be the edge part of the second front panel G2a disposed around the edges of the window V with the window V as the center.

As another example, the lower door 70 may be made of dark materials or coated with a separate film, thereby preventing the lower storage space 41 from being visible from the outside space. As another example, in the lower door 70, the lower door panel G2 described below may be omitted, and an opaque metal or nonmetal plate may constitute the front surface thereof. Also, in this case, the lower storage space 41 may not be visible from the outside space.

FIG. 2 illustrates the image acquisition module 100 and the connector module 200 that are mounted inside the lower door 70. Although FIG. 2 illustrates the image acquisition module 100 and the connector module 200 indicating positions where the image acquisition module 100 and the connector module 200 are mounted inside the lower door 70, the image acquisition module 100 and the connector module 200 may not be visible from the front space of the cooking appliance. This is because the edge portion of the second front panel G2a outside the window V is opaque, as described above. Reference numeral 75 indicates an upper handle 75 to open and close the lower door 70.

Figure 3:
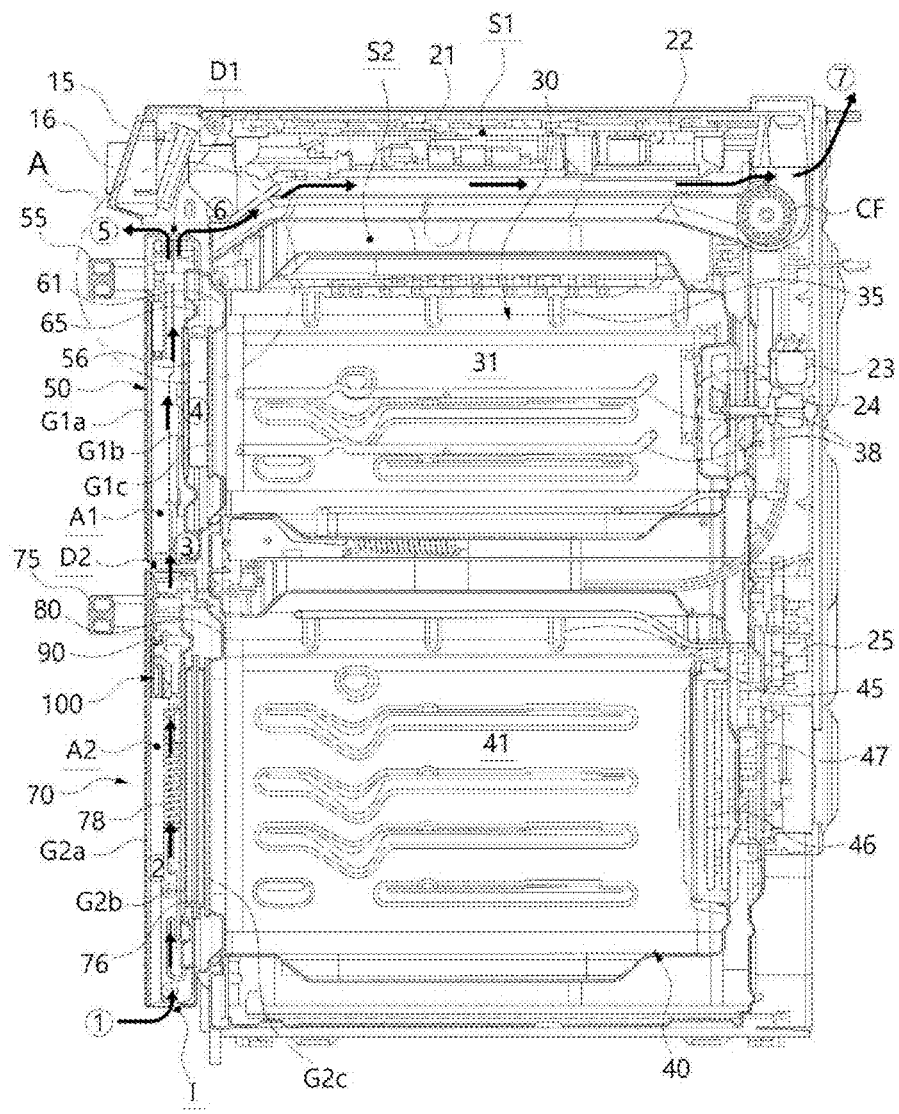
FIG. 3 is a sectional view taken along line III-III' of FIG. 1.

FIG. 3 is a sectional view for the line III-III' of FIG. 1. FIG. 3 illustrates the inner structure of the cooking appliance including the upper door 50 and the lower door 70. A plurality of spaces may be provided inside the cooking appliance. A machine chamber S1 may be disposed in an upper portion of the cooking appliance. Controllers 21 and 22 may be disposed in the machine chamber S1. A separate upper insulation space S2 partitioned from the machine chamber S1 may be provided below the machine chamber S1. In addition, a rear portion of the cooking appliance may also include an additional controller 23.

Heating devices 35, 45, and 46 may be disposed at the rear portion of the cooking appliance and inside the cabinets 30 and 40. The heating devices 35, 45, and 46 may heat the upper storage space 31 and the lower storage space 41. An upper motor 24 and an upper fan 25 may be disposed behind the upper storage space 31. The upper motor 24 and the upper fan 25 may discharge air into the upper storage space 31 to convect air inside the upper storage space 31. Reference numeral 38 indicates a tray disposed in the upper storage space 31.

A lower motor 47 and a lower fan may be disposed behind the cooking appliance. The lower motor 47 and the lower fan may discharge air into the lower storage space 41 to convect air in the lower storage space 41. When a second heat source 45 disposed in an upper portion of the lower storage space 41 heats the lower storage space 41, the lower motor 47 and the lower fan may circulate heated air.

In some implementations, the lower storage space 41 may include a third heat source 46. The third heat source 46 may be disposed in front of the lower fan. The third heat source 46 may quickly raise the temperature in the lower storage space 41 with the second heat source 45.

A cooling fan CF may be provided in the main body 10 of the cooking appliance. The cooling fan CF may circulate air in the machine chamber S1 to cool the cooking appliance. The cooling fan CF may be disposed behind the machine chamber S1.

Figure 22:
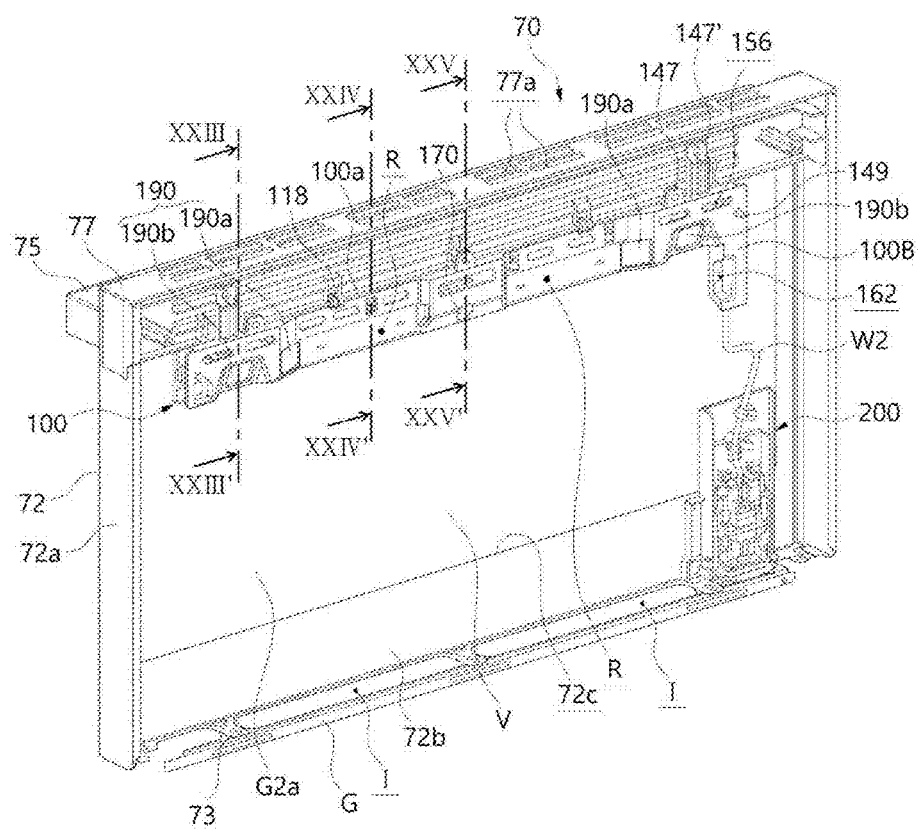
FIG. 22 is a perspective view illustrating configuration of the front frame part, the front panel, the image acquisition module, and a connection module, among components of the lower door.

The cooling fan CF may circulate air into the upper door 50 and the lower door 70. The cooling fan CF allows air to be introduced into a lower flow path inlet I of the lower door 70 and then to pass the lower door 70 and the upper door 50 in order, thereby cooling the upper door 50 and the lower door 70. Referring to FIG. 22, an air guide G may be provided at a lower portion of the lower door 70, and the flow path inlet I is formed in the air guide G so that external air may be introduced into the flow path inlet I. Reference numeral 73 indicates a bracket provided at a lower end of a front frame part 72 for mounting of the air guide G.

More specifically, the cooling fan CF may be operated to suck external air through the flow path inlet I disposed at the lower portion of the lower door 70 (direction of arrow ①). The sucked external air may rise along a second cooling flow path A2 formed between second insulation panels G2b and G2c and the second front panel G2a of the lower door 70 (direction of arrow ②). The rising external air may be discharged upward through a frame outlet 77a (referring to FIG. 17) formed in an upper frame part 77 described below.

As described above, a part of the air passing through the lower door 70 may be discharged outward through a door spacing D2 (referring to FIG. 1) provided between the upper door 50 and the lower door 70. Furthermore, the remaining door air is moved upward to be introduced into the upper door 50 (direction of arrow ③).

The air introduced into the upper door 50 may pass through a first cooling flow path A1 formed between a first front panel G1a and first insulation panels G1b and G1c, the panels constituting the upper door 50 (direction of arrow ④). A part of the air passing through the first cooling flow path A1 may be discharged forward of the main body 10 of the cooking appliance through the panel spacing D1 (direction of arrow ⑤). Furthermore, the remaining part of the air passing through the first cooling flow path A1 may be introduced into the machine chamber S1 (direction of arrow ⑥). The air introduced into the machine chamber S1 may pass through the machine chamber S1 and then be discharged through a rear upper portion of the machine chamber S1 (direction of arrow ⑦).

The flow of air (i) may cool the lower door 70, (ii) may cool the upper door 50, and (iii) may also cool the controllers 21, 22, and 25 disposed in the machine chamber S1. The cooling structure of the doors 50 and 70 using external air will be described below in detail.

Figure 4:
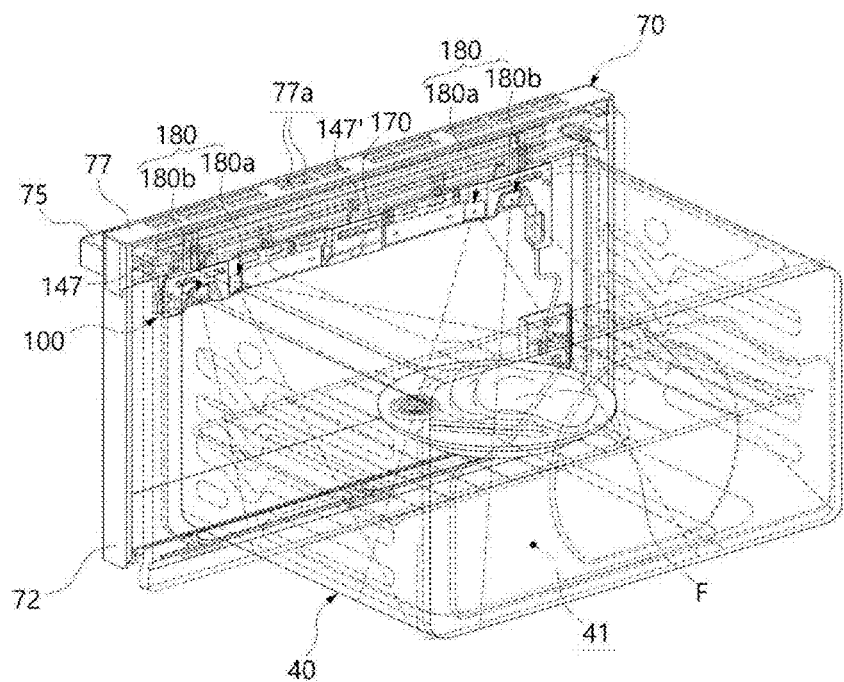
FIG. 4 is a perspective view illustrating an example of a lower unit with a lighting illuminating.
Figure 5:
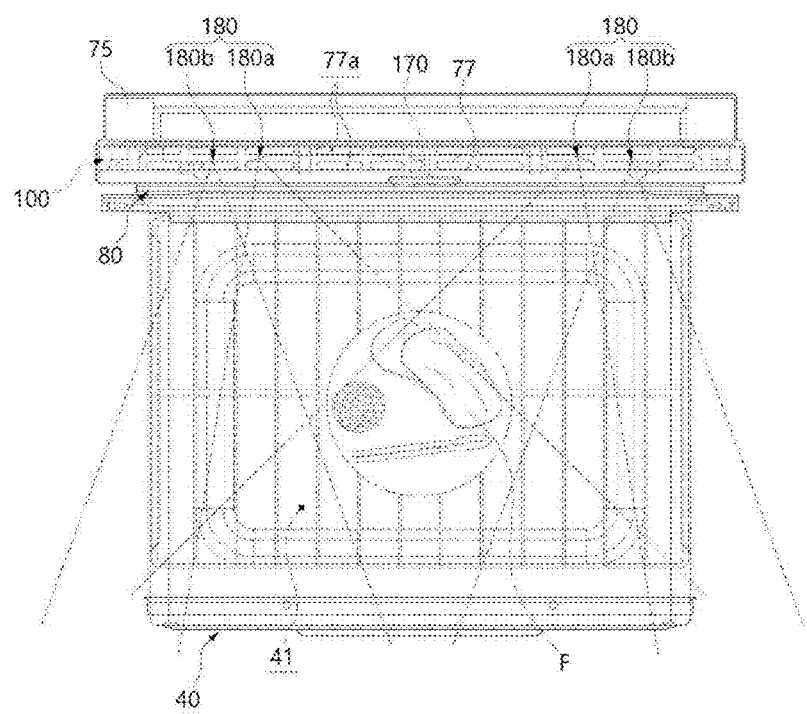
FIG. 5 is a plan view illustrating the lower unit with the lighting illuminating.
Figure 6:
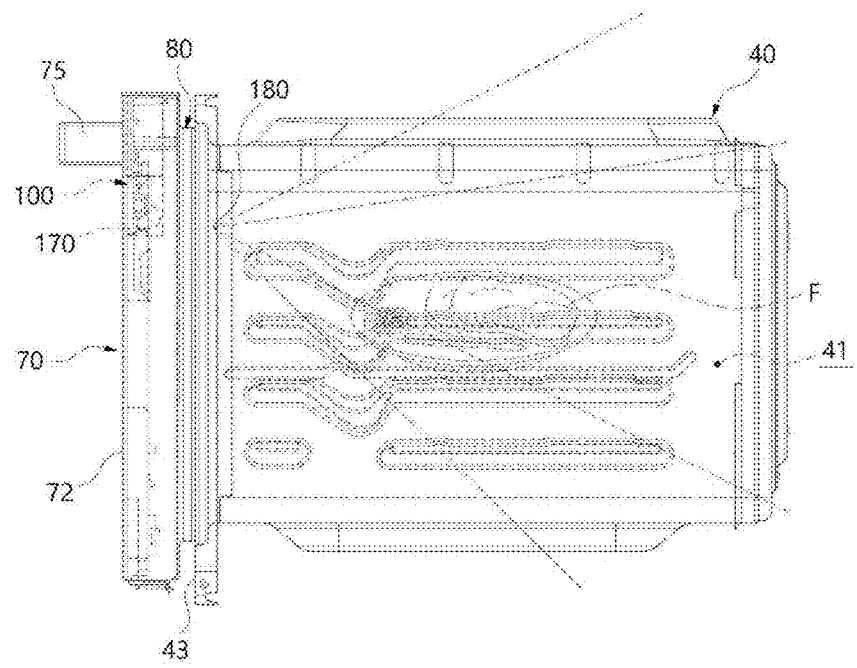
FIG. 6 is a side view illustrating the lower unit with the lighting illuminating.

FIGS. 4 to 6 are views illustrating the second cabinet 40. The inside part of the lower storage space 41 provided in the second cabinet 40 may be captured by the image acquisition module 100. Herein, in some implementations, the lower storage space 41 may be captured by the image sensing device 170 constituting the image acquisition module 100, and the illuminance thereof may be increased by the lighting device 180 constituting the image acquisition module 100. FIGS. 4 to 6 are views illustrating light emitted by the lighting device 180.

First, referring to FIG. 4, a central portion of the image acquisition module 100 may include the image sensing device 170. A plurality of lighting devices 180 may be disposed at both sides of the image sensing device 170 with the image sensing device 170 as the center. The plurality of lighting devices 180 increases the illuminance of the lower storage space 41 so that the image sensing device 170 acquires a clearer image.

The plurality of lighting devices 180 is disposed toward the lower storage space 41 to emit light to the lower storage space 41. The plurality of lighting devices 180 may illuminate the lower storage space 41 at difference angles. Accordingly, the illuminance of the entire region of the lower storage space 41 may be uniformly increased. Specifically, the plurality of lighting devices 180 may illuminate an upper surface, a lower surface, and left and right surfaces of the lower storage space 41.

Referring to FIGS. 4 and 5, in the plurality of lighting devices 180, a pair of first lighting parts 180a located relatively close to the image sensing device 170 may be disposed on the left and right sides of the image sensing device 170 with the image sensing device 170 as the center. In the plurality of lighting devices 180, a second lighting part 180b may be disposed outside each first lighting part 180a. As with the pair of first lighting parts 180a, a plurality of second lighting parts 180b is disposed at the left and right sides of the image sensing device 170 with the image sensing device 170 as the center.

In some implementations, light radiation regions formed by the plurality of lighting devices 180 may be overlaid.

Specifically, as shown in FIG. 5, the first lighting parts 180*a* emit lights while biasing in a central direction of the lower storage space 41 based on a transverse direction so that light may be overlaid in a constant region. The region where lights emitted by the pair of first lighting parts 180*a* are overlaid may be included in a central portion of the lower storage space 41. Accordingly, the illuminance of the cooking object F disposed on the central portion of the lower storage space 41 may be relatively higher than the surroundings.

In addition, the region where the second lighting part 180*b* emits light and the transversal region where the first lighting part 180*a* emits light may overlap. As shown in FIG. 5, the region where the first lighting part 180*a* emits light is partially overlaid with the region where the second lighting part 180*b* emits light, and the region where the illuminance is high may be provided in the central portion of the lower storage space 41 based on the transverse direction. Since the cooking object F is disposed in the central portion of the lower storage space 41 based on the transverse direction, the lighting device 180 may illuminate the cooking object F more brightly.

Herein, based on the transverse direction of FIG. 5, directions in which the first lighting part 180*a* and the second lighting part 180*b* emit light may be differently set. The first lighting part 180*a* may face the central portion of the lower storage space 41 relatively more than the second lighting part 180*b*. Specifically, the first lighting part 180*a* emits light in a direction biasing the transversal central portion of the lower storage space 41 where the cooking object F in FIG. 5 is located, more than the second lighting part 180*b*. Accordingly, the first lighting part 180*a* and the second lighting part 180*b* emit light to a wider region based on the transverse direction to remove a shaded region.

In some implementations, based on a vertical direction of FIG. 6 (Z-axial direction of FIG. 1), a direction of radiating light by the second lighting part 180*b* may be differently set from a direction of radiating light by the first lighting part 180*a*. Specifically, the second lighting part 180*b* emits light in a direction further biasing to the bottom of the lower storage space 41 than the first lighting part 180*a*. Accordingly, the first lighting part 180*a* and the second lighting part 180*b* emit light to a wider region based on the vertical direction (Z-axial direction in FIG. 1) to remove a shaded region.

In addition, the region where the second lighting part 180*b* emits light and the vertical region (Z-axial direction in FIG. 1) where the first lighting part 180*a* emits light may overlap. As shown in FIG. 6, the region where the first lighting part 180*a* emits light is partially overlaid with the region where the second lighting part 180*b* emits light. The region where the illuminance is high may be provided in the central portion of the lower storage space 41 based on the vertical direction (Z-axial direction in FIG. 1). Since the cooking object F is disposed in the central portion of the lower storage space 41 based on the vertical direction (Z-axial direction in FIG. 1), the lighting device 180 may illuminate the cooking object F brightly.

From now on, the structure in which external air flows along the inside part of the upper door 50 and the inside part of the lower door 70 described above and the structure in which the image acquisition module 100 illuminates the inside part of the lower storage space 41 and images are acquired will be described in detail.

Figure 7:
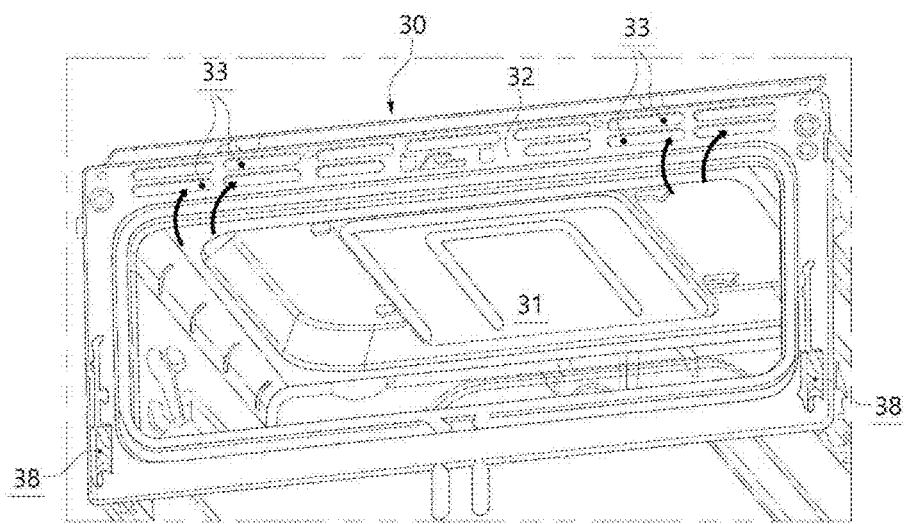
FIG. 7 is a perspective view illustrating an example of an upper storage space.

FIG. 7 illustrates the surroundings of an entrance of the upper storage space 31. As shown in the drawing, a front cabinet frame 32 may be provided on a front surface of the upper storage space 31. The front cabinet frame 32 may include multiple communicating holes 33. The multiple communicating holes 33 may be a part where the air that has passed the inside part of the upper door 50 passes. The structure will be described below with the upper door 50. Reference numeral 38 indicates a portion to which a part of a lower end of an upper door hinge 58 (referring to FIG. 9) is caught.

Figure 8:
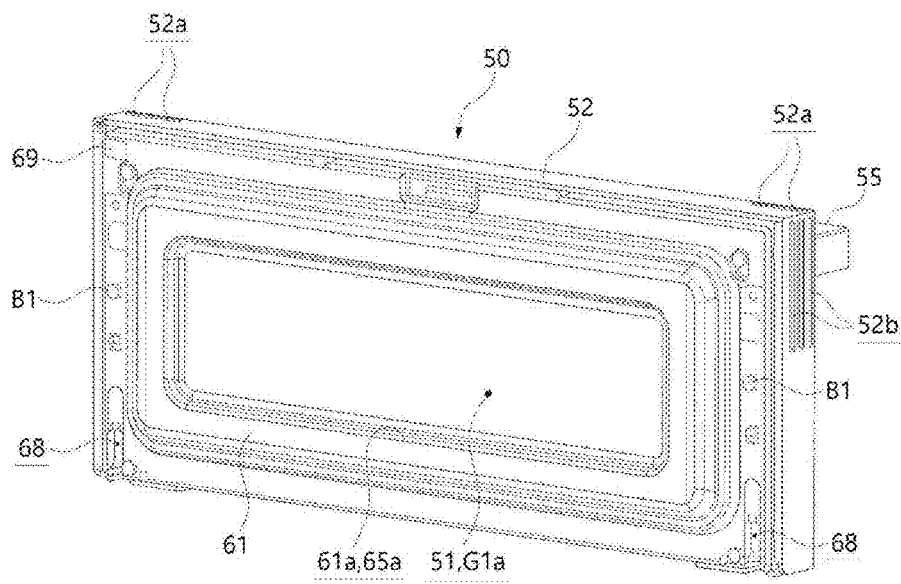
FIG. 8 is a perspective view illustrating an example of an upper door.

FIG. 8 illustrates the rear structure of the upper door 50. An upper frame part 52 may be disposed in an upper portion of the upper door 50. The upper frame part 52 may cover an upper portion of a first frame part 61 and an upper portion of a second frame part 65 described below. The upper frame part 52 may include an upper outlet 52*a*, i.e., an outlet of the first cooling flow path A1, and a side outlet 52*b*. Reference numeral 52*c* may indicate a mounting hole that is open rearward of an upper end of the upper door 50.

The upper outlet 52*a* provided in the upper frame part 52 may be an outlet through which the air passed through the upper door 50 is discharged outward. The side outlet 52*b* may be formed on a side surface of the upper frame part 52. Unmentioned reference numeral B1 indicates a fastener to assemble the upper door 50.

The upper door 50 may have a frame formed by the first frame part 61 with the upper frame part 52. A window 61*a*, 65*a* may be formed in a central portion of the first frame part 61 having roughly a rectangular frame shape. A first insulation panel G1*b*, G1*c* may be disposed in the window 61*a*, 65*a*. As with the lower door 70, the upper door 50 also includes a portion 51 through which the upper storage space 31 is visible. On both portions of a lower end of the first frame part 61, female protrusion parts 68 are respectively formed by being recessed and through which a part of a lower end of the first hinge 58 protrudes. Reference numeral 69 indicates a portion to which a hook of the first cabinet 30 is securely caught when the upper door 50 is closed.

Figure 9:
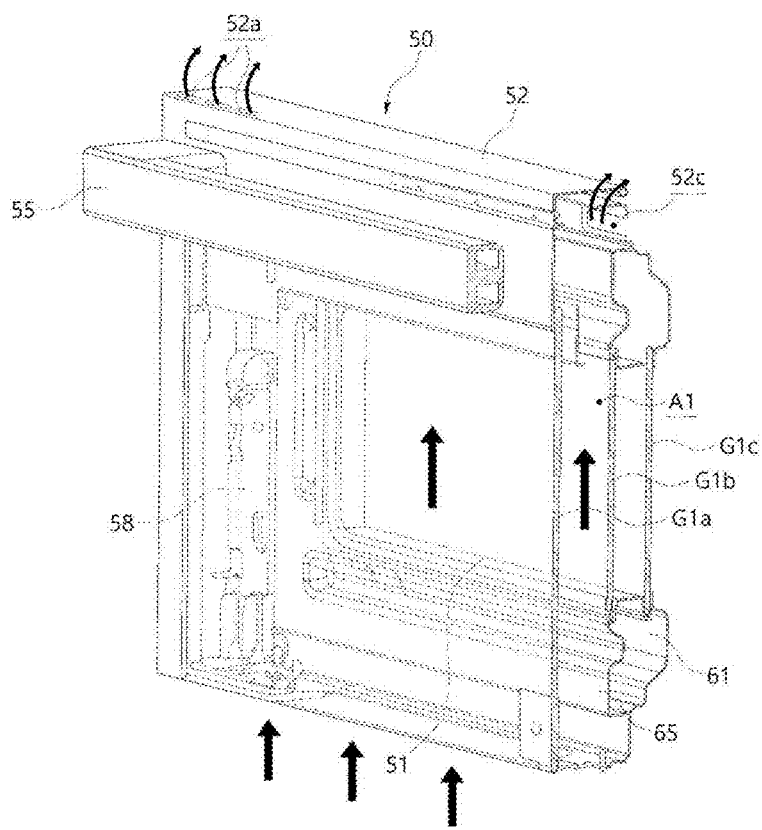
FIG. 9 is a sectional view taken along line IX-IX' of FIG. 8.

FIG. 9 illustrates the internal structure of the upper door 50. The upper door 50 may include the first front panel G1*a* and two first insulation panels G1*b* and G1*c*. The first front panel G1*a* and the first insulation panels G1*b* and G1*c* may be made of glass materials, respectively. The first front panel G1*a* and the first insulation panels G1*b* and G1*c* are made of transparent or translucent materials, so the central portion thereof may have the portion 51 through which the upper storage space 31 is visible.

A frame of the upper door 50 may be composed of multiple parts. As shown in FIG. 9, the second frame part 65 may be provided inside the upper frame part 52 and the first frame part 61. The two first insulation panels G1*b* and G1*c* may be disposed between the first frame part 61 and the second frame part 65. A gap between the two first insulation panels G1*b* and G1*c* is maintained in a vacuum, thereby increasing insulation performance.

As with the arrow indicated in FIG. 9, air introduced into a lower portion of the upper door 50 may flow along the first cooling flow path A1 formed between the first insulation panel G1*b*, G1*c* and the first front panel G1*a*. Herein, at least a part of the air introduced into the lower portion of the upper door 50 may be air passing through the lower door 70 to be discharged upward (referring to FIG. 3). In addition, the air passing through the first cooling flow path A1 may be discharged upward through the upper outlet 52*a* formed on an upper end portion of the upper door 50.

Figure 10:
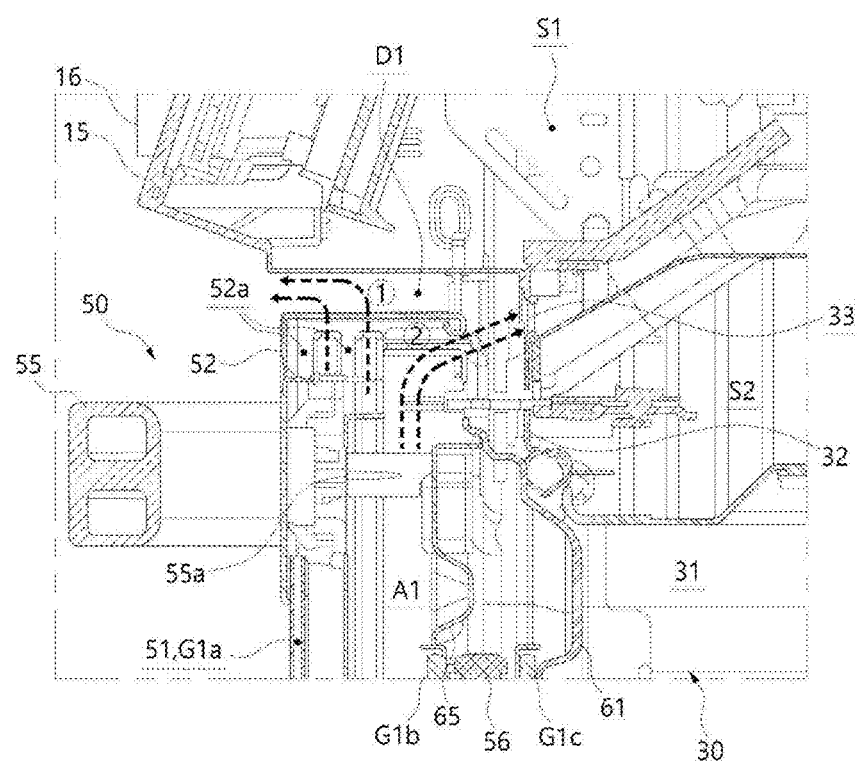
FIG. 10 is a sectional view enlarging and illustrating part A of FIG. 3.

FIG. 10 enlarges and illustrates the part A of FIG. 3. As shown in the drawing, the air passing through the inside part of the upper door 50 may be discharged upward through the upper outlet 52*a* formed in the upper frame part 52. A part of the discharged air may be discharged forward through the panel spacing D1 (in a leftward direction based on FIG. 10, referring to the arrow ①). The remaining air of the discharged air may be discharged rearward, i.e., rearward of the cooking appliance (at 2 o'clock based on FIG. 10, referring to the arrow ②). The rearward discharged air may be introduced into the machine chamber S1 through the communicating holes 33 of the front cabinet frame 32, thereby cooling the inside part of the machine chamber S1.

In FIG. 10, reference numeral 55a indicates a bracket to fix the upper handle 55 to the second frame part 65. Furthermore, in FIG. 10, reference numeral 56 indicates a first panel spacer that spaces the two first insulation frames from each other and fixes the first insulation frames to the inside part of the upper door 50.

Figure 11:
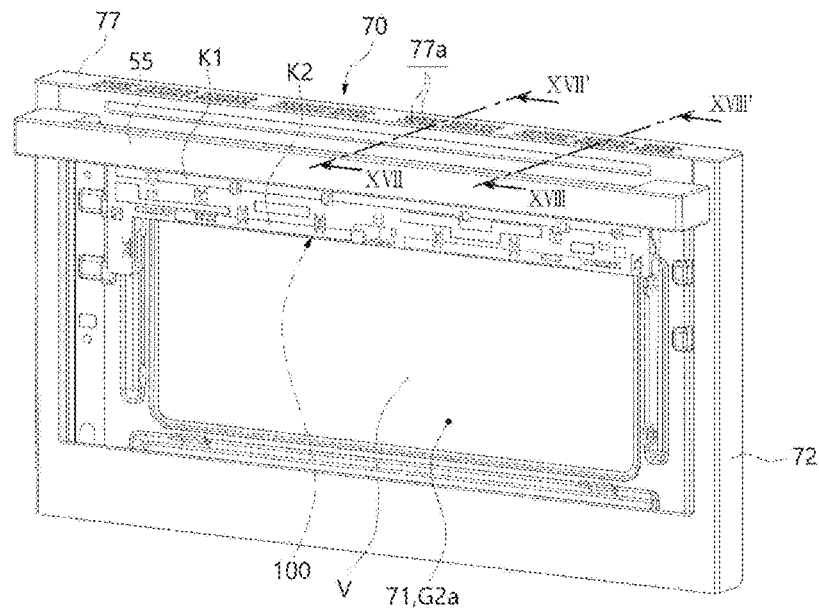
FIG. 11 is a perspective view illustrating an example of a lower door.
Figure 12:
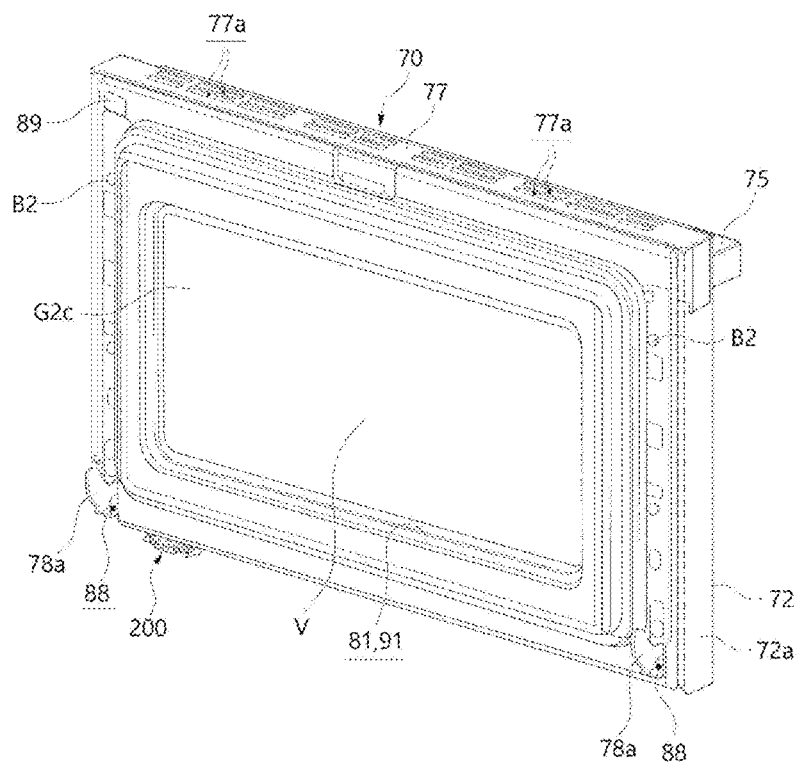
FIG. 12 is a perspective view illustrating the lower door at a different angle from FIG. 11.

FIGS. 11 and 12 illustrate the lower door 70 when viewed from the front side and the rear side of the home appliance. The front surface of the lower door 70 may have a flat structure. In some implementations, the surface of the second front panel G2a may constitute the front surface of the lower door 70.

The window V may be provided in the central portion of the front surface of the lower door 70. The window V may be a portion made of a transparent or translucent material so that the lower storage space 41 may be observed from the outside space. A part of the central portion of the second front panel G2a may be the window V. The window V is not formed into a separate object from the second front panel G2a and may be a part of the second front panel G2a.

The image acquisition module 100 may be disposed in the internal portion of the lower door 70. The image acquisition module 100 may acquire an inside image of the lower storage space 41 through the window V of the lower door 70 and display or transmit the image to the user.

As shown in FIG. 11, the image acquisition module 100 disposed in the internal portion of the lower door 70 is illustrated in an outward exposed state. Although the image acquisition module 100 is not visible from the outside space of the lower door 70 in some implementations, FIG. 11 illustrates the image acquisition module 100 in an exposed state to express a location where the image acquisition module 100 is disposed. The image acquisition module 100 may be disposed in a direction toward the lower storage space 41 (in a rearward direction based on FIG. 11).

The image acquisition module 100 may be disposed at a portion in the lower door 70, and the portion is located outside the window V. Herein, the outside may refer to a portion surrounding the edges of the window V. The image acquisition module 100 may be disposed in an installation region T1 to T4 disposed outside the edges of the window V. FIG. 11 illustrates that most part of the image acquisition module 100 is disposed in an upper portion of the window V. As another example, the image acquisition module 100 may be disposed at the left and right portions of the window V or a lower portion thereof.

A frame of the lower door 70 may be formed by the door body. The door body may include a lower door frame 72, 77, 80, 90 and the lower door panel G2. The door body may have roughly a hexahedral structure when the lower door frame 72, 77, 80, 90 and the lower door panel G2 are assembled.

The lower door frame 72, 77, 80, 90 may include multiple frame parts. In some implementations, the lower door frame 72, 77, 80, 90 may include the front frame part 72, a rear frame part 80, an inner frame part 90, and the upper frame part 77. The frame parts may be coupled to each other to provide one lower door frame 72, 77, 80, 90. At this point, the "front" may be the front side of the lower door 70 (left side based on FIG. 11).

The front frame part 72 may be disposed at the front part of the lower door frame 72, 77, 80, 90. More specifically, the front frame part 72 may form a front frame of the lower door frame 72, 77, 80, 90. A pair of front side plates 72a may be provided at both sides of the front frame part 72. A front lower plate 72b may connect the pair of front side plates 72a to each other while being located therebetween. The front side plates 72a and the front lower plate 72b are connected to each other to form roughly a "U" shape.

Figure 18:
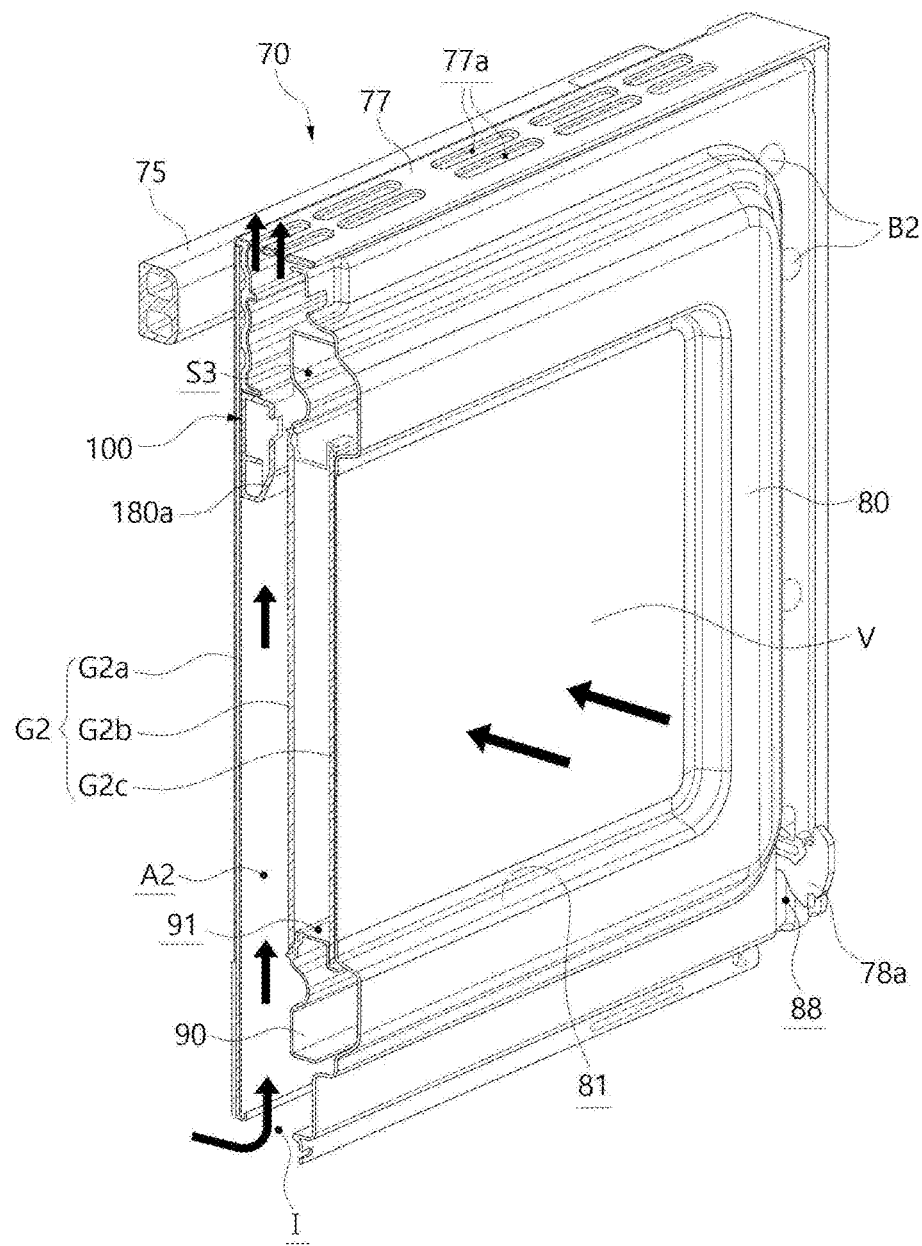
FIG. 18 is a sectional view taken along line XVIII-XVIII' of FIG. 11.

A front opening 72c may be provided between the front side plates 72a and the front lower plate 72b. The front opening 72c may be an empty space open in a longitudinal direction. The second front panel G2a constituting the lower door panel G2 (referring to FIG. 18) may be disposed in the front opening 72c. It may be understood that an open portion of the front opening 72c is filled with the second front panel G2a.

Figure 13:
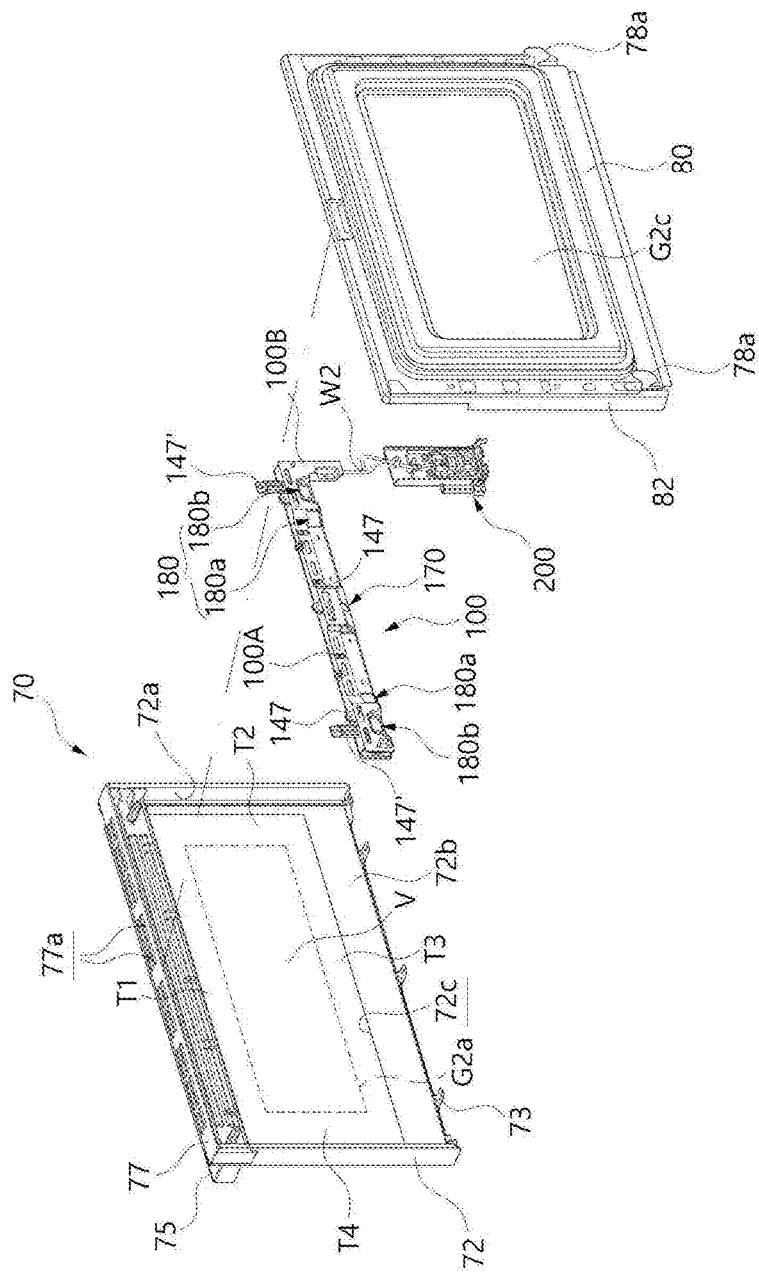
FIG. 13 is an exploded perspective view illustrating example components of the lower door.

More specifically, the region of the lower door panel G2 is wider than the region of the second front opening 72c, so a part of the front side plates 72a and a part of the front lower plate 72b may be stacked with the second front panel G2a, respectively. FIG. 13 illustrates the second front panel G2a stacked with the front frame part 72.

With the second front side plates 72a of the front frame part 72 located in the center, the second front panel G2a may be disposed at one side. The upper handle 75 may be disposed at the opposite side of the second front side plates 72a. Herein, a separate fastener passes through the second front side plates 72a and a panel fastening hole G2a' of the second front panel G2a and then may be fastened to a handle assembly part 75a of the upper handle 75.

Referring to FIG. 11 again, the image acquisition module 100 is disposed on the second front panel G2a. Herein, the image acquisition module 100 may be adhered to a rear surface of the second front panel G2a, the surface facing the lower storage space 41. More specifically, a partial surface of a front surface of the image acquisition module 100 and a partial surface of a rear surface of the second front panel G2a may be adhered to each other. In FIG. 11, K1 and K2 indicate regions where the front surface of the image acquisition module 100 and the rear surface of the second front panel G2a adhere to each other.

Referring to FIG. 12, the rear panel G2c of the second insulation panels G2b and G2c constituting the rear surface of the lower door 70 may be exposed toward the lower storage space 41. The rear panel G2c may also include a window V. The window V of the rear panel G2c and the window V of the second front panel G2a are successively disposed at a predetermined distance therebetween and assigned with the same reference numeral. Although no reference numeral is assigned, in the second insulation panels G2b and G2c, the inner panel G2b unexposed outward of the lower door 70 may also have a window V.

Figure 14:
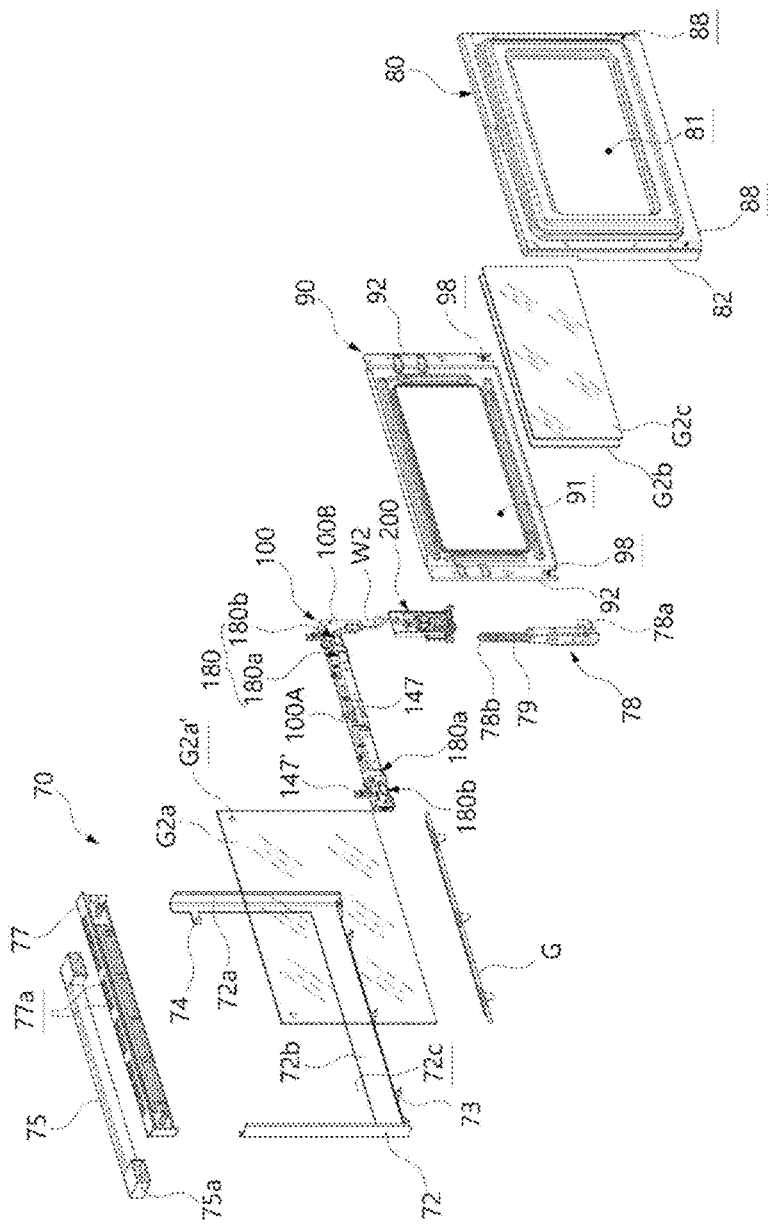
FIG. 14 is a perspective view illustrating, in greater detail than FIG. 13, the example components of the lower door.

In describing the lower door panel G2 from FIG. 14, the lower door panel G2 may include 3 panels in total. The 3 panels include the second front panel G2a disposed at the foremost side, the inner panel G2b disposed in the lower door 70, and the rear panel G2c disposed at the rearmost side. Among the 3 panels, the second front panel G2a is exposed forward (front side of the home appliance the main body 10, X-axial direction of FIG. 1), and the rear panel G2c is exposed rearward opposite to the second front panel G2a (rear side toward the lower storage space 41).

The inner panel G2b and the rear panel G2c may constitute the second insulation panels G2b and G2c. The inner panel G2b and the rear panel G2c may be stacked to each other at a constant distance. In addition, an empty space between the inner panel G2b and the rear panel G2c becomes a vacuum, thereby increasing insulation performance. As another example, the second insulation panels G2b and G2c may include only the rear panel G2c without the inner panel G2b. Reference numeral 76 indicates a second panel spacer 76 disposed between the inner panel G2b and the rear panel G2c to maintain a distance therebetween.

The installation region T1 to T4 may be provided between the second front panel G2a and the second insulation panels G2b and G2c. The installation region T1 to T4 is provided in an empty space between the second front panel G2a and the second insulation panels G2b and G2c. The installation region T1 to T4 may be a portion where the image acquisition module 100 and the connector module 200 are disposed.

The second cooling flow path A2 may also be provided between the second front panel G2a and the second insulation panels G2b and G2c. The second cooling flow path A2 may be the entire space between the second front panel G2a and the second insulation panels G2b and G2c. The installation region T1 to T4 may be disposed outside the window V with the window V as the center. Therefore, the second cooling flow path A2 is wider than the installation region T1 to T4, and it may be understood that the installation region T1 to T4 constitutes a part of the second cooling flow path A2.

Air may flow in the lower door panel G2 through the second cooling flow path A2. Accordingly, the second cooling flow path A2 may be a flow space A2 in which air flows.

In FIG. 13, the installation region T1 to T4 is indicated. The installation region T1 to T4 is a portion where the image acquisition module 100 and the connector module 200 are disposed, and a dotted line in FIG. 13 is expressed to help understand the installation region T1 to T4. In FIG. 13, the installation region T1 to T4 is expressed on a surface of the second front panel G2a. In some examples, the installation region T1 to T4 may be provided between the plurality of panels, specifically between the second front panel G2a and the second insulation panels G2b and G2c.

Herein, among the lower door frames 72, 77, 80, and 90, the upper frame part 77 corresponds to a portion of an upper end of a rear surface of the second front panel G2a, and a portion of the installation region T1 to T4 may be formed at a portion that is not covered by the upper frame part 77. More specifically, in the installation region T1 to T4, the first installation region T1, T3 may be provided at a lower portion of the upper frame part 77 that is not covered by the upper frame part 77.

The installation region T1 to T4 may include (i) the first installation regions T1, T3 that extend in a first direction along an edge of the window V, and (ii) a second installation regions T2, T4 that extend in a second direction different from the first direction along an edge of the window V. In some implementations, the first direction is a transverse direction (a transverse width direction of the lower door 70, and Y-axial direction of FIG. 1), and the second direction is a vertical direction (a height direction of the lower door 70, Z-axial direction of FIG. 1).

The first installation region T1, T3 may be formed at each of an upper portion T1 and a lower portion T3 of the window V on the basis of the window V. The second installation region T2, T4 may be formed at either side portion of the window V on the basis of the window V. In other divisions, the installation region T1 to T4 may be divided into (i) the upper region T1 provided at the upper portion of the window V, (ii) the right region T2 provided at the right portion of the window V, (iii) the lower region T3 provided at the lower portion of the window V, and (iv) the left region T4 provided at the left portion of the window V. The division is based on FIG. 16.

The first installation region T1, T3 and the second installation region T2, T4 may be connected to each other. Opposite end portions of the first installation region T1, T3 and the opposite end portions of the second installation region T2, T4 are connected to each other. Accordingly, the installation region T1 to T4 may be formed in connected spaces. Then, the image acquisition module 100 and the connector module 200 may be disposed to pass through the plurality of installation regions T1 to T4. In some implementations, a part of the image acquisition module 100 is disposed in the first installation region T1, T3. The remaining part of the image acquisition module 100 is disposed in the second installation region T2, T4 connected to the first installation region T1, T3. In some implementations, the connector module 200 is disposed in the second installation region T2, T4.

Figure 15:
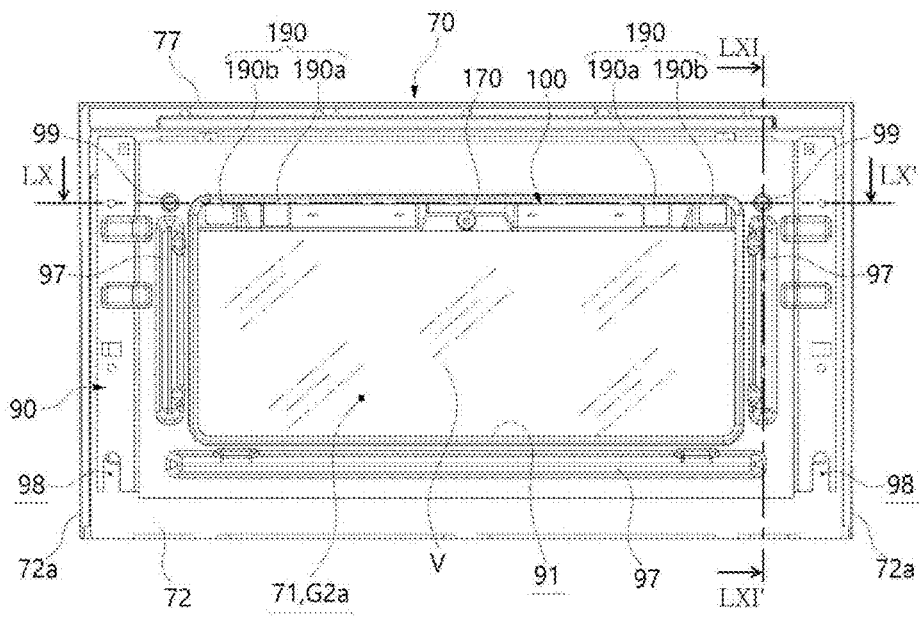
FIG. 15 is a rear view illustrating the lower door without a rear frame.

At least a part of the installation region T1 to T4 may be provided at a region where a part of the lower door frame 72, 77, 80, 90 covers a rear surface of the second front panel G2a. Referring to FIG. 15, it is illustrated that the rear frame part 80 covers a part of the image acquisition module 100. At this point, covering, by the rear frame part 80, a part of the image acquisition module 100 is based on the rear side of the lower door 70, i.e., a direction from the inside space of the lower storage space 41 to the rear surface of the lower door 70 when the lower door 70 is closed.

The image sensing device 170 and the lighting device 180 constituting the image acquisition module 100 are exposed through a rear through-hole 81 of the rear frame part 80. In some examples, a part of the image acquisition module 100 corresponding to the image sensing device 170 and an upper portion of the lighting device 180 may be covered by the rear frame part 80. For reference, in FIG. 15, it is expressed that the lighting device 180 is covered by the cover plate 190 and only the cover plate 190 is visible.

Accordingly, even when the user opens the lower door 70, remaining parts excluding the image sensing device 170 and the lighting device 180 may not be exposed through the window V. Specifically, in the case in which the lower door 70 is opened and closed in a pull-down method, based on opening and closing angles, the image sensing device 170 and the lighting device 180 may also be covered by the rear frame part 80.

As described below, the image acquisition module 100 is disposed in the first installation region T1, T3, and the connection wire W2 for allowing signal transmission and power supply between the image acquisition module 100 and the main controller may be disposed in the second installation region T2, T4.

The second front panel G2a may be divided into the window V, and an edge part disposed around the edges of the window V. Herein, the installation region T1 to T4 may be provided at a rear surface of the edge part. At this point, the edge part may be processed to be opaque. Accordingly, the installation region T1 to T4 provided at a lower surface of the edge part may not be exposed from the front side of the lower door 70, i.e., from the front side of the cooking appliance. The edge part may be formed by etching a part of the second front panel G2a to increase the surface roughness, by being coated with a separate film, or may be treated opaque in a painting process.

In some implementations, the upper frame part 77 may be disposed above the second front opening 72c. The upper frame part 77 may cover a part of the second front panel G2a. The image acquisition module 100 described below may be fixed to the upper frame part 77.

The frame outlet 77a may be open in the upper frame part 77. The frame outlet 77a may be an outlet through which air passing through the second cooling flow path A2 formed in the lower door 70 is discharged outward. The frame outlet 77a faces a lower surface of the upper door 50, so the air discharged through the frame outlet 77a may be naturally transferred to the first cooling flow path A1 through the lower portion of the upper door 50. In other words, the frame outlet 77a is provided opposite to an inlet I of the second cooling flow path A2 and may be an outlet of the second cooling flow path A2. Furthermore, the frame outlet 77a may be connected to the installation region T1 to T4 as described below.

Figure 17:
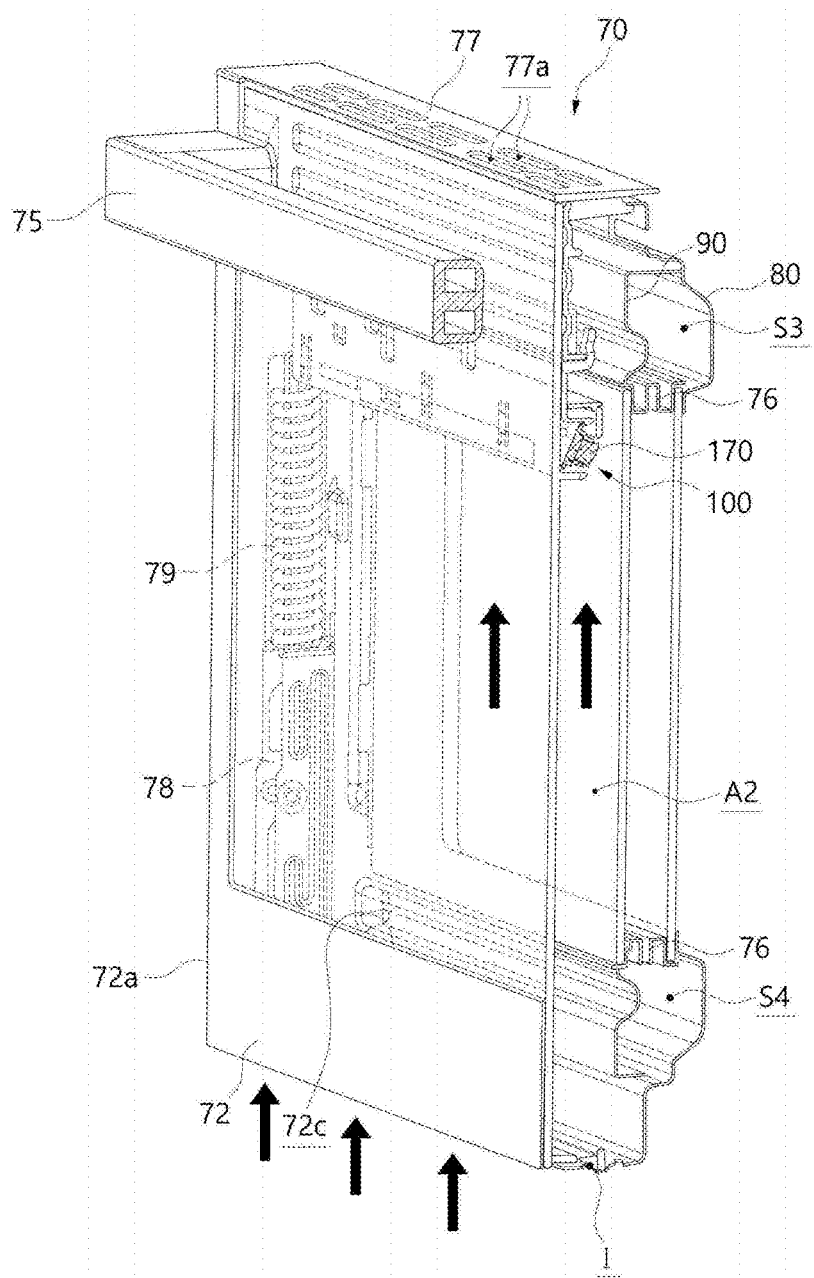
FIG. 17 is a sectional view taken along line XVII-XVII' of FIG. 11.

Referring to FIG. 14, the lower door 70 may include a lower door hinge 78. In FIG. 17, the lower door hinge 78 is expressed to be mounted in the lower door 70. A hinge holding arm 78a may protrude on the lower door hinge 78. The hinge holding arm 78a passes through an inner hinge passage part 98 of the inner frame part 90 and a rear hinge passage part 88 of the rear frame part 80 in order, then may be caught by and fixed to the main body 10 of the cooking appliance. Reference numeral 79 is a hinge spring 79 and may be fitted over a spring guide 78b of the lower door hinge 78.

With the lower door panel G2 located in the middle, the front frame part 72 may be disposed at one side. The inner frame part 90 and the rear frame part 80 may be disposed at the opposite side. The inner frame part 90 and the rear frame part 80 are spaced apart from each other (i) to form an insulation space therebetween, and (ii) to fix the second insulation panels G2b and G2c. The inner frame part 90 is disposed between the rear frame part 80 and the front frame part 72, thereby being unexposed outward.

The rear frame part 80 may be roughly formed in a rectangular frame shape. When the lower door 70 is closed, the rear frame part 80 may face a front surface of the lower storage space 41. The rear through-hole 81 may be open on a central portion of the rear frame part 80. The rear through-hole 81 may have a longitudinally open structure so that the internal space of the lower storage space 41 may be visible through the window V.

Rear side plates 82 may be provided at side surfaces of the rear frame part 80. The rear side plates 82 may overlap with the front side plates 72a. The rear frame part 80 may include a rear bead part 87 around the surroundings of the rear through-hole 81. Reference numeral 88 is the rear hinge passage part 88 through which the hinge holding arm 78a of the lower door hinge 78 passes.

The rear frame part 80 may cover a part of the image acquisition module 100. More specifically, the image sensing device 170 and the lighting device 180 constituting the image acquisition module 100 may be exposed through the rear through-hole 81 rearward, i.e., toward the lower storage space 41 (based on closed state). In some examples, a part of the image acquisition module 100 which corresponds to upper portions of the image sensing device 170 and the lighting device 180 may be covered by the rear frame part 80. Accordingly, even when the user opens the lower door 70, remaining parts excluding the image sensing device 170 and the lighting device 180 may not be exposed through the window V.

The inner frame part 90 may be coupled to the rear frame part 80. The rear frame part 80 and the inner frame part 90 may be coupled to each other by a separate frame fastener B2 (referring to FIG. 18). When the inner frame part 90 is coupled to the rear frame part 80, the second insulation panels G2b and G2c and the second panel spacer 76 that are located therebetween may be fixed together.

When the lower door 70 is closed, the inner frame part 90 may be stood vertically (Z-axial direction of FIG. 1) at a distance from the rear frame part 80. An inner through-hole 91 may be open on a central portion of the inner frame part 90.

Inner side plates 92 may be provided at side surfaces of the inner frame part 90. The inner side plates 92 may overlap with the front side plates 72a and the rear side plates 82.

The inner frame part 90 may include an inner bead part 97 which is provided around the circumference of the inner through-hole 91. Reference numeral 98 is the inner hinge passage part 98 through which the hinge holding arm 78a of the lower door hinge 78 passes.

Figure 16:
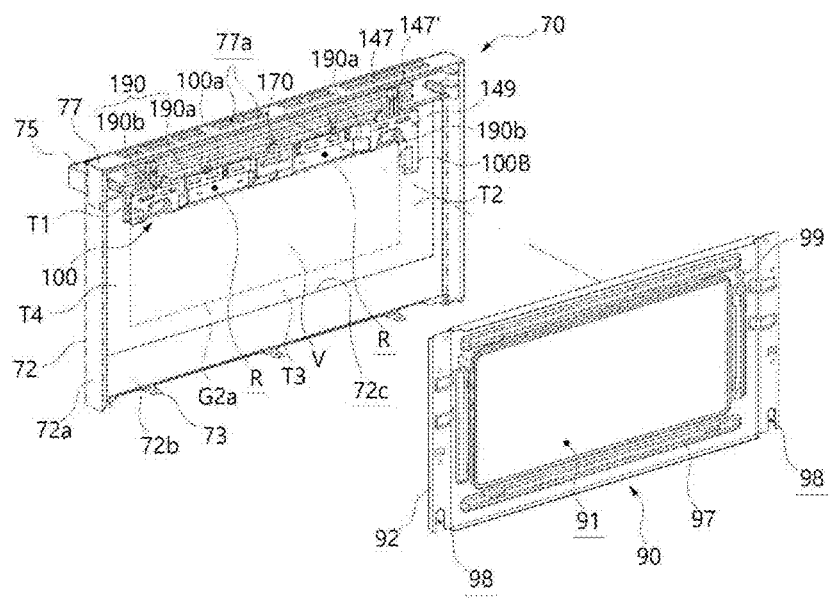
FIG. 16 is a perspective view illustrating configuration of a front frame part, an inner frame part, and a front panel among components of the lower door.

Referring to FIGS. 15 and 16, the inner frame part 90 may include a deformation prevention part 99. The deformation prevention part 99 may have a bead structure protruding in a direction from the inner frame part 90 toward a rear surface of the front frame part 72. More specifically, the deformation prevention part 99 may protrude in a direction facing a support protrusion 149 provided on the image acquisition module 100.

The deformation prevention part 99 may protrude to a location spaced apart at a predetermined distance from the support protrusion 149. A terminal end portion of the deformation prevention part 99 and a surface of the support protrusion 149 are spaced apart from each other, vibrations usually generated in an operation process of the second door 70 may be prevented from being transmitted toward the image acquisition module 100 and durability of the image acquisition module 100 may be improved.

Even when the deformation prevention part 99 is spaced apart at a predetermined distance from the support protrusion 149 as described above, when a module housing 110, 140 constituting the image acquisition module 100 is deformed by a condition such as high temperature heat, the deformation prevention part 99 may prevent the module housing 110, 140 from being excessively deformed in contact with the support protrusion 149. In some implementations, the deformation prevention part 99 may be disposed in the installation region T1 to T4.

In some implementations, in some implementations, the support protrusion 149 and the deformation prevention part 99 may protrude toward each other respectively on facing surfaces of the image acquisition module 100 and the inner frame part 90. In that case, compared to what the deformation prevention means (deformation prevention part/support protrusion) is provided on only the image acquisition module 100 or the door frame 90, the protruding length of the deformation prevention means may be reduced.

The deformation prevention part 99 may be provided on each end of the inner frame part 90. Then, when the image acquisition module 100 is deformed by heat, both ends of the image acquisition module 100 which are portions with the most bending may be supported by respective deformation prevention parts 99. Therefore, the deformation of the image acquisition module 100 may be efficiently prevented.

Herein, the image sensing device 170 and the lighting device 180 provided at the image acquisition module 100 may be disposed between the plurality of deformation prevention parts 99. Then, the deformation prevention parts 99 may support both end portions of the image acquisition module 100 with the image sensing device 170 and the lighting device 180, i.e., heater elements, located therebetween. Therefore, even when the image acquisition module 100 is deformed, the image acquisition module 100 may be supported efficiently.

Each deformation prevention part 99 may protrude in the longitudinal direction in which the plurality of panels are stacked to each other. In other words, it may be understood that each deformation prevention part 99 protrudes in a direction of reducing the second cooling flow path A2. Since the second cooling flow path A2 may be an empty space and provide an empty space where the image acquisition module 100 may be deformed, the deformation prevention part 99 protrudes in the direction of reducing the second cooling flow path A2 so that deformation of the image acquisition module 100 may be prevented efficiently.

As another example, the second door 70 may include the deformation prevention part 99 or the support protrusion 149. Referring to FIG. 61B, the image acquisition module 100 includes the support protrusion 149, and the deformation prevention part 99 may be omitted in the inner frame part 90. Herein, the length of the support protrusion 149 may be formed longer than the length of the support protrusion 149 of the previous example (referring to FIG. 61A). In addition, referring to FIG. 61C, the support protrusion 149 is omitted in the image acquisition module 100, and the inner frame part 90 may include the deformation prevention part 99. Herein, the length of the deformation prevention part 99 may be formed longer than the length of the deformation prevention part 99 of the previous example (referring to FIG. 61A). As another example, the inner frame part 90 may include the support protrusion 149, and the image acquisition module 100 may include the deformation prevention part 99.

The inner frame part 90 may include the plurality of deformation prevention parts 99. In some implementations, the deformation prevention parts 99 may be provided on the left and right portions of the inner through-hole 91, respectively. More specifically, each deformation prevention part 99 may be provided on a portion corresponding to a corner of the inner through-hole 91 and provided at a disconnected portion of the inner bead part 97. The two deformation prevention parts 99 may support the support protrusions 149 disposed at both end portions of the image acquisition module 100, respectively. The structure of the deformation prevention part 99 and the support protrusion 149 will be described below again.

In FIG. 17, a sectional view of the lower door 70 is illustrated. The view illustrates the lower door panel G2 fixed among the front frame part 72, the rear frame part 80, and the inner frame part 90. The second front panel G2a may be in close contact with a surface of the front frame part 72. The image acquisition module 100 may be disposed on the surface of the second front panel G2a. The image acquisition module 100 may be disposed in the first installation region T1, T3 that is formed in an upper end portion of the second front panel G2a and a lower end portion of the upper frame part 77.

The second cooling flow path A2 may be formed between the second front panel G2a and the inner panel G2b of the second insulation panels G2b and G2c. The second cooling flow path A2 may be the entire space between the second front panel G2a and the inner panel G2b. The arrow of FIG. 17 indicates a flow direction of external air passing through the second cooling flow path A2. The upper end portion of the second cooling flow path A2 includes the frame outlet 77a of the upper frame part 77, so an air outlet may be formed.

As described above, the installation region T1 to T4 may be disposed outside the window V with the window V as the center. Therefore, the second cooling flow path A2 is wider than the installation region T1 to T4, and it may be understood that the installation region T1 to T4 constitutes a part of the second cooling flow path A2. The lower door hinge 78 may also be disposed in the second cooling flow path A2.

The space between the rear panel G2c and the inner panel G2b spaced apart from each other may be maintained in a vacuum state. Then, even when the heat of the lower storage space 41 is transferred to the rear panel G2c (referring to the arrow of FIG. 18), heat transferred from the rear panel G2c to the inner panel G2b may be significantly reduced. Heat transferred to the second cooling flow path A2 may be discharged by external air flowing along the second cooling flow path A2. Reference numerals S3 and S4 are insulation spaces formed between the rear frame part 80 and the inner frame part 90, and insulators may be filled into the spaces.

Figure 19:
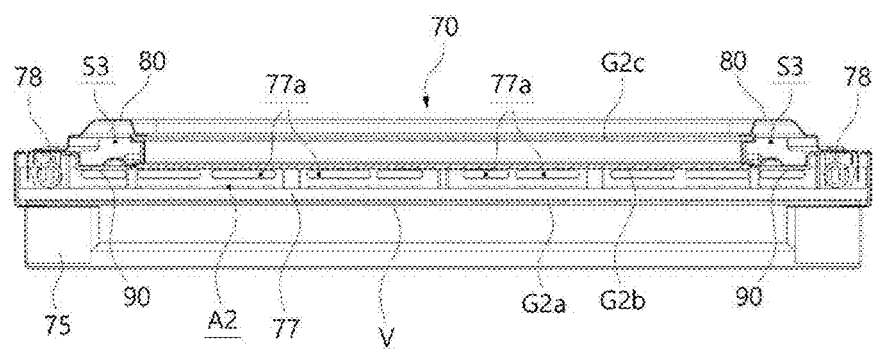
FIG. 19 is a bottom view illustrating the lower door without an image acquisition module.
Figure 20:
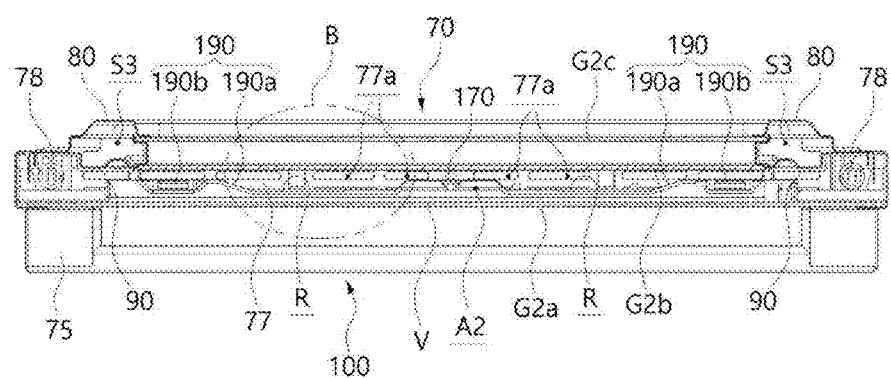
FIG. 20 is a bottom view illustrating the lower door with the image acquisition module.
Figure 21:
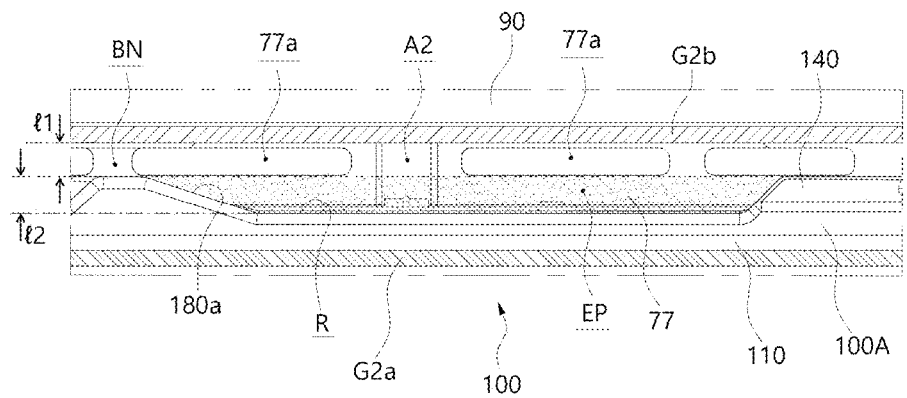
FIG. 21 is a sectional view enlarging and illustrating part B of FIG. 20.

From FIGS. 19 to 21, a cooling structure of the lower door 70 will be described in detail. As a reference, FIGS. 19 to 21 are views illustrating the lower door 70 when viewed from the lower side. FIG. 19 illustrates the lower door 70 without the image acquisition module 100. External air is introduced into the inlet I open downward of the lower door 70 and then is discharged to the frame outlet 77a of the upper frame part 77 by flowing along the second cooling flow path A2. FIG. 19 is a view illustrating the frame outlet 77a in an opened state, the frame outlet 77a being located opposite the lower end portion of the lower door 70.

As described above, when the image acquisition module 100 is omitted at the lower door 70, the second cooling flow path A2, i.e., the air flowing space, may have a sufficiently large sectional region. All remaining portions excluding the lower door hinge 78 disposed at either side may be used as the second cooling flow path A2.

FIG. 20 illustrates the lower door 70 with the image acquisition module 100. Due to the presence of the image acquisition module 100, the sectional region of the second cooling flow path A2 is reduced. Therefore, a flow of the external air flowing along the second cooling flow path A2 may be relatively rough. In some implementations, with a module flow path part R provided in the image acquisition module 100, a sectional region of the second cooling flow path A2 may widen, and a flow of air may be smooth.

More specifically, the image acquisition module 100 may be disposed on the second cooling flow path A2. Accordingly, the image acquisition module 100 may interfere with the external air passing through the second cooling flow path A2. Referring to FIG. 20, the module housing 110, 140 constituting the image acquisition module 100 may reduce a sectional region of the second cooling flow path A2. In some implementations, based on the drawing, the image acquisition module 100 may be disposed in a transverse direction (Y-axial direction of FIG. 1) of the second cooling flow path A2. The image acquisition module 100 may successively extend from a left end portion to a right end portion of the second cooling flow path A2.

The image acquisition module 100 may include the module flow path part R. The module flow path part R may be formed by partially recessing the image acquisition module 100 toward the second front panel G2a. As described above, the module flow path part R formed by partially recessing a part of the image acquisition module 100 may constitute a part of the second cooling flow path A2. The module flow path part R may widen a sectional region of the second cooling flow path A2.

The module flow path part R may be provided between the image sensing device 170 and the lighting device 180 constituting the image acquisition module 100. The image sensing device 170 and the lighting device 180 may protrude to a certain degree toward the lower storage space 41, i.e., toward the inner panel G2b in FIG. 20, to realize image acquisition and lighting function. The module flow path part R may have a structure recessed relatively more forward than the image sensing device 170 and the lighting device 180.

A part of the installation region T1 is occupied by the image acquisition module 100, and the remaining space of the installation region T1 may include an air circulation path BN, EP connected to the second cooling flow path A2, i.e., a flowing space.

Referring to FIG. 21 enlarged from FIG. 20, the air circulation path BN, EP may include the flow path connection part BN having a first width l1 in the longitudinal direction (X-axial direction of FIG. 1) in which the plurality of panels G2a and G2b is disposed. The flow path connection part BN allows the second cooling flow path A2 to be continued vertically but is a portion with a relatively small width. At this point, the plurality of panels G2a and G2b may be called the first panel G2a and the second panel G2b.

More specifically, the first width l1 of the flow path connection part BN may be a lineal distance between a surface of the image acquisition module 100 and a surface of the second inner panel G2b. In other words, since the first width l1 is a portion where a width is reduced due to the presence of the image acquisition module 100, the flow path connection part BN may be referred to as a bottleneck region BN.

In addition, the air circulation path BN, EP may include the flow path expansion part EP having a second width l2 in the longitudinal direction (vertical direction based on FIG. 21, X-axial direction of FIG. 1) in which the plurality of 2 panels G2a, G2b. The flow path expansion part EP may be formed in a portion where the module flow path part R is recessed. The second width l2 means a lineal distance between facing surfaces of the module flow path part R and the second inner panel G2b. The second width l2 may be wider than the first width l1.

At the portion where the module flow path part R is disposed, the entire width of the air circulation path BN, EP may be the sum l1+l2 of the first width l1 and the second width l2. As described above, air may flow smoothly in the wider air circulation path BN, EP.

When the flow path expansion part EP is not provided, only the flow path connection part BN may constitute the air circulation path BN, EP. In other words, air may be smoothly circulated due to the relatively reduced sectional region of the air circulation path BN, EP. In FIG. 21, at the portion with the module flow path part R, there is an increased region (indicated with different material in FIG. 21) in the width direction (vertical direction based on the drawing, X-axial direction of FIG. 1) of the second cooling flow path A2. Therefore, even when external air rises and encounters the image acquisition module 100, the air may be smoothly discharged through the frame outlet 77a while passing through the module flow path part R.

Figure 73:
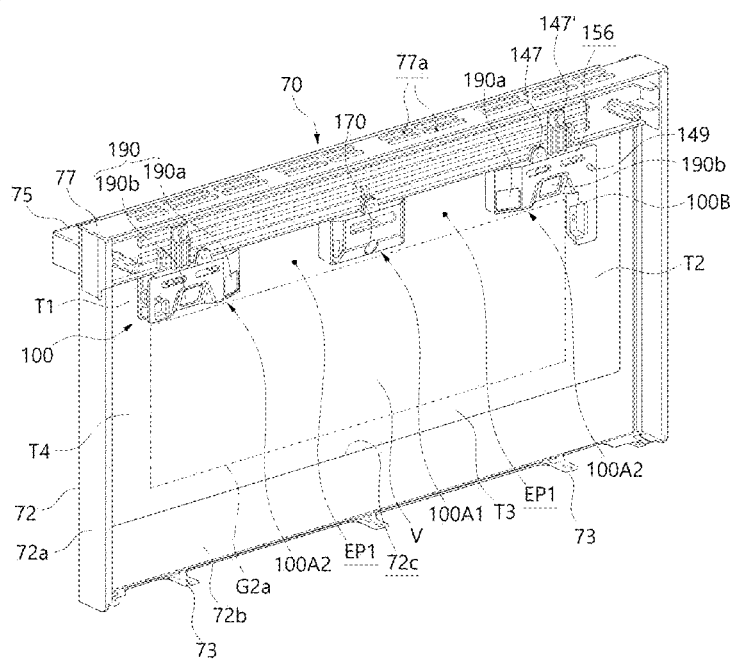

In some implementations, even when the module flow path part R is omitted, the flow path expansion part EP may be provided. For example, the flow path expansion part EP may be formed at a portion where surfaces of the plurality of panels G2a and G2b face each other in the empty space of the installation regions T1. Referring to FIG. 73, the image acquisition module 100 may be composed of a capturing unit 100A1 and a lighting unit 100A2 separated from each other. The flow path expansion part EP may be provided between the capturing unit 100A1 and the lighting unit 100A2. In this case, the width of the flow path expansion part EP may be further increased by the thickness of the module flow path part R omitted.

Figure 24:
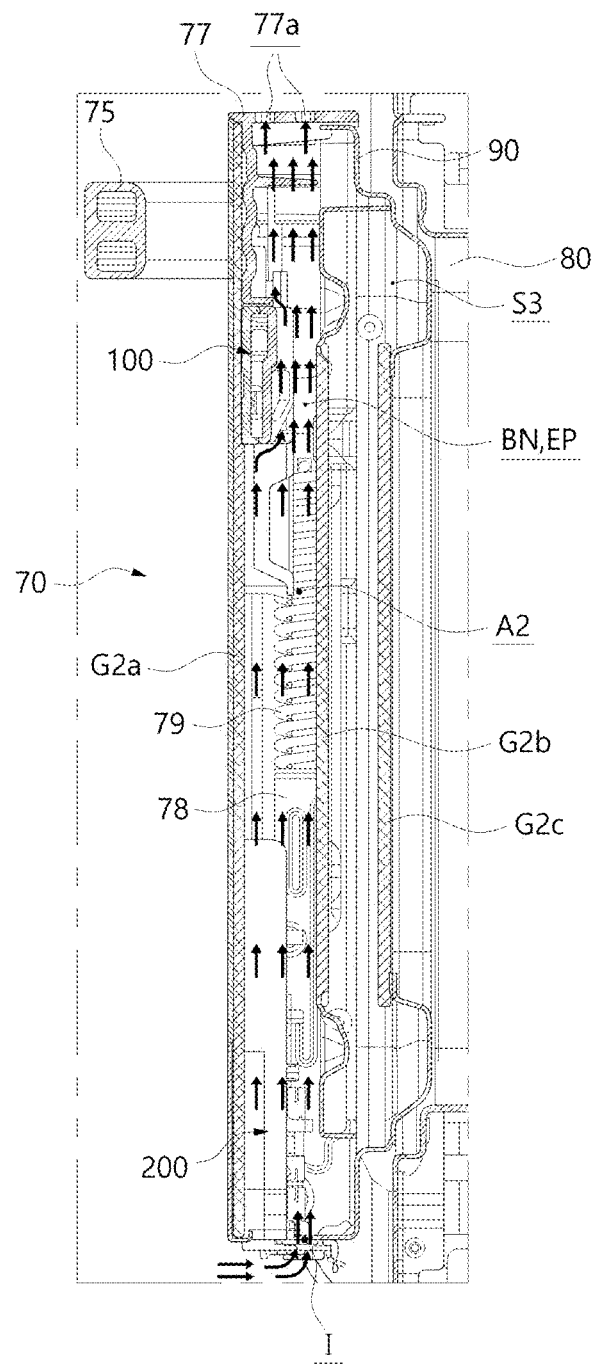
FIG. 24 is a sectional view illustrating the inner structure of the lower door on the basis of line XXIV-XXIV' of FIG. 22.

An inlet and an outlet of the flow path expansion part EP may be open in an air flow direction. Referring to FIG. 24, the flow path expansion part EP successively opened from the lower side to the upper side is illustrated. Accordingly, the second cooling flow path A2 may be continued through the inlet and the outlet of the flow path expansion part EP.

Referring to FIG. 21 again, the flow path connection part BN and the flow path expansion part EP may be open in a direction toward the surface of the second inner panel G2b. In other words, a gap between the surface of the image acquisition module 100 and the surface of the second inner panel G2b, and a gap between the surface of the module flow path part R and the surface of the second inner panel G2b may become a continuous empty space, and a flow region of air may be expanded.

At this point, the image acquisition module 100 may have a thickness that does not cover the frame outlet 77a on the basis of the flow path direction of the second cooling flow path A2. Referring to FIG. 21, the image acquisition module 100 protrudes in a direction toward the inner frame part 90 but does not cover the frame outlet 77a. A portion of the image acquisition module 100 with the most protruding rearward of the lower door 70 (upward direction based on FIG. 21) may be spaced apart from the second inner panel G2b. The frame outlet 77a may be formed in a spacing between the image acquisition module 100 and the second inner panel G2b.

FIG. 22 illustrates the lower door 70 without the inner frame part 90 and the rear frame part 80. The image acquisition module 100 may be disposed in the first installation region T1, T3 corresponding to the upper portion of the window V. The thickness (longitudinal length) of the image acquisition module 100 may be smaller than the thickness (longitudinal length) of the upper frame part 77. The image acquisition module 100 may be brought into close contact with the second front panel G2a. Accordingly, a rear surface of the upper frame part 77 may further protrude toward the lower storage space 41 (rightward direction based on the drawing) than a rear surface of the image acquisition module 100. As described above, the frame outlet 77a may be provided at the portion where the upper frame part 77 further protrudes than the image acquisition module 100.

Figure 23:
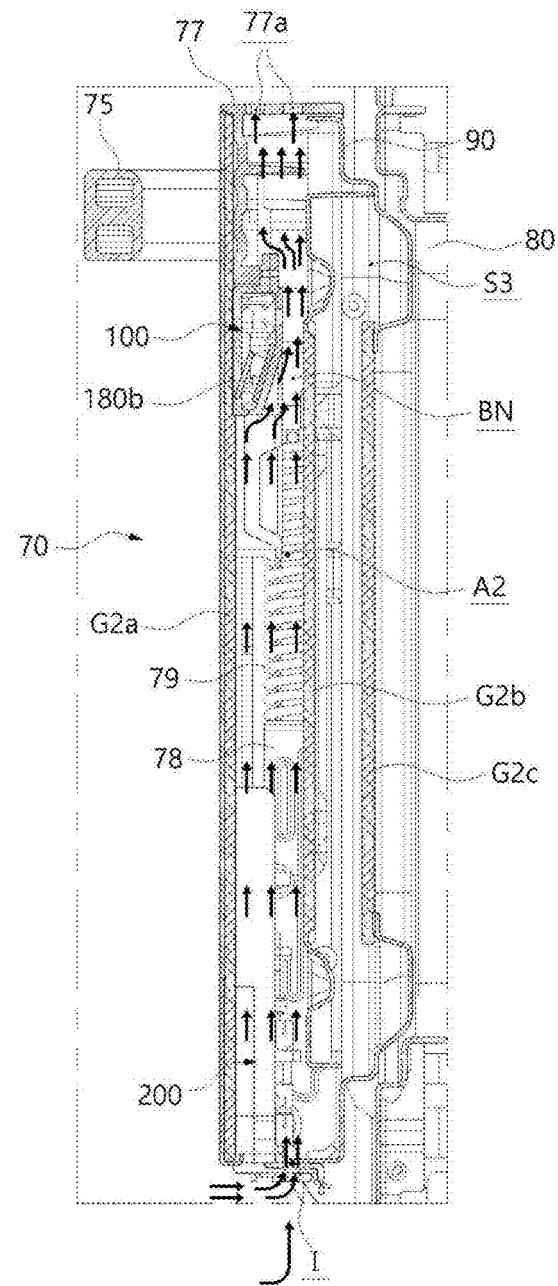
FIG. 23 is a sectional view illustrating an inner structure of the lower door on the basis of line XXIII-XXIII' of FIG. 22.
Figure 25:
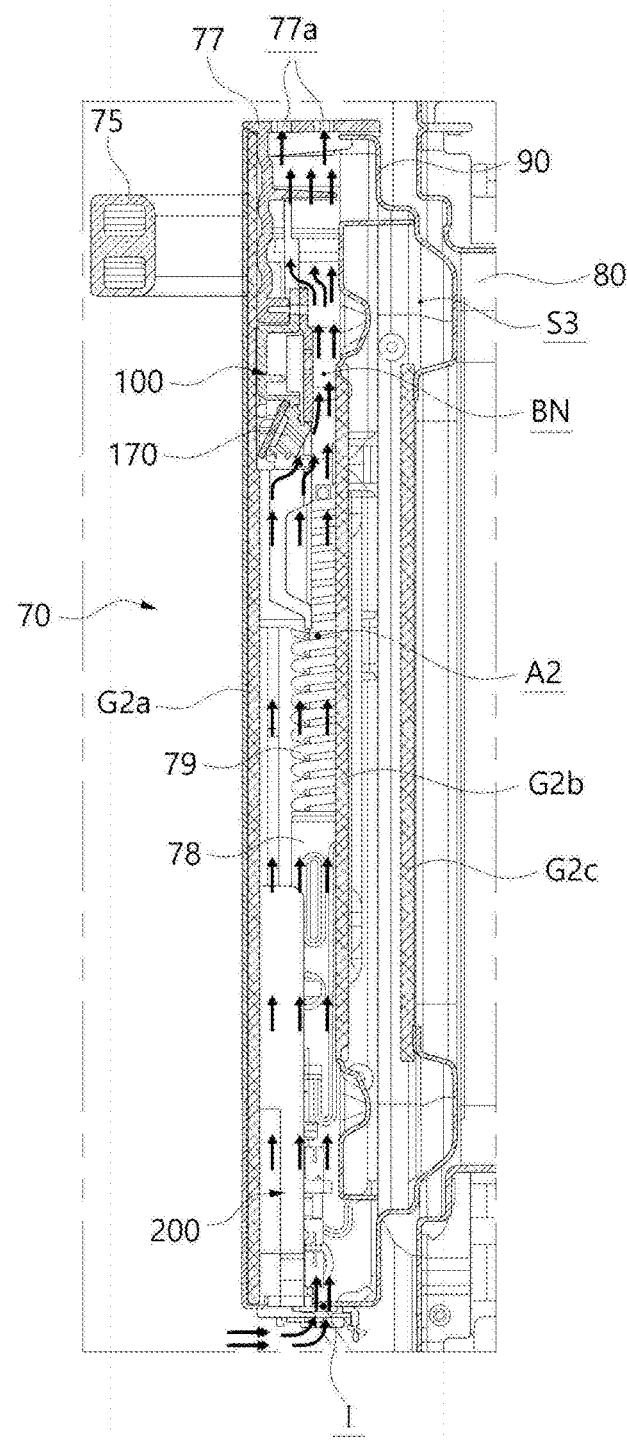
FIG. 25 is a sectional view illustrating the inner structure of the lower door on the basis of line XXV-XXV' of FIG. 22.

Hereinbelow, a structure in which the second cooling flow path A2 expands by the module flow path part R of the lower door 70 to prevent the bottleneck effect of air flow will be described. FIGS. 23 to 25 are sectional views of the lower door 70. FIGS. 23 to 25 are views illustrating cut-off sections of different portions of FIG. 22. Referring to FIG. 23, the second cooling flow path A2 narrows at a portion with the image acquisition module 100. In FIG. 23, the second lighting part 180b of the lighting device 180 of the image acquisition module 100 is disposed at the upper portion of the lower door 70. The portion where the second lighting part 180b is disposed while protruding reduces the second cooling flow path A2 and provides the bottleneck region BN of a flow of air.

Otherwise, referring to FIG. 24 which is a sectional view based on the module flow path part R, the second cooling flow path A2 expands at the portion with the module flow path part R. Even when the image acquisition module 100 is provided, the module flow path part R expands the second cooling flow path A2, so air may flow more smoothly. Therefore, the bottleneck region BN of a flow of air generated at another portion of the image acquisition module 100 may not be formed in the portion with the module flow path part R.

FIG. 25 is a sectional view based on the image sensing device 170. The internal structure of the lower door 70 as shown in FIG. 25 may have a structure in which, as with the structure of FIG. 23, the second cooling flow path A2 narrows at a portion with the image sensing device 170, and the bottleneck region BN of a flow of air may be formed.

As shown in FIGS. 23 and 25, at the portion with the image sensing device 170 and the portion with the lighting device 180, a contact region with the air flowing along the second cooling flow path A2 may expand. Then, the image sensing device 170 and the lighting device 180 may be efficiently cooled by the external air. The image sensing device 170 and the lighting device 180 which emit relatively high temperature heat are provided in the direction of reducing the second cooling flow path A2 and a region in contact with the external air expands, so the image sensing device 170 and the lighting device 180 may be efficiently cooled. In some examples, the module flow path part R is provided between the image sensing device 170 and the lighting device 180 which emit low temperature heat, so a flow of air may be smooth, and a flow of the external air may be improved.

Referring to FIG. 22 again, the connector module 200 described below may be disposed in the second installation region T2, T4. The connector module 200 is disposed in a different installation region from the image acquisition module 100. In some examples, a main unit 100A, i.e., a part of the image acquisition module 100, is disposed in the first installation region T1, T3, but a part of connection unit 100B, i.e., the remaining part of the image acquisition module 100, may be disposed in the second installation region T2, T4. In some implementations, the image acquisition module 100 and the connector module 200 may be electrically connected to each other through the connection wire W2.

Figure 26:
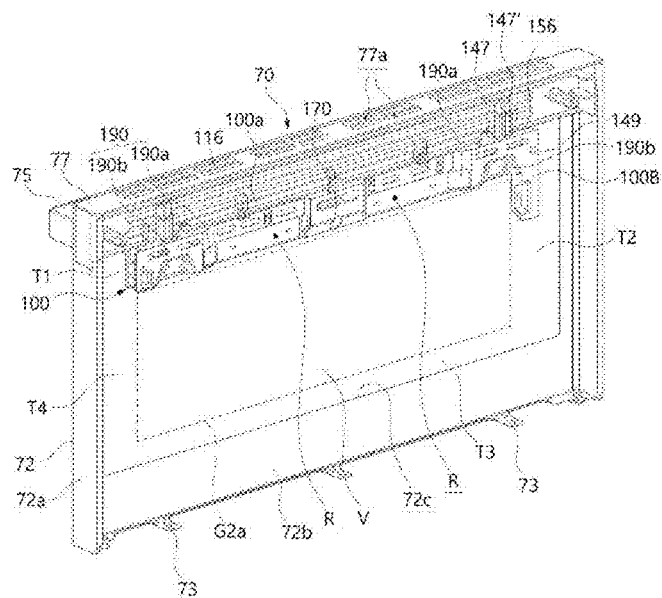
FIG. 26 is a perspective view illustrating a coupled state of the front frame part, the front panel, and the image acquisition module, among the components of the lower door.

Hereinbelow, the structure of the image acquisition module 100 will be described in detail. FIG. 26 illustrates a coupled state of the front frame part 72, the second front panel G2a, and the image acquisition module 100 among the parts of the lower door 70. As shown in the drawing, a part of the image acquisition module 100 may be disposed in the first direction (transverse direction based on the drawing). The remaining part of the image acquisition module 100 may be disposed in a second direction (vertical direction based on the drawing). As another example, the image acquisition module 100 may be disposed only in the first direction in the installation region T1 to T4, or only in the second direction.

In some implementations, the image acquisition module 100 may include the main unit 100A disposed in the first direction, and the connection unit 100B disposed in the second direction which is different from the first direction. The main unit 100A may be disposed at an upper end portion outside the window V. The connection unit 100B is connected to one end of the main unit 100A and may be disposed at a side end portion outside the window V. As described above, since the image acquisition module 100 is disposed outside the window V along the edges of the window V, thereby preventing from covering the window V. Furthermore, the image acquisition module 100 may be mounted in the installation region T1 to T4, i.e., a space outside the visible area through the window V, so redesign of the door 50, 70 may be unnecessary, or only a minimum change of design may be provided.

The image sensing device 170 and the lighting device 180 may be disposed at the main unit 100A. The image sensing device 170 may be disposed at a central portion of the main unit 100A to acquire an image inside the lower storage space 41. In some implementations, one image sensing device 170 is disposed in the central portion of the main unit 100A. As another example, a plurality of image sensing devices 170 may be provided at the main unit 100A.

The lighting device 180 may be disposed at a location spaced apart from the image sensing device 170. The lighting device 180 may be disposed to be spaced apart from the image sensing device 170 with the module flow path part R located therebetween. In some implementations, the lighting device 180 may be provided on either of the image sensing device 170 with the image sensing device 170 as the center. The lighting device 180 disposed on either of the image sensing device 170 may illuminate the interior of the lower storage space 41 to enable the image sensing device 170 to acquire a clearer image and also enable the user to observe the interior of the lower storage space 41 easier.

The lighting device 180 disposed on each portion of the main unit 100A may include the plurality of lighting parts 180a and 180b. In the plurality of lighting parts 180a and 180b, the plurality of first lighting parts 180a located relatively close to the image sensing device 170 may be disposed on the left and right sides of the image sensing device 170. In the plurality of lighting parts 180a and 180b, the second lighting part 180b may be disposed outside the first lighting part 180a. As with the pair of first lighting parts 180a, a plurality of second lighting parts 180b is disposed at the left and right sides of the image sensing device 170 with the image sensing device 170 as the center.

As described above, light emitted regions formed by the plurality of lighting parts 180a and 180b may be overlaid. In some implementations, the first lighting part 180a is disposed obliquely toward the image sensing device 170. Furthermore, the second lighting part 180b is disposed obliquely toward the lower side, i.e., the lower end portion of the lower door 70. With an installation inclination angle of the lighting device 180, the lighting device 180 may illuminate a wide space uniformly.

Figure 27:
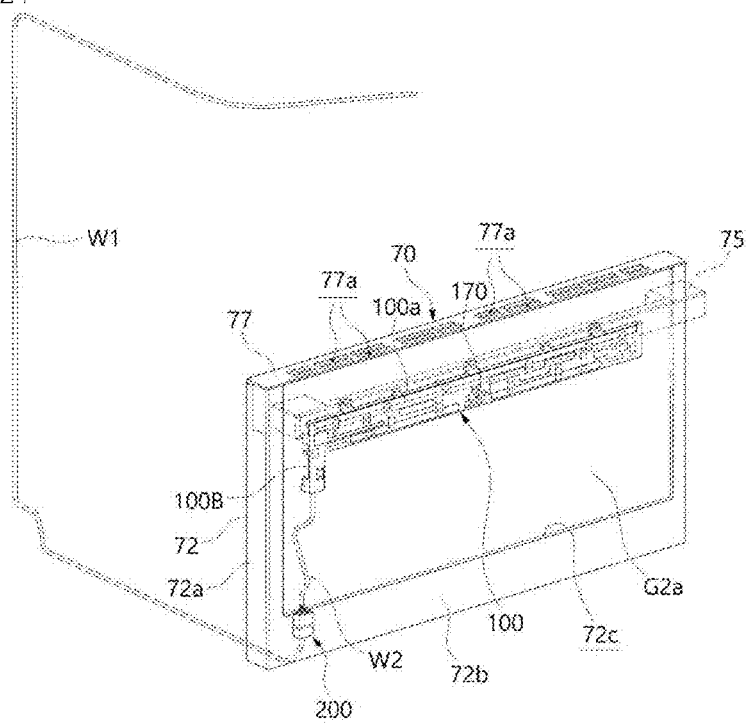
FIG. 27 is a perspective view illustrating a structure of the lower door, a main wire, and a connection wire.

Referring to FIG. 27, a wire to achieve power supply or signal transmission may be disposed in the main body 10 and the lower door 70 of the home appliance. The wire may include the main wire W1 to connect the connector module 200 of the lower door 70 to controllers 21, 22, and 25 in the main body 10, and the connection wire W2 to connect the connector module 200 to the image acquisition module 100. In some cases, a fabricator can separate the main wire W1 from the connector module 200, and perform maintenance/repairing to the image acquisition module 100. For reference, FIG. 27 illustrates the image acquisition module 100 in a penetrated state. In some examples, the image acquisition module 100 may be shielded by the edge part of the second front panel G2a.

Figure 28:
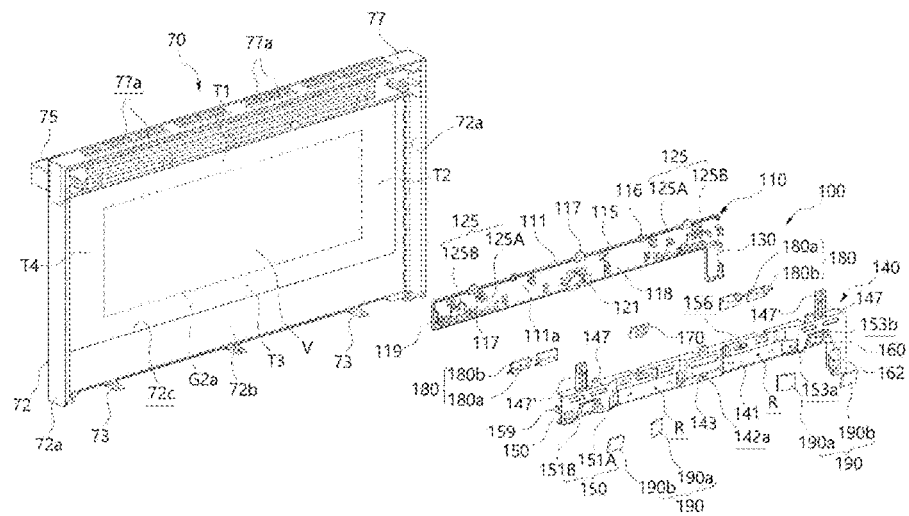
FIG. 28 is a perspective view illustrating the image acquisition module separated from the front panel.

FIG. 28 illustrates the lower door 70 with the image acquisition module 100 separated. The image acquisition module 100 may be disposed at the second front panel G2a. After the image sensing device 170 and the lighting device 180 are assembled to the module housing 110, 140 constituting the image acquisition module 100, the entire image acquisition module 100 may be mounted to the second front panel G2a. FIG. 28 omits illustration of the inner frame part 90 and the rear frame part 80 that are coupled to the front frame part 72 with the image acquisition module 100 located therebetween.

Referring to FIG. 28, the module housing 110, 140 forming the frame of the image acquisition module 100 may be composed of a plurality of parts. In some implementations, the module housing 110, 140 may include the first housing 110 and the second housing 140. The first housing 110 and the second housing 140 are assembled with each other, thereby protecting the image sensing device 170 and the lighting device 180 disposed therebetween. The first housing 110 may be in close contact with the second front panel G2a. The second housing 140 may face the inner panel G2b of the second insulation panels G2b and G2c.

The image sensing device 170 and the lighting device 180 may be mounted in the mounting space provided between the first housing 110 and the second housing 140. In some implementations, the lighting device 180 may include the cover plate 190 to protect a light source 183 of the lighting device 180. The cover plate 190 is arranged in front of a light emitting element 183. FIG. 28 illustrates that the cover plate 190 is separated forward of the second housing 140 to make the cover plate 190 visible. When the cover plate 190 is assembled, the cover plate 190 may be assembled at the rear side of the second housing 140, i.e., into the second housing 140 between the first housing 110 and the second housing 140. The assembly structure of the cover plate 190 will be described below again. In some examples, a sensor protective cover 178 may be provided at the image sensing device 170 to protect a capturing sensor.

The first housing 110 will be described with reference to FIGS. 28 to 30. The first housing 110 is assembled with the second housing 140 to constitute one module housing 110, 140. The first housing 110 may be provided in a plurality of different directions. In some implementations, a portion formed in the first direction and a portion formed in the second direction are connected to each other to form the first housing 110. Herein, the portion formed in the first direction is a mounting plate 111, and the portion formed in the second direction is a first connection body 130. As another example, the first housing 110 may be formed only in the first direction or the second direction.

The second housing 140 may be formed in a plurality of different directions as with the first housing 110. In some implementations, a portion formed in the first direction and a portion formed in the second direction are connected to each other to form the second housing 140. Herein, the portion formed in the first direction is a cover body 141, and the portion formed in the second direction is a second connection body 160. As another example, the second housing 140 may be formed only in the first direction or the second direction.

First, in describing the first housing 110, the first housing 110 may have roughly a thin plate structure. A first surface of the first housing 110 may face the second front panel G2a, and a second surface may face the second housing 140. Herein, the image sensing device 170 and the lighting device 180 may be mounted to the second surface of the first housing 110. As described above, a part of the first surface of the first housing 110 may adhere to a part of the rear surface of the second front panel G2a. In FIG. 11, K1 and K2 indicate regions where the surfaces adhere to each other.

Figure 30:
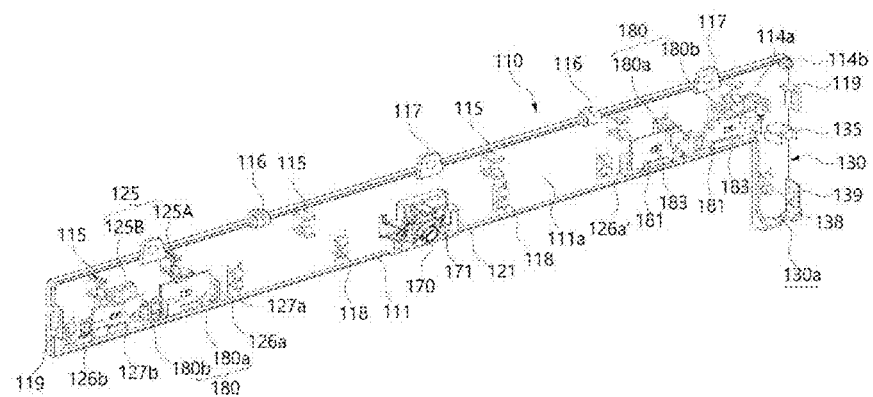
FIG. 30 is a perspective view illustrating an example of an image sensing device and a lighting device which are mounted to the first housing of the image acquisition module.

Referring to FIG. 30, the first housing 110 may include a wire guide 114a, 114b. The wire guide 114a, 114b may guide a direction in which the connection wire W2 is fixed. The wire guide 114a, 114b may protrude on the surface of the first housing 110. The connection wire W2 may pass while surrounding the protruding wire guide 114a, 114b. The wire guide 114a, 114b may guide the fixing direction of the connection wire W2 along with wire holders 115 to be described below.

In some implementations, the wire guide 114a, 114b may be disposed at a portion where the mounting plate 111 and the first connection body 130 are connected to each other. Since the mounting plate 111 and the first connection body 130 are provided in different directions, a direction of the connection wire W2 may be changed between the mounting plate 111 and the first connection body 130. Therefore, at the portion where the mounting plate 111 and the first connection body 130 are connected to each other, the wire guide 114a, 114b may guide a direction change of the connection wire W2.

Figure 32:
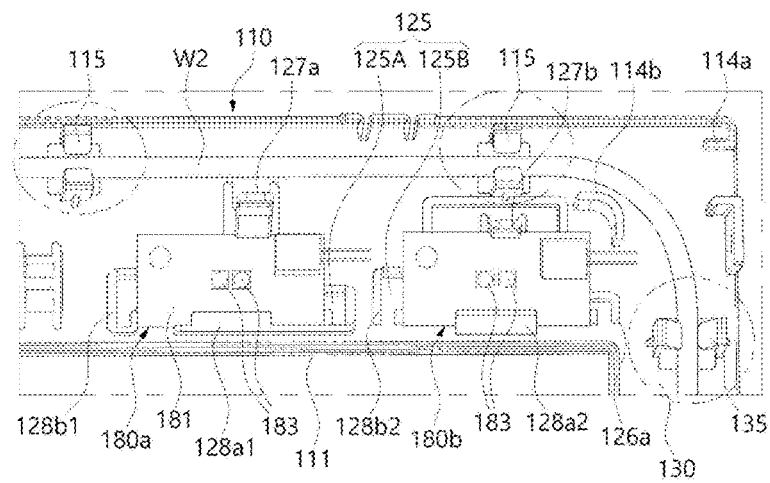
FIG. 32 is a plan view illustrating a connection wire disposed in the first housing of the image acquisition module.

The wire guide 114a, 114b may include a plurality of wire guides 114a and 114b. Referring to FIGS. 30 and 32, the wire guide 114a, 114b may include a first wire guide 114a disposed at a relatively outer portion, and a second wire guide 114b disposed at an inner portion. The connection wire W2 may pass between the first wire guide 114a and the second wire guide 114b. The second wire guide 114b may prevent the connection wire W2 from being separated outward from the image acquisition module 100. The second wire guide 114b is provided at a location close to the second lighting part 180b, thereby preventing the connection wire W2 from interfering with the second lighting part 180b.

The first housing 110 may include a plurality of wire holders 115. The wire holders 115 may guide the installation direction of the connection wire W2. In some implementations, the plurality of wire holders 115 may be disposed in a longitudinal direction of the image acquisition module 100, i.e., a longitudinal direction of the first housing 110. The connection wire W2 may be fixed along the plurality of wire holders 115. As another example, the wire holders 115 may not be disposed at the first housing 110 but at the second housing 140. As another example, the wire holders 115 may be omitted in the image acquisition module 100.

Figure 29:
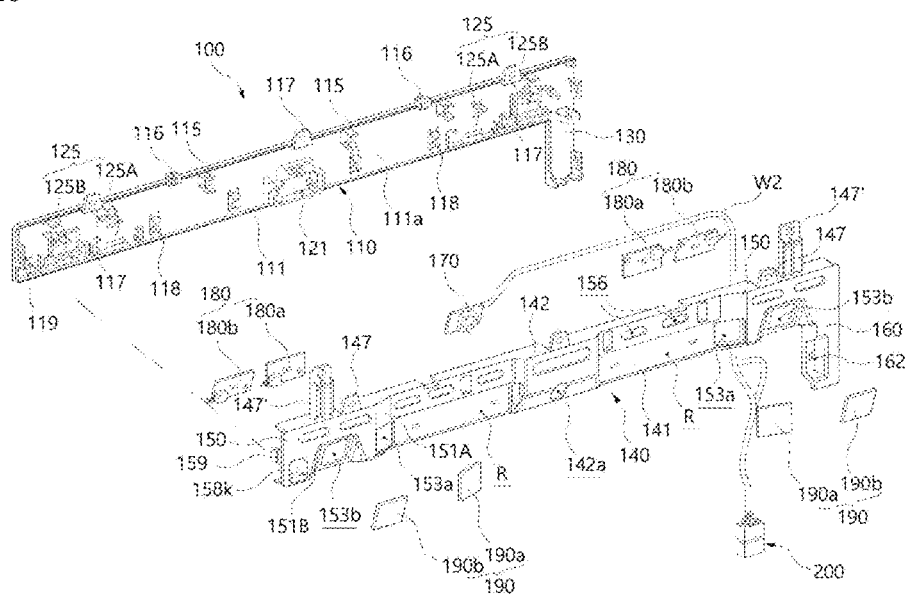
FIG. 29 is an exploded perspective view illustrating an example of a first housing and a second housing of the image acquisition module.

Referring to FIGS. 29 and 30, the plurality of the wire holders 115 may be disposed in the transverse direction. Accordingly, the connection wire W2 may also be fixed in the transverse direction. Each wire holder 115 may have roughly a tongs structure. In other words, a pair of protrusions (holder arms) may constitute one wire holder 115, and the connection wire W2 may be disposed between the pair of protrusions.

Figure 31:
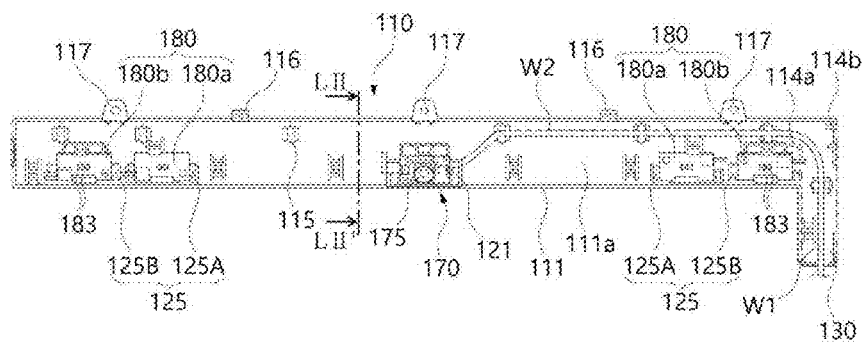
FIG. 31 is a plan view illustrating the image sensing device and the lighting device mounted to the first housing of the image acquisition module.

FIGS. 31 and 32 illustrate the connection wire W2 caught by and fixed to the plurality of wire holders 115. The wire holders 115 may be provided not only at the mounting plate 111 but also at the first connection body 130. To divide the wire holders 115 provided on the mounting plate 111, the wire holders 115 of the mounting plate 111 may be called first wire holders 115, and a wire holder 135 of the first connection body 130 may be called a second wire holder 135.

The first wire holders 115 and the second wire holder 135 may guide the connection wire W2 in different directions. In some implementations, the first wire holders 115 may guide the mounting direction of the connection wire W2 in the transverse direction, and the second wire holder 135 may guide the mounting direction of the connection wire W2 in the vertical direction.

Figure 33:
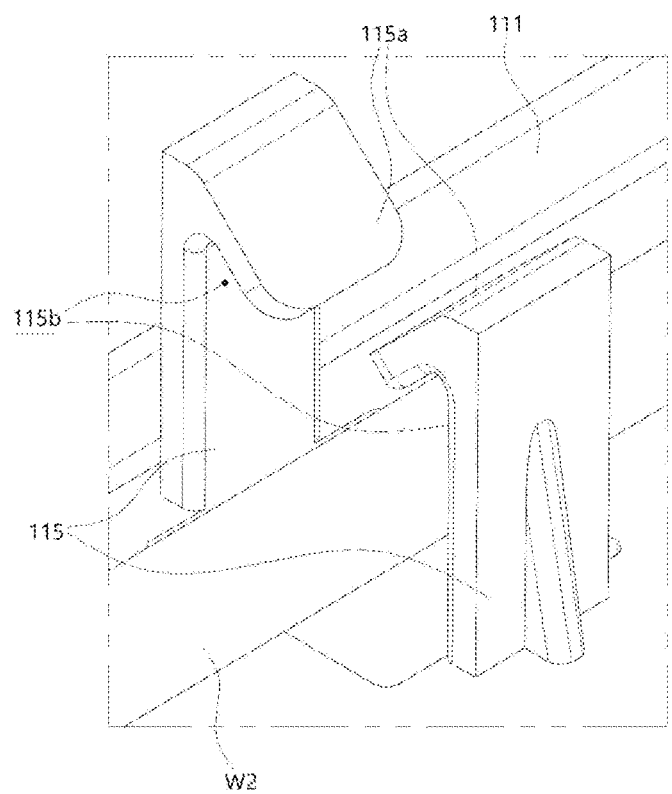
FIG. 33 is an enlarged perspective view illustrating a structure of a wire holder provided in the first housing of the image acquisition module.

Referring to FIG. 33, the first wire holders 115 may include a pair of holder arms. The pair of holder arms may have a symmetrical structure. The pair of holder arms may have a cantilever structure, thereby being elastically deformed. The connection wire W2 may be inserted between the pair of holder arms while enabling the pair of holder arms to be elastically deformed in a spreading direction.

At this point, upper surfaces of the pair of holder arms include respective holder inclined surfaces 115a, so the connection wire W2 may easily perform elastic deformation of the pair of holder arms. Reference numeral 115b indicates holding grooves 115b holding the connection wire W2 while preventing the connection wire W2 from being removed in a separation direction. Each holding groove 115b has a structure depressed upward, thereby preventing the removal of the connection wire W2.

Referring to FIGS. 29 and 30, the first housing 110 may include fixation clip parts 116. The fixation clip parts 116 may fix the image acquisition module 100 to the second front frame part 72 and the upper frame part 77. More specifically, the fixation clip parts 116 may temporarily hold the image acquisition module 100 to the upper frame part 77, before fixing the image acquisition module 100 to the upper frame part 77 with separate fasteners such as bolts, etc.

The fixation clip parts 116 may be provided at the mounting plate 111 of the first housing 110. In some implementations, the plurality of fixation clip parts 116 is disposed along an upper end portion of the mounting plate 111. The upper end portion of the mounting plate 111 may face the rear surface of the upper frame part 77, and the fixation clip parts 116 may be provided at the upper end portion of the mounting plate 111 facing the upper frame part 77.

Figure 35:
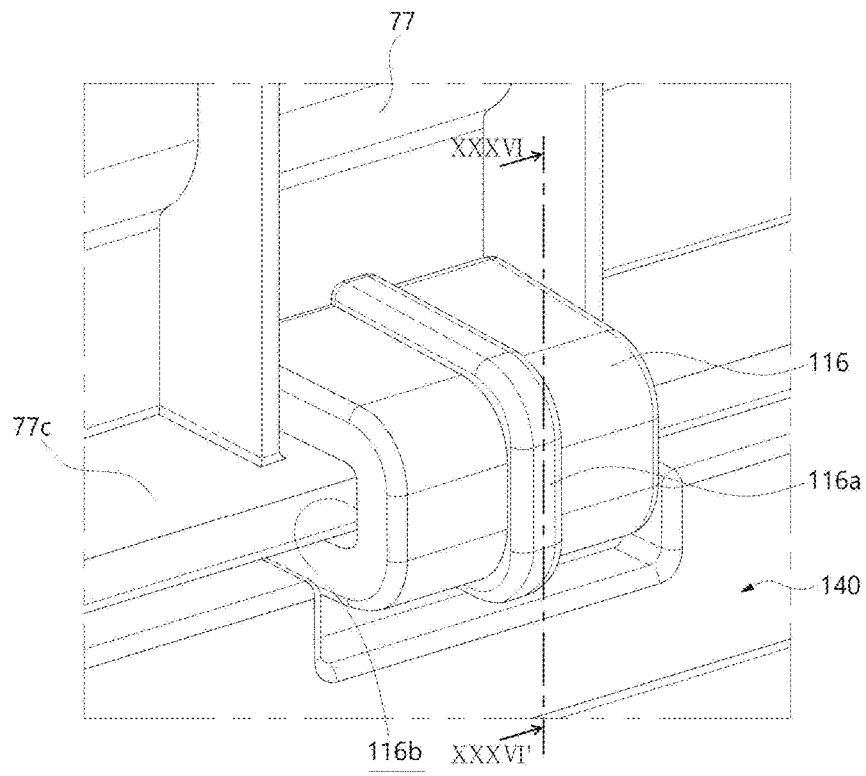
FIG. 35 is an enlarged perspective view illustrating an example structure of a fixation clip part.
Figure 36:
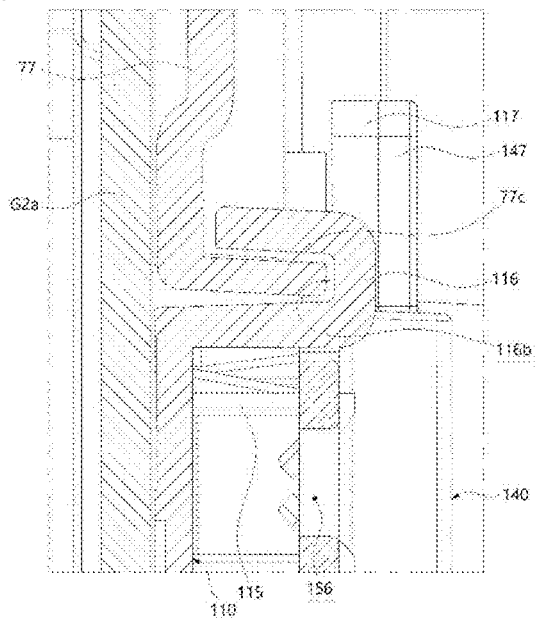
FIG. 36 is a sectional view taken along line XXXVI-XXXVI' of FIG. 35.

FIGS. 35 and 36 illustrate the structure of each fixation clip part 116. As shown in FIGS. 35 and 36, a clip body 116a constituting each fixation clip part 116 may have roughly a "U" shape. A first end of the clip body 116a is a fixed end connected to the mounting plate 111, and a second end may be a free end connected to the fixed end. Accordingly, the clip body 116a has a kind of cantilever structure, thereby being elastically deformed. A clip rib (no reference numeral assigned) for reinforcing strength may protrude on a surface of the clip body 116a.

The clip groove 116b may be recessed on each fixation clip part 116. Referring to FIG. 36, the clip groove 116b may have a structure that is open toward a rear surface of the second front panel G2a and recessed toward the opposite side. A fixation rib 77c protruding on the surface of the upper frame part 77 may be inserted into the clip groove 116b. When the fixation rib 77c is inserted into the clip groove 116b, the fixation rib 77c may be caught in the clip groove 116b. Accordingly, the mounting plate 111 and the entire image acquisition module 100 may be temporarily held by the upper frame part 77.

The clip groove 116b may be open in the transverse direction. In addition, the fixation rib 77c of the upper frame part 77 may be formed in the transverse direction. The fixation rib 77c may be inserted into the clip groove 116b from the front side of the clip groove 116b. When the fixation rib 77c is inserted in the clip groove 116b, the first housing 110 may be fixed to the upper frame part 77 in the height direction, i.e., the vertical direction based on FIG. 36.

Figure 34:
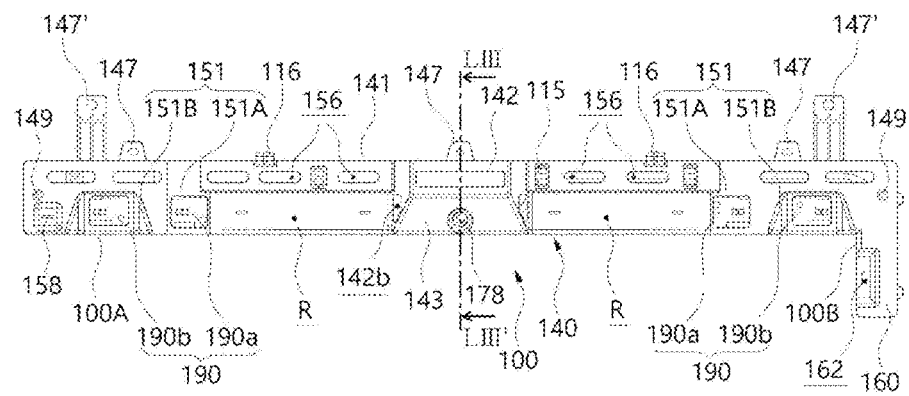
FIG. 34 is a plan view illustrating an example structure of the image acquisition module.

Then, a separate fastener such as a bolt, etc., is used to assemble the first housing 110 to the upper frame part 77. The first housing 110 may include a first fastening part 117 separately from the fixation clip parts 116. A fastener may be assembled to the first fastening part 117. As shown in FIG. 34, a plurality of first fastening parts 117 may be disposed along the upper end portion of the first housing 110.

At this point, the first housing 110 may overlap with a second fastening part 147 of the second housing 140 to be assembled with a fastener. Referring to FIG. 29, the image acquisition module 100 may include the second housing 140 at a location corresponding to the first housing 110. FIG. 36 illustrates an overlap state of the first fastening part 117 and the second fastening part 147. Then, after a fastener passes through the second fastening part 147 and the first fastening part 117 in order, the fastener may be assembled to the upper frame part 77.

Figure 37:
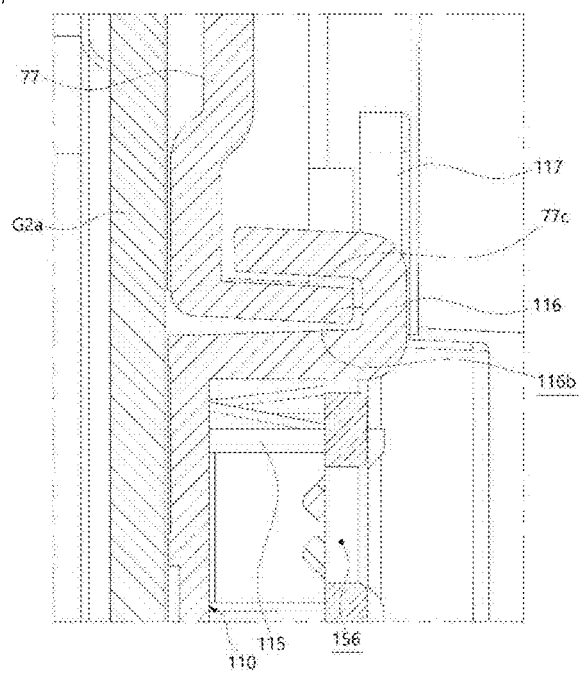
FIG. 37 is a sectional view illustrating an example of the fixation clip part.

FIG. 37 illustrates an example of the first housing 110 that includes the first fastening part 117, but the second fastening part 147 may be omitted in the second housing 140. Then, only the first housing 110 may be assembled to the upper frame part 77. The first housing 110 and the second housing 140 may be assembled to each other by a fastening hook 118 and a fastening protrusion 158, so the entire module housing 110, 140 may be mounted to the upper frame part 77 even without the second fastening part 147.

Figure 38:
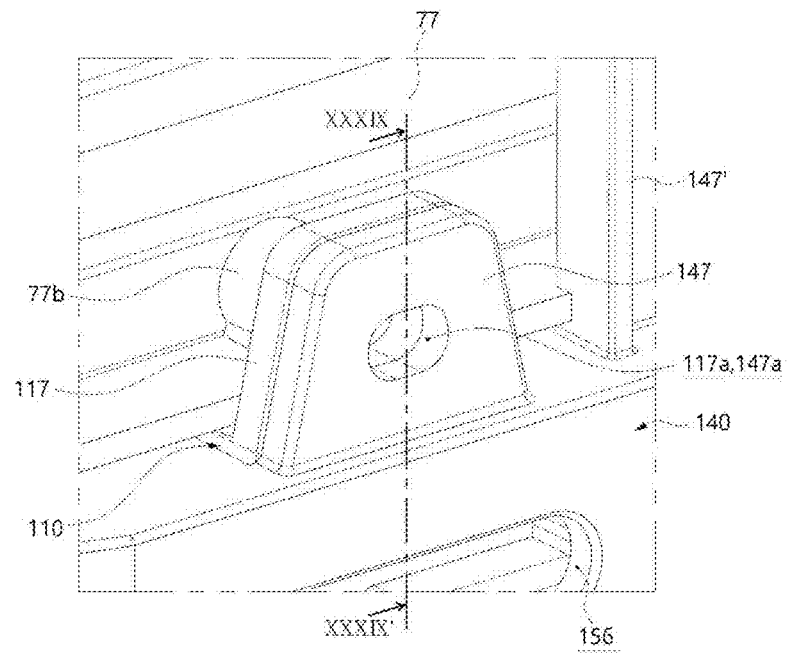
FIG. 38 is an enlarged perspective view illustrating an example mounting structure of the first housing and the second housing of the image acquisition module.
Figure 39:
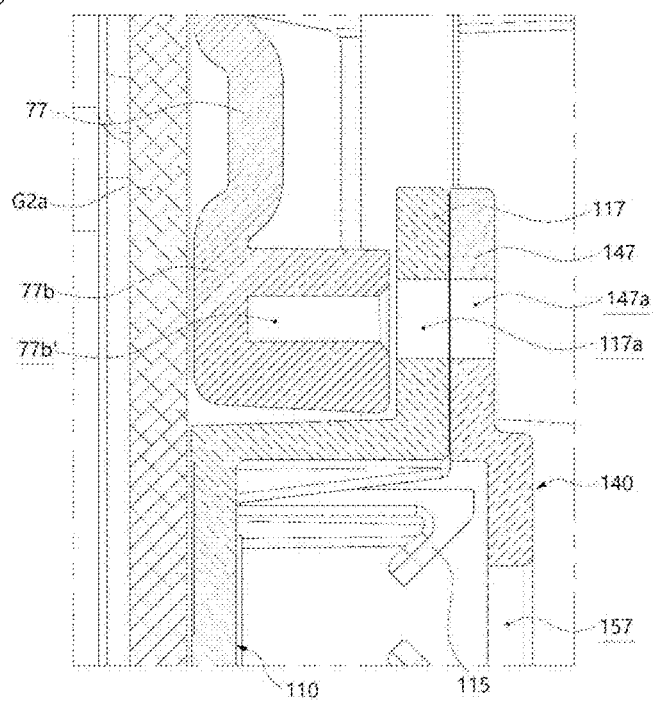
FIG. 39 is a sectional view taken along line XXXIX-XXXIX' of FIG. 38.

Referring to FIGS. 38 and 39, an example mounting structure of the module housing 110, 140 will be described. FIGS. 38 and 39 are enlarged views illustrating the structure of the first fastening part 117 and the second fastening part 147. As shown in FIG. 38, when the first fastening part 117 of the first housing 110 and the second fastening part 147 of the second housing 140 overlap with each other, a first fastening hole 117a of the first fastening part 117 and a second fastening hole 147a of the second fastening part 147 are connected to each other. Then, after a fastener passes through the second fastening hole 147a and the first fastening hole 117a in order, the fastener may be assembled to the upper fastening part 77b of the upper frame part 77.

FIG. 39 illustrates the first fastening hole 117a of the first housing 110, the second fastening hole 147a of the second housing 140, and an upper fastening hole 77b' of the upper fastening part 77b which are successively connected to each other. The first fastening hole 117a, the second fastening hole 147a, and the upper fastening hole 77b' may be disposed to be connected to each other in the longitudinal direction (transverse direction based on FIG. 39).

Furthermore, as shown in FIG. 39, a front surface of the first housing 110 faces the rear surface of the second front panel G2a, and the surface of the first housing 110 may adhere to the surface of the second front panel G2a by using a separate adhesive or adhesive tape. In presence, in FIG. 11, K1 and K2 indicate regions where the front surface of the first housing 110 and the rear surface of the second front panel G2a adhere to each other.

Figure 40:
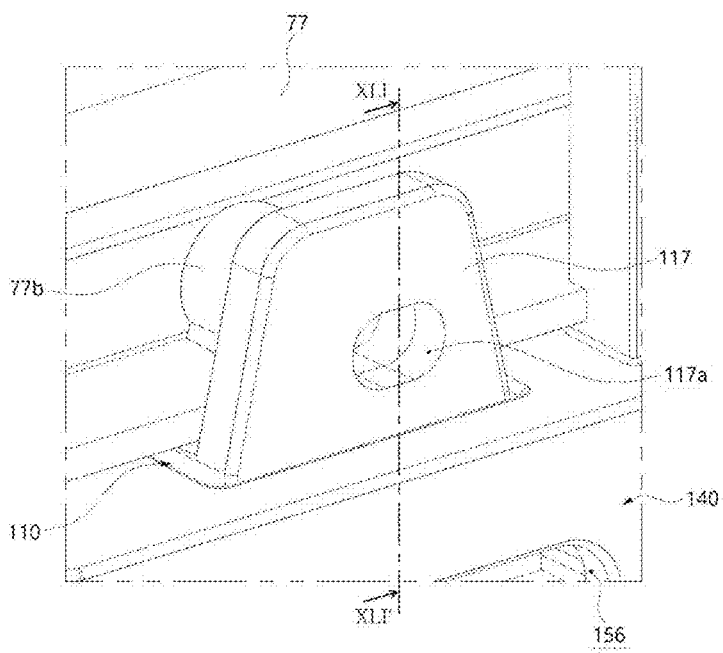
FIG. 40 is an enlarged perspective view illustrating an example mounting structure of the first housing and the second housing of the image acquisition module.
Figure 41:
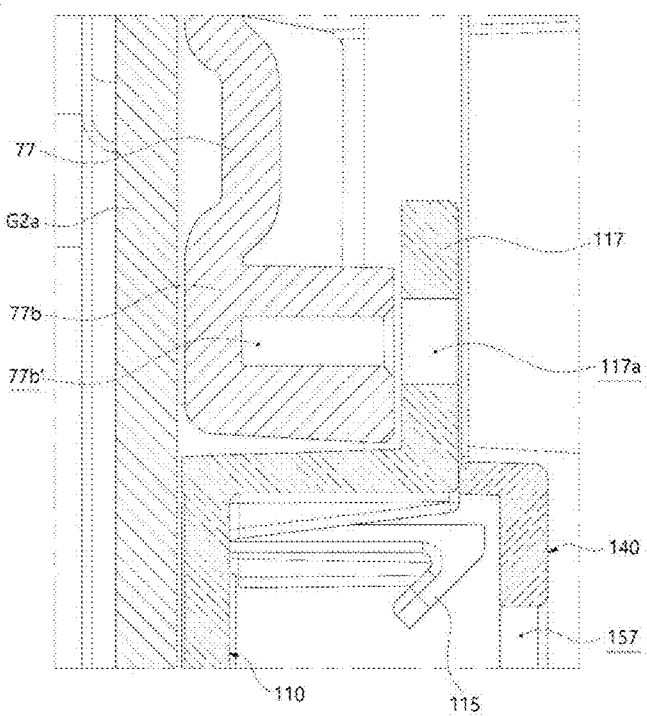
FIG. 41 is a sectional view taken along line XLI-XLI' of FIG. 40.

FIGS. 40 and 41 illustrate an example mounting structure of the module housing 110, 140. As shown in the drawings, the first housing 110 includes the first fastening part 117, but the assembled structure with the first fastening part 117 may be omitted in the second housing 140. Therefore, only the first fastening part 117 may be assembled to the upper fastening part 77b.

Referring to FIG. 41, the first fastening hole 117a of the first fastening part 117 may be arranged to be continued to the upper fastening hole 77b' of the upper fastening part 77b. A fastener may be assembled while successively passing through the first fastening hole 117a and the upper fastening hole 77b' continued to each other. Herein, one end of the second housing 140 may be brought into contact with a lower end of the first fastening part 117. In other words, one end of the second housing 140 pushes the lower end of the first fastening part 117, so that the second housing 140 and the first housing 110 may be brought into close contact with each other at the assembled portion.

Figure 42:
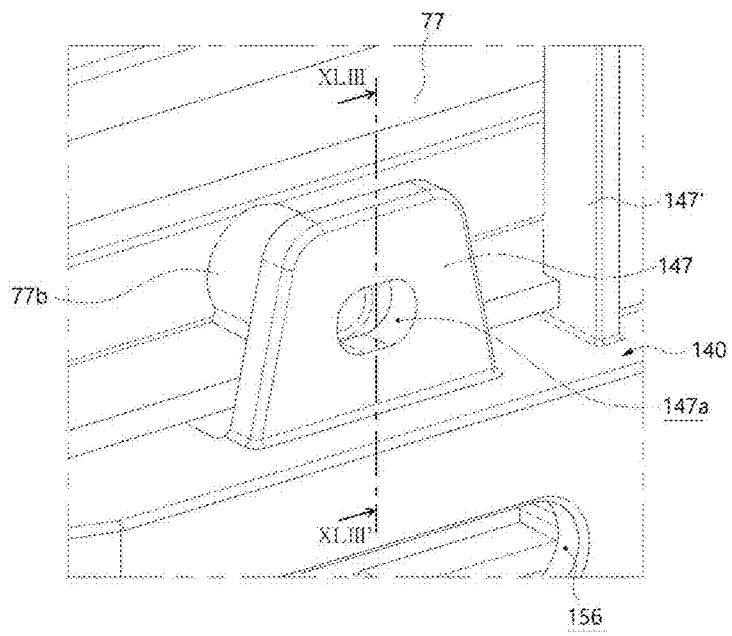
FIG. 42 is an enlarged perspective view illustrating an example mounting structure of the first housing and the second housing of the image acquisition module.
Figure 43:
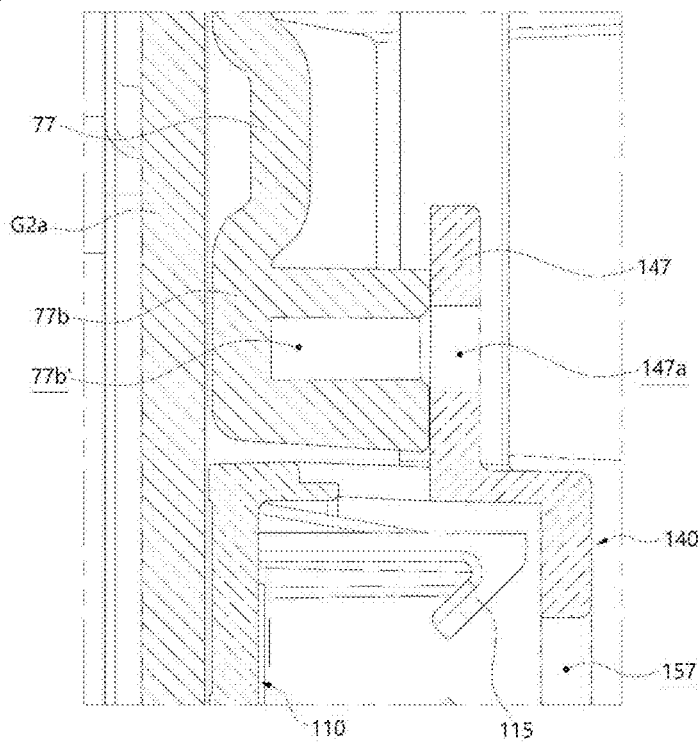
FIG. 43 is a sectional view taken along line XLIII-XLIII' of FIG. 42.

FIGS. 42 and 43 illustrate an example mounting structure of the module housing 110, 140. As shown in the drawings, the second housing 140 includes the second fastening part 147, but the assembled structure with the second fastening part 147 may be omitted in the first housing 110. Therefore, only the second fastening part 147 may be assembled to the upper fastening part 77b.

Referring to FIG. 43, the second fastening hole 147a of the second fastening part 147 may be arranged to be continued to the upper fastening hole 77b' of the upper fastening part 77b. A fastener may be assembled while successively passing through the second fastening hole 147a and the upper fastening hole 77b' continued to each other. At this point, since the upper portion of the first housing 110 is arranged between the upper portion of the second housing 140 and the upper frame part 77, when a fastener is assembled, both upper surfaces of the first housing 110 may be pressurized by the second housing 140 and the upper frame part 77, respectively. Accordingly, the first housing 110, the second housing 140, and the first housing 110 may be brought into forcibly close contact with each other at the assembled portion.

Figure 44:
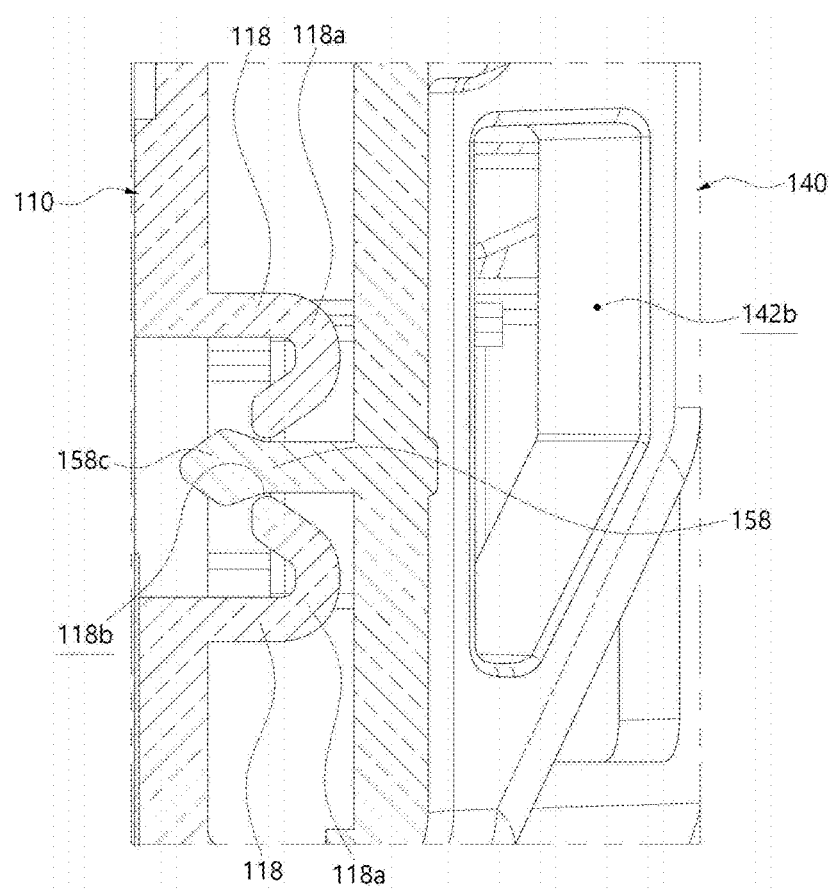
FIG. 44 is a sectional view illustrating an example of an assembling structure of the first housing and the second housing.
Figure 45:
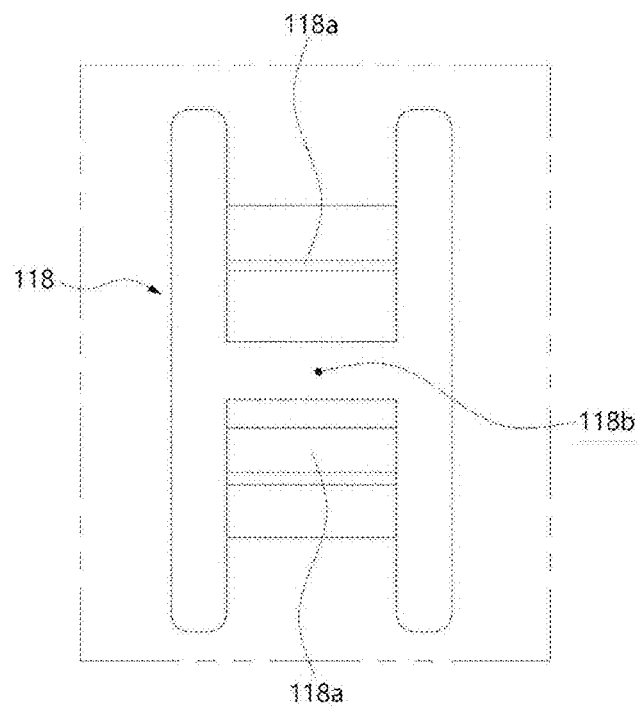
FIG. 45 is a plan view illustrating an example structure of fastening hooks in the assembling structure of the first housing and the second housing.
Figure 46:
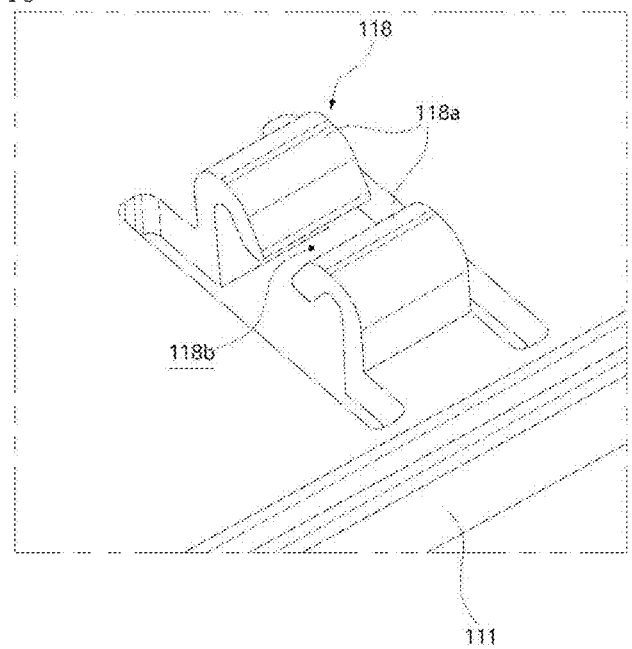
FIG. 46 is a perspective view illustrating the structure of the fastening hooks in the assembling structure of the first housing and the second housing.

FIGS. 44 to 50 illustrate the assembled structure of the module housing 110, 140. Herein, the assembled structure of the module housing 110, 140 means a structure of assembly between the first housing 110 and the second housing 140. Referring to FIG. 44, the first housing 110 may include the fastening hook 118. The fastening protrusion 158 provided at the second housing 140 may be inserted into the fastening hook 118. When the fastening protrusion 158 is inserted into the fastening hook 118, the second housing 140 may be coupled to the first housing 110.

Referring to FIG. 30, the fastening hook 118 may protrude on a surface of the first housing 110. The fastening hook 118 may protrude on the first housing 110 toward the second housing 140. In some implementations, a plurality of fastening hooks 118 is provided at the first housing 110. The plurality of fastening hooks 118 may be arranged to be spaced apart from each other.

The plurality of fastening hooks 118 may be disposed at locations closer to the lower end of the first housing 110 than the fixation clip parts 116. In other words, the fastening hooks 118 may be disposed at the first housing 110 at a different height from the fixation clip parts 116. Then, the fixation clip parts 116 and the fastening hooks 118 may take charge of mounting of the module housing 110, 140 and assembly between the two housings at different heights.

Referring to FIGS. 45 and 46 again, each fastening hook 118 may include a pair of hook bodies 118a. The pair of hook bodies 118a may have a symmetric structure. In some implementations, the pair of hook bodies 118a has a cantilever structure in which an upper end portion extends downward. The pair of hook bodies 118a is disposed to be spaced apart from each other, and a catching space 118b may be formed between the pair of hook bodies 118a. In the process of inserting the fastening protrusion 158 of the second housing 140 into the catching space 118b, the pair of hook bodies 118a may be elastically deformed in directions in which the hook bodies move away from each other.

Figure 47:
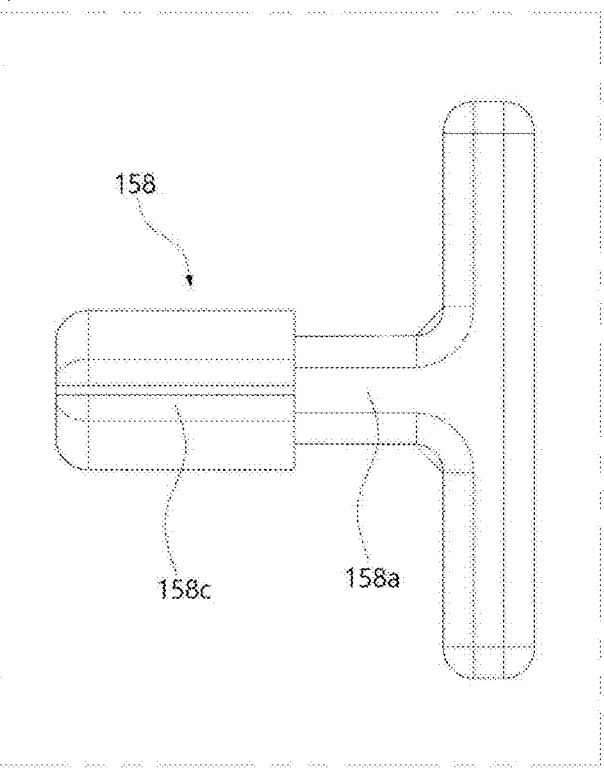
FIG. 47 is a plan view illustrating an example structure of a fastening protrusion in the assembling structure of the first housing and the second housing.
Figure 48:
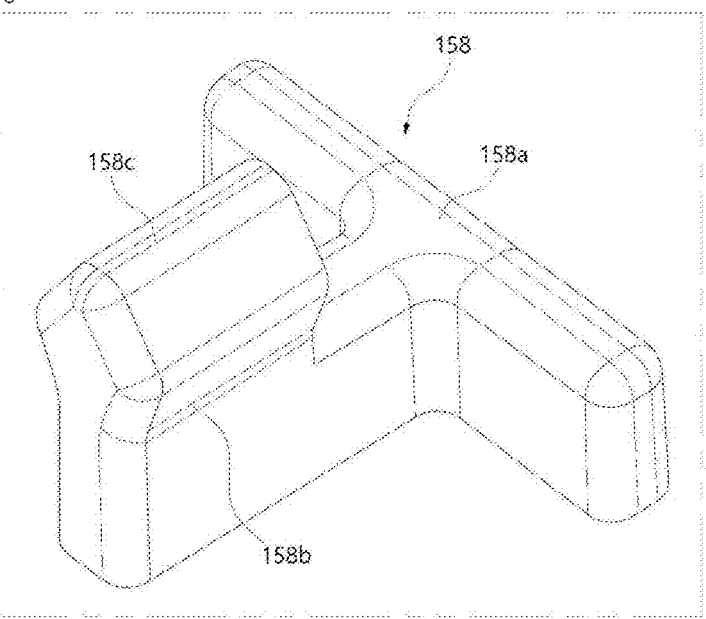
FIG. 48 is a perspective view illustrating the structure of the fastening protrusion in the assembling structure of the first housing and the second housing.

For convenience, in describing the fastening protrusion 158 first, FIGS. 47 and 48 illustrates the structure of the fastening protrusion 158. As shown in the drawings, the fastening protrusion 158 may include a fastening base 158a protruding on a surface of the second housing 140. The fastening base 158a protrudes on the surface of the second housing 140 and may include two or more ribs extending in different directions. In some implementations, the fastening base 158a may be roughly shaped into a "T" shape. With the structure, the fastening base 158a may improve the entire strength of the fastening protrusion 158.

The fastening base 158a may include a protrusion body 158b. The protrusion body 158b may protrude on the fastening base 158a toward the first housing 110. Based on the plan view like FIG. 47, the region of the fastening base 158a may be formed larger than the region of the protrusion body 158b. In other words, it may be understood that the protrusion body 158b is provided only at a partial region of the fastening base 158a.

A terminal end of the protrusion body 158b may include a fastening head 158c. The fastening head 158c may include a portion wider than the protrusion body 158b. The fastening head 158c is a portion inserted between the pair of hook bodies 118a.

Figure 49:
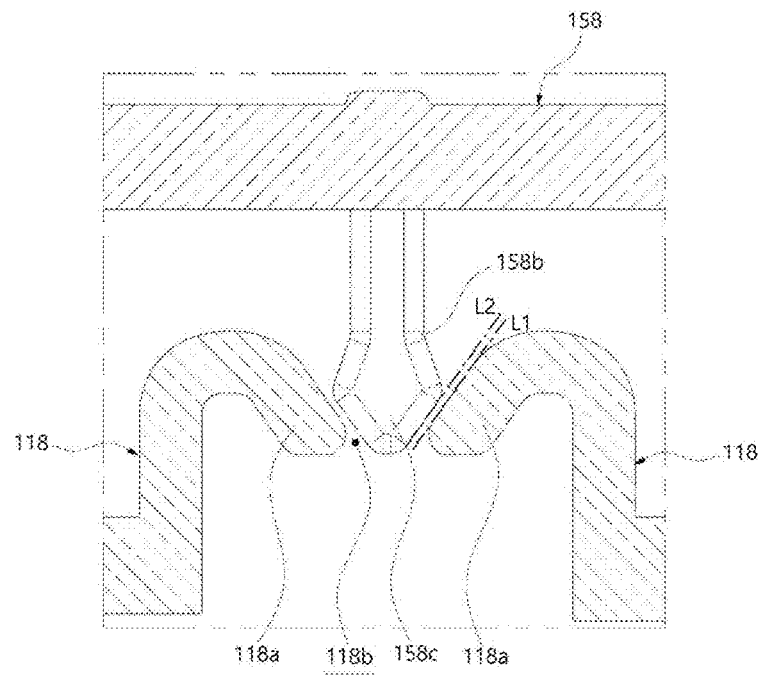
FIGS. 49 to 50 are sequence views successively illustrating an example of an assembling process of the assembling structure of the first housing and the second housing.
Figure 50:
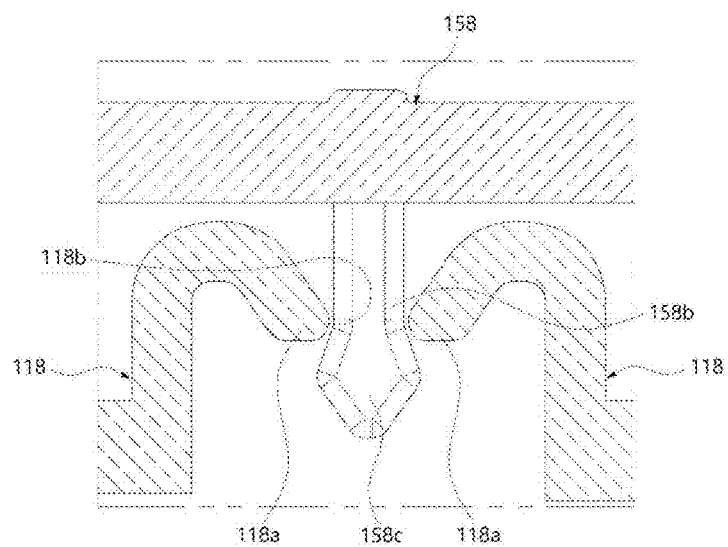

FIGS. 49 and 50 illustrate a state in which the fastening protrusion 158 is coupled to the fastening hook 118. FIG. 49 illustrates that the fastening head 158c of the fastening protrusion 158 is inserted between the pair of hook bodies 118a. At this point, an inclined surface L1 of each hook body and an inclined surface L2 of the fastening head 158c may be parallel to each other or may be formed to be inclined in the same direction.

As shown in FIG. 50, when the fastening head 158c is fully burrowed between the hook bodies 118a, the pair of hook bodies 118a may wrap one end of the fastening head 158c. Therefore, the fastening head 158c is not moved in a separation direction from the hook bodies 118a and may maintain the coupled state. Accordingly, in some implementations, the first housing 110 and the inner housing may be assembled without a separate fastener.

In some implementations, referring to FIG. 29 again, a fastening piece 119 may be provided at an outer edge of the first housing 110. The fastening piece 119 may be coupled to a fastening arm 159 provided at an outer edge of the second housing 140. When an end portion of the fastening arm 159 is inserted into a hole of the fastening piece 119, the second housing 140 may be assembled to the first housing 110.

As described above, the fastening piece 119 and the fastening arm 159 may assemble the first housing 110 and the second housing 140 with the fastening hook 118 and the fastening protrusion 158. In some implementations, the fastening piece 119 may be disposed at a portion of the first housing 110 further outside the fastening hook 118. Likewise, the fastening arm 159 may be disposed at an outer portion of the second housing 140 further than the fastening protrusion 158.

As shown in FIGS. 29 and 30, the image sensing device 170 and the lighting device 180 may be mounted to the first housing 110. The first housing 110 may include an image sensor mounting part 121 to which the image sensing device 170 is mounted. The first housing 110 may include a lighting mounting part 125 to which the lighting device 180 is mounted. The image sensor mounting part 121 and the lighting mounting part 125 may be spaced apart from each other. In some implementations, it may be understood that the module flow path part R may be provided at a location between the image sensor mounting part 121 and the lighting mounting part 125.

As another example, the image sensor mounting part 121 and the lighting mounting part 125 may be separated from each other. In other words, the first housing 110 may not be provided into a connected one body but into a plurality of bodies with the image sensor mounting part 121 and the lighting mounting part 125 separated from each other.

When looking at the image sensor mounting part 121, the image sensor mounting part 121 may be provided at the central portion of the first housing 110. Then, the image sensing device 170 mounted to the image sensor mounting part 121 may face the central portion of the lower storage space 41. The image sensor mounting part 121 may be provided at a location close to a lower end portion of the first housing 110. Accordingly, the image sensing device 170 mounted to the image sensor mounting part 121 may be disposed closer to the lower storage space 41. As another example, the image sensor mounting part 121 may not be located at the central portion of the first housing 110, but at a location deviating from the central portion. As another example, the image sensor mounting part 121 may not be located at the lower end portion of the first housing 110, but at a central middle portion or an upper portion.

The image sensor mounting part 121 may include a portion protruding from the surface of the first housing 110, and a portion relatively recessed by the protruding portion. As described above, the image sensing device 170 may be stored in the recessed portion on the image sensor mounting part 121. The figure as described above is illustrated in FIG. 30.

Figure 51:
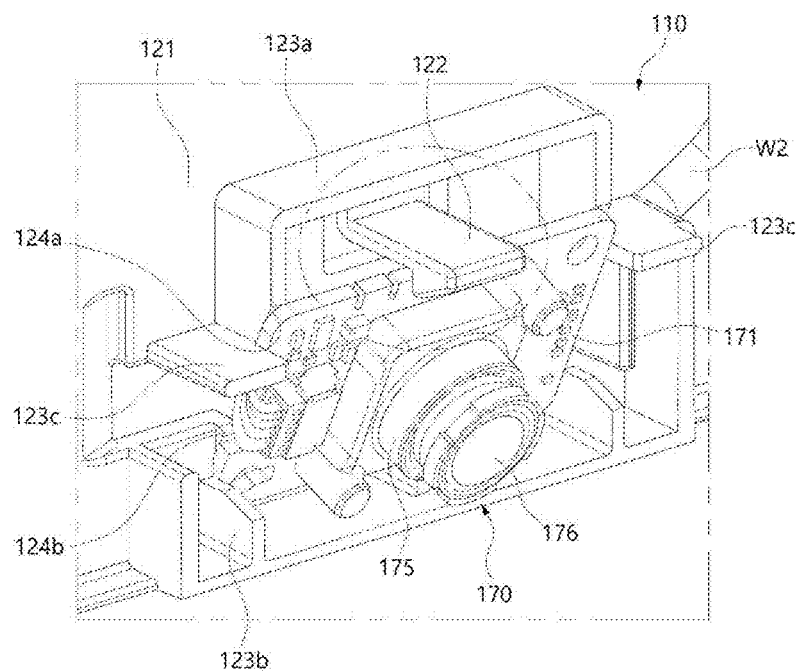
FIG. 51 is a perspective view illustrating the first housing equipped with the image sensing device.

Referring to FIGS. 51 to 54, the image sensor mounting part 121 will be described in detail. FIG. 51 illustrates the image sensing device 170 mounted to the image sensor mounting part 121. Based on the drawing, although the image sensing device 170 is exposed, the second housing 140 is assembled in front of the image sensing device 170, so the remaining parts of the image sensing device 170 excluding an image sensor 175 of the image sensing device 170 may be covered. Also, the image sensor 175 may be covered by the sensor protective cover 178 described below.

The image sensor mounting part 121 may include a sensor holding hook 122. The sensor holding hook 122 may hook and fix a sensor substrate 171 constituting the image sensing device 170. The sensor holding hook 122 may protrude on an upper end of the image sensor mounting part 121.

For convenience, describing the structure of the image sensing device 170 first, the image sensing device 170 may include the sensor substrate 171 and the image sensor 175 mounted to the sensor substrate 171. The image sensor 175 may acquire an image by a lens. Herein, the image sensor 175 may be a charge coupled device (CCD) image sensor or a complementary metal oxide semiconductor (CMOS) image sensor which convert an optical signal to an electrical signal. The sensor protective cover 178 described below may be understood as a part of the image sensing device 170.

The sensor substrate 171 may be supplied with power by being connected to the connection wire W2. The image information acquired by the image sensor 175 may be transmitted to the controller 21, 23, 25 via the connection wire W2. Herein, since the connection wire W2 is connected to the connector module 200, it may be understood that the sensor substrate 171 is connected to the main controller by the connector module 200 as a medium.

Figure 52:
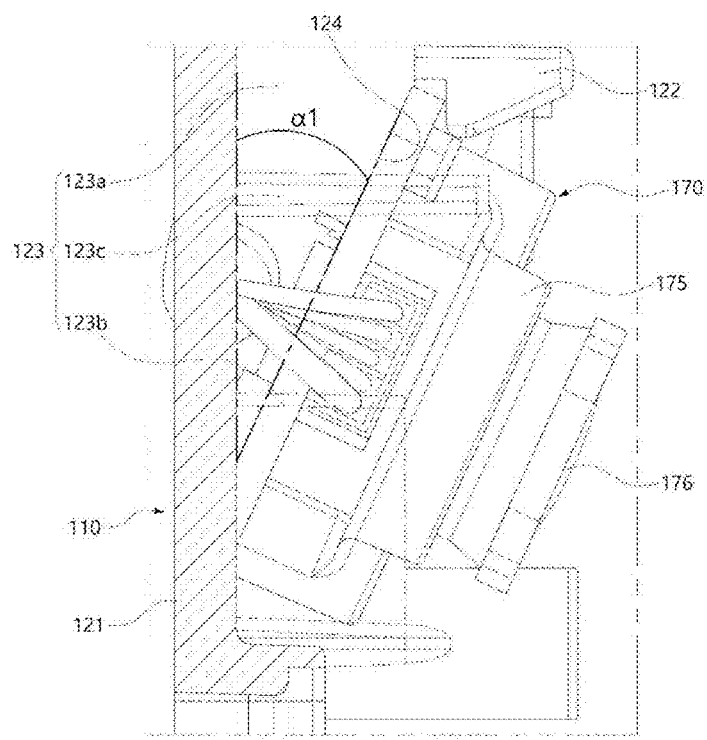
FIG. 52 is a side view illustrating the first housing equipped with the image sensing device.

Describing the image sensor mounting part 121, the image sensor mounting part 121 may include a sensor mounting fence 123 (referring to FIG. 52). The sensor mounting fence 123 may protrude on a surface 111a of the mounting plate 111. The sensor mounting fence 123 may enclose the space where the image sensing device 170 is disposed. The sensor mounting fence 123 may have a structure covering the image sensing device 170.

As shown in FIG. 52, the sensor mounting fence 123 may have a structure protruding less than the lens 176 of the image sensor 175 constituting the image sensing device 170. The structure is to prevent the sensor mounting fence 123 from interfering with a view angle of the image sensor 175.

The sensor mounting fence 123 may include a main fence 123a of a rough rectangular frame shape. The main fence 123a may surround an upper portion of the sensor substrate 171. The sensor holding hook 122 may be disposed at the main fence 123a.

The sensor mounting fence 123 may include a first sensor guide 123b. The first sensor guide 123b may protrude on a lower portion of the main fence 123a in the same direction as the main fence 123a. The first sensor guide 123b may support each portion of a lower end of the sensor substrate 171. The first sensor guide 123b may support a lower end portion of the image sensing device 170, and guide an installation direction of the image sensing device 170.

The sensor mounting fence 123 may include a second sensor guide 123c. The second sensor guide 123c may protrude at a location higher than the first sensor guide 123b in the same direction as the main fence 123a. The second sensor guide 123c may support each portion of the central portion of the sensor substrate 171. The second sensor guide 123c may support either side portion of a middle portion of the image sensing device 170 and guide the installation direction of the image sensing device 170 with the first sensor guide 123b. Herein, the first sensor guide 123b and the second sensor guide 123c may be understood as a part of the sensor mounting fence 123.

The sensor mounting fence 123 may include a sensor inclination guide 124a, 124b. The sensor inclination guide 124a, 124b may guide the image sensing device 170 to be mounted to the image sensor mounting part 121 at a predetermined inclination, more specifically, at a downward inclination. Referring to FIG. 51, the sensor inclination guide 124a, 124b may have an inclined surface structure, thereby supporting a lower surface of the sensor substrate 171 to be inclined. In some implementations, the sensor inclination guide 124a, 124b may include two sensor inclination guides 124a and 124b. A first sensor inclination guide 124a and a second sensor inclination guide 124b may support the sensor substrate 171 at different heights.

FIG. 52 illustrates the image sensing device 170 mounted at an inclined angle. The image sensing device 170 may be disposed to be inclined downward at an angle of al based on a vertical direction. Herein, the downward inclined direction is a direction rotated clockwise based on FIG. 52. For this structure, the sensor mounting fence 123 may include the first sensor inclination guide 124a and the second sensor inclination guide 124b supporting the sensor substrate 171.

Figure 53:
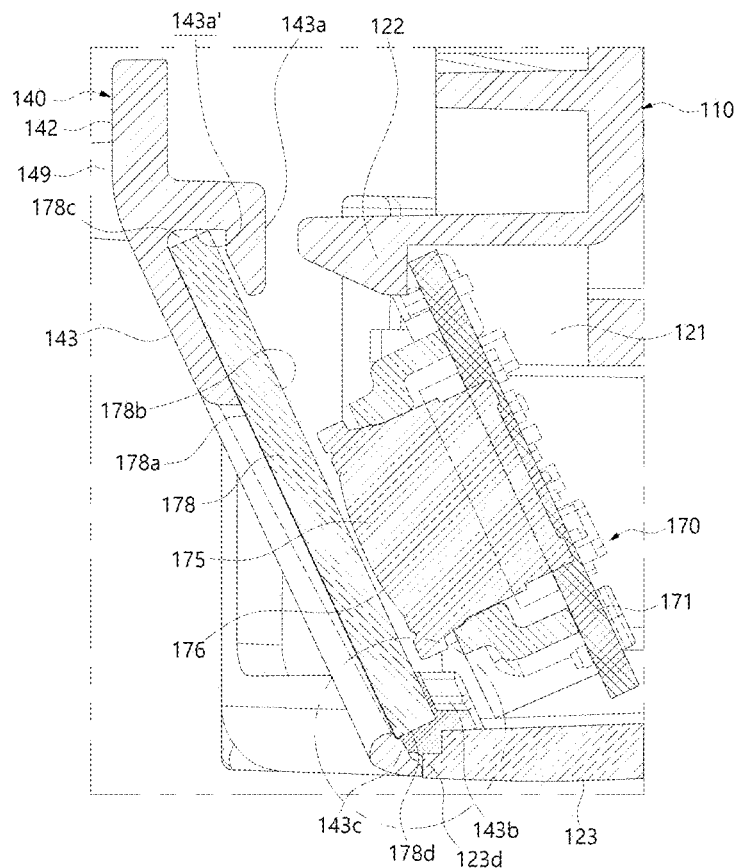
FIG. 53 is a sectional view taken along line LIII-LIII' of FIG. 34.

Referring to FIG. 53 as a sectional view, FIG. 53 illustrates the image sensing device 170 at a viewpoint opposite to FIG. 52. As shown in the drawing, the upper end portion of the sensor substrate 171 constituting the image sensing device 170 may be fixed by being caught by the sensor holding hook 122. Although not shown in FIG. 53, a rear surface of the sensor substrate 171 may be supported in a direction inclined by the first sensor inclination guide 124a and the second sensor inclination guide 124b described above.

For convenience, the sensor protective cover 178 will be described first. The sensor protective cover 178 may be provided in front of the lens 176 provided in the image sensor 175. The sensor protective cover 178 may be disposed to be spaced apart at a predetermined distance from the lens 176. The sensor protective cover 178 may protect the image sensor 175 including the lens 176. The sensor protective cover 178 may shield the heat of the second storage space 41 so that the heat is not directly transmitted to the image sensor 175. Furthermore, the sensor protective cover 178 may prevent the lens 176 from being brought into contact with foreign materials.

In some implementations, the sensor protective cover 178 may be disposed in parallel to the image sensor 175 in an inclined direction. More specifically, when the first housing 110 and the second housing 140 are assembled, the image sensor 175 and the sensor protective cover 178 may face each other.

The sensor protective cover 178 may be made of a transparent platy material. The sensor protective cover 178 may be disposed at the second housing 140. An inclination plate 143 may be provided at a sensor cover 142 of the second housing 140. A part of a front surface of the sensor protective cover 178 may be brought into close contact with at a rear surface of the inclination plate 143.

Figure 55:
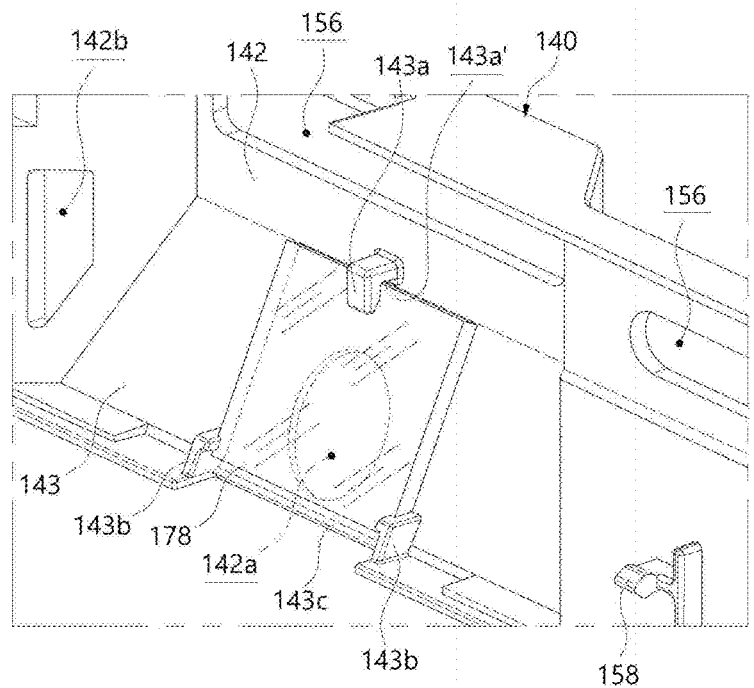
FIG. 55 is a perspective view illustrating the second housing equipped with a protective cover of the image sensing device.

An upper end portion of the sensor protective cover 178 may be caught by a cover holding arm 143a provided at the second housing 140. The cover holding arm 143a may catch the upper end portion of the sensor protective cover 178, thereby preventing the upper end of the sensor protective cover 178 from being separated clockwise based on FIG. 53. Referring to FIG. 55, the cover holding arm 143a may catch a middle portion of the upper end portion of the sensor protective cover 178.

Figure 54:
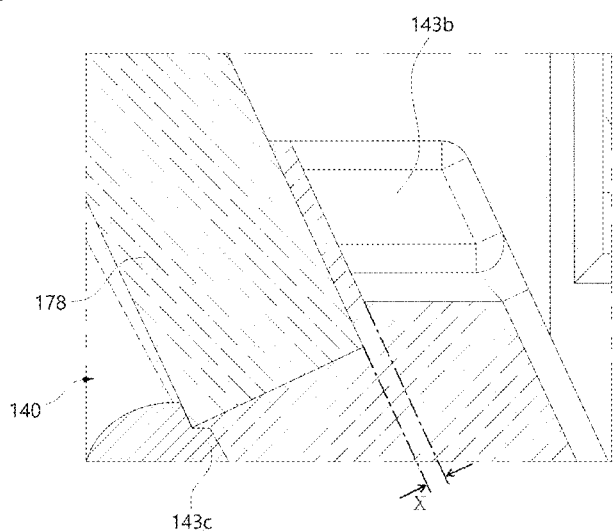
FIG. 54 is a sectional view enlarging and illustrating part C of FIG. 53.

Furthermore, a cover guide end 143b may be provided at a lower end of either side portion of the sensor protective cover 178. The cover guide end 143b may be provided in the second housing 140. The cover guide end 143b may support the lower end of either side portion of the sensor protective cover 178, thereby preventing separation of the sensor protective cover 178. Referring to FIG. 54, by the cover guide end 143b, the sensor protective cover 178 may be supported to be rotated counterclockwise at a predetermined angle based on the vertical direction.

Herein, the cover guide end 143b may support two different surfaces of the sensor protective cover 178 at the same time. In some implementations, the cover guide end 143b has a rough "]" shaped cross-sectional region and may support the two different surfaces of the sensor protective cover 178 at the same time. In addition, the sensor protective cover 178 may be coupled to a pair of cover guide ends 143b while sliding between the pair of cover guide ends 143b.

Referring to FIG. 54, a second surface 178b of the sensor protective cover 178 facing the lens 176 of the image sensor 175 may be disposed to face a part of each cover guide end 143b, and the second surface 178b of the sensor protective cover 178 and each cover guide end 143b may be spaced apart at a predetermined distance "x" from each other. Accordingly, when the sensor protective cover 178 is coupled to the pair of cover guide ends 143b while sliding between the pair of cover guide ends, a fastening force may be provided.

The pair of cover guide ends 143b may be disposed at respective side portions of a cover assembly opening 143d (referring to FIG. 55) at which the sensor protective cover 178 is assembled. Accordingly, the pair of cover guide ends 143b may guide the sensor protective cover 178 at an assembly initial phase when a first end portion 178c of the sensor protective cover 178 is inserted through the cover assembly opening 143d.

The lower end portion of the sensor protective cover 178 may be caught by a cover holding end 143c. The cover holding end 143c may be provided in the second housing 140. The cover holding end 143c may support the lower end portion of the sensor protective cover 178 to prevent the sensor protective cover 178 from being removed in a downward direction based on FIG. 55. The cover holding end 143c is formed with a low protruding height, so the sensor protective cover 178 is movable over the cover holding end 143c when it is mounted to the second housing 140.

Herein, as shown in FIG. 53, the first housing 110 may include a cover support end 123d supporting a second end portion 178d of the sensor protective cover 178 which is opposite to the first end portion 178c of the sensor protective cover 178. The cover support end 123d may protrude on a surface of the first housing 110 toward a surface of the second housing 140. When the first housing 110 and the second housing 140 are assembled, the cover support end 123d may be disposed at a lower portion of the cover holding end 143c.

The cover assembly opening 143d may be open in the vertical direction which is a height direction of the door panel G2. Furthermore, the cover holding end 143c may be disposed in the cover assembly opening 143d. Therefore, at the assembly initial phase when the first end portion 178c of the sensor protective cover 178 is inserted through the cover assembly opening 143d, the first end portion 178c of the sensor protective cover 178 may be moved over the cover holding end 143c.

Herein, an overlapped height between the cover holding end 143c and the second end portion 178d of the sensor protective cover 178 may be lower than an overlapped height between the cover support end 123d and the second end portion 178d of the sensor protective cover 178. Accordingly, at the assembly initial phase when the first end portion 178c of the sensor protective cover 178 is inserted through the cover assembly opening 143d, the first end portion 178c of the sensor protective cover 178 may be moved over the cover holding end 143c. In some examples, when the two housings 110 and 140 are assembled, the cover support end 123d catches the second end portion 178d of the sensor protective cover 178 to prevent separation of the sensor protective cover 178.

Figure 56:
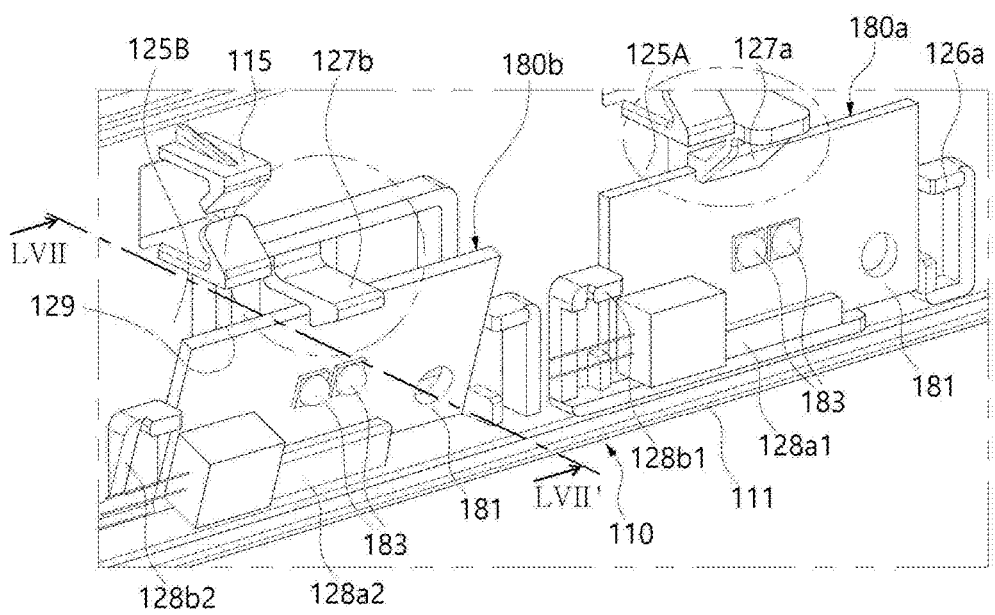
FIG. 56 is a perspective view illustrating the first housing equipped with the lighting device.

FIG. 56 illustrates the lighting mounting part 125 provided in the mounting plate 111 of the first housing 110. As shown in the drawing, the lighting mounting part 125 may include a first lighting mounting part 125A and a second lighting mounting part 125B. The first lighting part 180a may be disposed at the first lighting mounting part 125A, and the second lighting part 180b may be disposed at the second lighting mounting part 125B. The first lighting mounting part 125A and the second lighting mounting part 125B may be spaced apart in the transverse direction, i.e., the first direction.

Looking at the first lighting mounting part 125A, the first lighting mounting part 125A may be disposed in a location relatively closer to the image sensor mounting part 121 than the second lighting mounting part 125B. The first lighting part 180a may be mounted to the first lighting mounting part 125A. While the first lighting part 180a is mounted to the first lighting mounting part 125A, the second housing 140 is assembled to the first housing 110, so the second housing 140 may shield the first lighting part 180a. Since a first cover plate 190a described below is disposed at the second housing 140, the light emitting element 183 of the first lighting part 180a may illuminate the lower storage space 41 through the first cover plate 190a.

Figure 69:
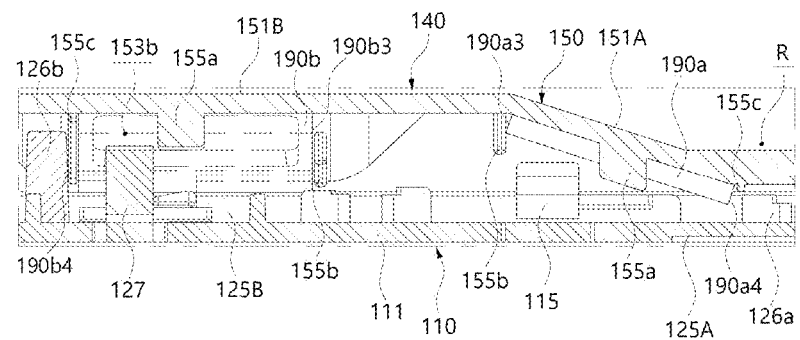
FIG. 69 is a sectional view taken along line LXIX-LXIX' of FIG. 34.
Figure 70:
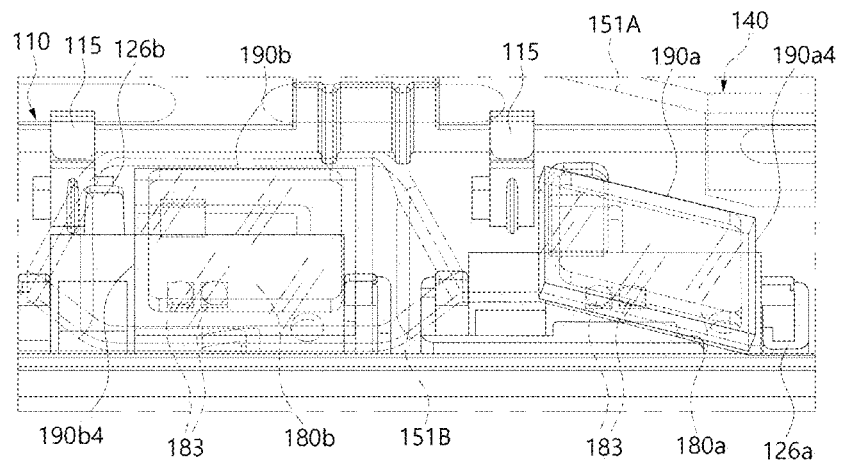
FIG. 70 is a penetration view illustrating an inner structure of the first housing, the second housing, and the lighting device.

Looking at the structure of the first lighting mounting part 125A, the first lighting mounting part 125A may include a first cover supporting arm 126a. The first cover supporting arm 126a may protrude on the first lighting mounting part 125A toward the second housing 140. The first cover supporting arm 126a may catch one end portion of the first cover plate 190a to prevent the first cover plate 190a from being separated from the second housing 140. First, the first cover plate 190a is mounted to the second housing 140, and it is relatively easy to separate the first cover plate 190a in a direction opposite to the assembled direction. In some examples, when the first housing 110 is assembled with the second housing 140, the first cover supporting arm 126a of the first housing 110 catches one end portion of the first cover plate 190a to prevent the first cover plate 190a from being separated opposite to the assembled direction. Referring to FIGS. 69 and 70, it is illustrated that the first cover supporting arm 126a protrudes to a location facing one end of the first cover plate 190a.

Referring to FIG. 56 again, the first lighting mounting part 125A may include a first lighting holding hook 127a. The first lighting holding hook 127a may catch and fix a lighting substrate 181 constituting the first lighting part 180a. The first lighting holding hook 127a has roughly a cantilever structure, and one end portion thereof may catch an edge portion of the lighting substrate 181. The first lighting holding hook 127a may protrude on an upper end of the first lighting mounting part 125A into the cantilever structure.

For convenience, describing the lighting device 180 first, the first lighting part 180a and the second lighting part 180b constituting the lighting device 180 may have the same structure. Based on the first lighting part 180a, as shown in FIG. 56, the first lighting part 180a may include the lighting substrate 181, and the light emitting element 183 mounted to the lighting substrate 181. The light emitting element 183 may be a component emitting light using a power source like LED lighting. As another example, the first lighting part 180a and the second lighting part 180b may have a connected structure. For example, the first lighting part 180a and the second lighting part 180b may share one lighting substrate 181. Furthermore, the cover plate 190 described below may be understood as a part of components constituting the lighting device 180.

Looking at the first lighting mounting part 125A again, a first lower holding step 128a1 may be provided on a lower portion of the first lighting mounting part 125A. The first lower holding step 128a1 may catch a lower end of the lighting substrate 181. The first lower holding step 128a1 may prevent the first lighting part 180a from being separated in a forward direction based on the drawing. Eventually, the upper end of the lighting substrate 181 may be caught by the first lighting holding hook 127a, and the lower end thereof may be caught by the first lower holding step 128a1. When the first lighting part 180a is mounted, the lower end of the lighting substrate 181 is caught by the first lower holding step 128a1, and then the upper end of the lighting substrate 181 is rotated to be moved over the first lighting holding hook 127a.

The first lighting mounting part 125A may include a first lighting guide fence 128b1. The first lighting guide fence 128b1 may be provided at either side of the first lighting mounting part 125A. The first lighting guide fence 128b1 may support either side surface of the lighting substrate 181 constituting the first lighting part 180a. The above-described first cover supporting arm 126a may have a structure further protruding from the first lighting guide fence 128b1. Otherwise, the first cover supporting arm 126a may be a part of the first lighting guide fence 128b1.

Although not shown in the drawing, the first lighting mounting part 125A may include an angle adjusting part to adjust a mounting angle of the first lighting part 180a. The angle adjusting part may be formed into an inclined surface at the first lighting guide fence 128b1. The angle adjusting part may support the lighting substrate 181 of the first lighting part 180a so that the first lighting part 180a faces the central portion of the lower storage space 41. In some implementations, the angle adjusting part is omitted, and the first lighting mounting part 125A is disposed to face the lower storage space 41. In other words, the first lighting mounting part 125A faces the right side based on FIG. 56.

Next, the second lighting mounting part 125B will be described. The second lighting mounting part 125B may be disposed at a location relatively farther from the image sensor mounting part 121 than the first lighting mounting part 125A. The second lighting part 180b may be mounted to the second lighting mounting part 125B. While the second lighting part 180b is mounted to the second lighting mounting part 125B, the second housing 140 is assembled to the first housing 110, so the second housing 140 may shield the second lighting part 180b. Since a second cover plate 190b described below is disposed at the second housing 140, the light emitting element 183 of the second lighting part 180b may illuminate the lower storage space 41 through the second cover plate 190b.

Looking at the structure of the second lighting mounting part 125B, the second lighting mounting part 125B may include a second cover supporting arm 126b. As shown in FIGS. 69 and 70, the second cover supporting arm 126b may protrude on the second lighting mounting part 125B toward the second housing 140. The second cover supporting arm 126b may catch one end portion of the second cover plate 190b to prevent the second cover plate 190b from being separated from the second housing 140. First, the second cover plate 190b is mounted to the second housing 140, and it is relatively easy to separate the second cover plate 190b in a direction opposite to the assembled direction. In some examples, when the first housing 110 is assembled with the second housing 140, the second cover supporting arm 126b of the first housing 110 catches one end portion of the second cover plate 190b to prevent the second cover plate 190b from being separated opposite to the assembled direction. For reference, in FIG. 56, the second cover supporting arm 126b is not expressed due to the angle.

Referring to FIG. 56 again, the second lighting mounting part 125B may include a second lighting holding hook 127b. The second lighting holding hook 127b may catch and fix a lighting substrate 181 constituting the second lighting part 180b. The second lighting holding hook 127b has roughly a cantilever structure, and one end portion thereof may catch an edge portion of the lighting substrate 181. The second lighting holding hook 127b may protrude on an upper end of the second lighting mounting part 125B into the cantilever structure.

A second lower holding step 128a2 may be provided on a lower portion of the second lighting mounting part 125B. The second lower holding step 128a2 may catch a lower end of the lighting substrate 181. The second lower holding step 128a2 may prevent the second lighting part 180b from being separated in a forward direction based on the drawing. Eventually, the upper end of the lighting substrate 181 may be caught by the second lighting holding hook 127b, and the lower end thereof may be caught by the second lower holding step 128a2. When the second lighting part 180b is mounted, the lower end of the lighting substrate 181 is caught by the second lower holding step 128a2, and then the upper end of the lighting substrate 181 is rotated to be moved over the second lighting holding hook 127b.

The second lighting mounting part 125B may include a second lighting guide fence 128b2. The second lighting guide fence 128b2 may be provided at either side of the first lighting mounting part 125A. The second lighting guide fence 128b2 may support either side surface of the lighting substrate 181 constituting the second lighting part 180b. The above-described second cover supporting arm 126b may have a structure further protruding from the second lighting guide fence 128b2. Otherwise, the second cover supporting arm 126b may be a part of the second lighting guide fence 128b2.

The second lighting mounting part 125B may include a lighting angle adjusting part 129 to adjust a mounting angle of the second lighting part 180b. The lighting angle adjusting part 129 may be formed into an inclined surface at the second lighting guide fence 128b2. The lighting angle adjusting part 129 may support the lighting substrate 181 of the second lighting part 180b so that the second lighting part 180b faces the central portion of the lower storage space 41.

Figure 57:
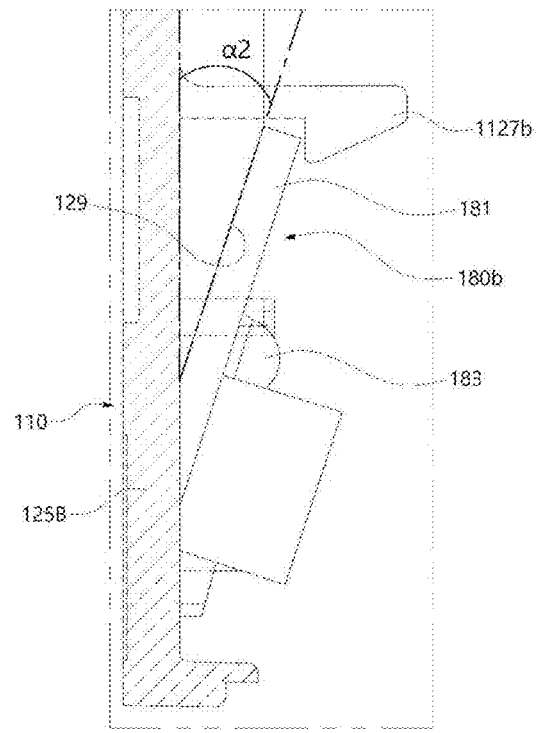
FIG. 57 is a sectional view taken along line LVII-LVII' of FIG. 56.

More specifically, the lighting angle adjusting part 129 may support the lighting substrate 181 of the second lighting part 180b so that the lighting substrate 181 is inclined downward. When the lighting angle adjusting part 129 supports a rear surface of the lighting substrate 181 in an inclined direction, the lighting substrate 181 may have an inclined angle so that the entire second lighting part 180b may face downward. Referring to FIG. 57, the second lighting part 180b is mounted to be inclined downward. As shown in the drawing, the lighting angle adjusting part 129 supports the rear surface of the lighting substrate 181 so that the second lighting part 180b is inclined downward at an angle of α2 based on the vertical direction. Herein, the downward inclined direction is a direction rotated clockwise based on FIG. 57. Accordingly, the light emitted angle by the second lighting part 180b may be inclined downward at the angle of α2. For reference, the angle of α2 may differ from the inclined angle of α1 of the image sensing device 170 described above. In some implementations, the angle of α2 is less than the angle of α1.

In some implementations, as shown in FIG. 30, the first housing 110 may include the first connection body 130. The connection wire W2 may be accommodated in the first connection body 130. A lower portion of the first connection body 130 may include a wire connection part 130a so that the connection wire W2 extends outward therethrough.

The first connection body 130 may include the second wire holder 135 having the same structure as each wire holder 115. The second wire holder 135 may guide the connection wire W2 in a different direction from the guiding direction of each wire holder 115, specifically, in the vertical direction.

Furthermore, the first connection body 130 may include a connection fastening hook 138 having the same structure as the fastening hook 118. The connection fastening hook 138 may be coupled to a connecting fastening protrusion 158 of the second housing 140 (referring to FIG. 59). The connecting fastening hook 138 has the same structure as the fastening hook 118, and a detailed description thereof will be omitted.

Herein, the connection fastening hook 138 and the second wire holder 135 may be disposed to be spaced apart from each other in the vertical direction, i.e., in the second direction. Based on FIG. 30, the connection fastening hook 138 is disposed at a relatively left side from the second wire holder 135. The structure is to enable the connection wire W2 to be guided to a relatively right side in the first connection body 130. Furthermore, when the connection fastening hook 138 and the second wire holder 135 are disposed as described above, as shown in FIG. 31, the connection fastening hook 138 may guide the connection wire W2 by itself.

Reference numeral 139 indicates a fastening piece structure to assemble the two housings 110 and 140, as with the fastening piece 119. The fastening piece 139 may be coupled to another fastening arm 159 (referring to FIG. 59) provided in a second connection body 150. When an end portion of the fastening arm 159 is inserted into a hole of the fastening piece 139, the second housing 140 may be assembled to the first housing 110.

Figure 58:
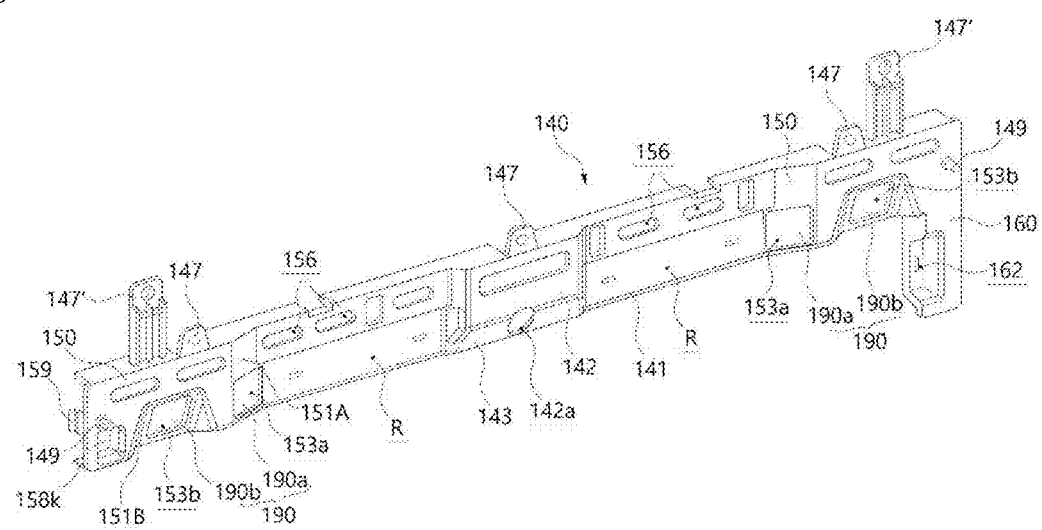
FIG. 58 is a perspective view illustrating an example structure of the second housing.

Next, the structure of the second housing 140 will be described with reference to FIG. 58. The second housing 140 may constitute the module housing 110, 140 with the first housing 110. The second housing 140 may have the structure corresponding to the first housing 110 to be assembled with the first housing 110.

The second housing 140 may be provided in a plurality of different directions. In some implementations, a portion formed in the first direction and a portion formed in the second direction are connected to each other to form the second housing 140. Herein, the portion formed in the first direction is a cover body 141, and the portion formed in the second direction is a second connection body 160. As another example, the second housing 140 may be formed only in the first direction or the second direction.

The second housing 140 may have roughly a thin plate structure. A first surface of the second housing 140 may face the first housing 110, and a second surface may face the second inner panel G2b. At this point, the first surface of the second housing 140 may cover the image sensing device 170 and the lighting device 180. The image sensing device 170 and the lighting device 180 may be disposed first in the first housing 110, and the second housing 140 is coupled to the first housing 110 to shield the image sensing device 170 and the lighting device 180.

The cover body 141 may include the sensor cover 142 and a lighting cover 151. The sensor cover 142 may be disposed in front of the image sensor mounting part 121 of the first housing 110, thereby covering the image sensor mounting part 121. Accordingly, a portion excluding the lens of the image sensing device 170 disposed at the image sensor mounting part 121 may be covered by the sensor cover 142. In some examples, as described above, when the sensor protective cover 178 is disposed at the second housing 140, the lens of the image sensing device 170 is also covered.

As another example, the sensor cover 142 and the lighting cover 151 may be separated from each other. In other words, the second housing 140 may not be provided into one connected body and be composed of a plurality of bodies with the sensor cover 142 and the lighting cover 151 separated from each other.

The sensor cover 142 may be disposed in a central portion of the cover body 141. On the sensor cover 142 as the center, a pair of lighting covers 151 may be disposed at both sides of the sensor cover 142. As another example, the sensor cover 142 may be disposed at a location biasing leftward or rightward, not at the central portion of the cover body 141. As another example, a plurality of sensor covers 142 may be provided at the cover body 141.

The module flow path part R may be provided between the sensor cover 142 and each lighting cover 151. The module flow path part R may have a shape formed by recessing a portion between the sensor cover 142 and each lighting cover 151 in the second housing 140. The module flow path part R may have a structure in which a part of the second housing 140 is recessed toward the first housing 110.

Describing the sensor cover 142, a sensing hole 142a may be open in the sensor cover 142. The sensing hole 142a may be disposed in front of the lens of the image sensing device 170. The sensing hole 142a may be maintained in a penetrated structure or be covered with the sensor protective cover 178. The sensing hole 142a may be disposed at a lower portion of the sensor cover 142.

More specifically, the sensor cover 142 may include the inclination plate 143. In some implementations, the inclination plate 143 may be an inclined plate structure formed at the lower portion of the sensor cover 142. A part of a front surface of the sensor protective cover 178 may be brought into close contact with at a rear surface of the inclination plate 143. The sensing hole 142a may be provided in the inclination plate 143.

The inclination plate 143 may have a structure inclined downward toward the bottom of the lower storage space 41. The inclination plate 143 is disposed on the second cooling flow path A2, thereby interfering the air flowing along the second cooling flow path A2. The image sensing device 170 emitting relatively high temperature heat may be disposed in a direction reducing the second cooling flow path A2 by the inclination plate 143. The inclination plate 143 may be efficiently cooled due to the wide contact region with external air. Accordingly, heat dissipation of the image sensing device 170 disposed inside the inclination plate 143 may be efficiently performed. A surface of the inclination plate 143 may be a heat dissipation surface.

Figure 59:
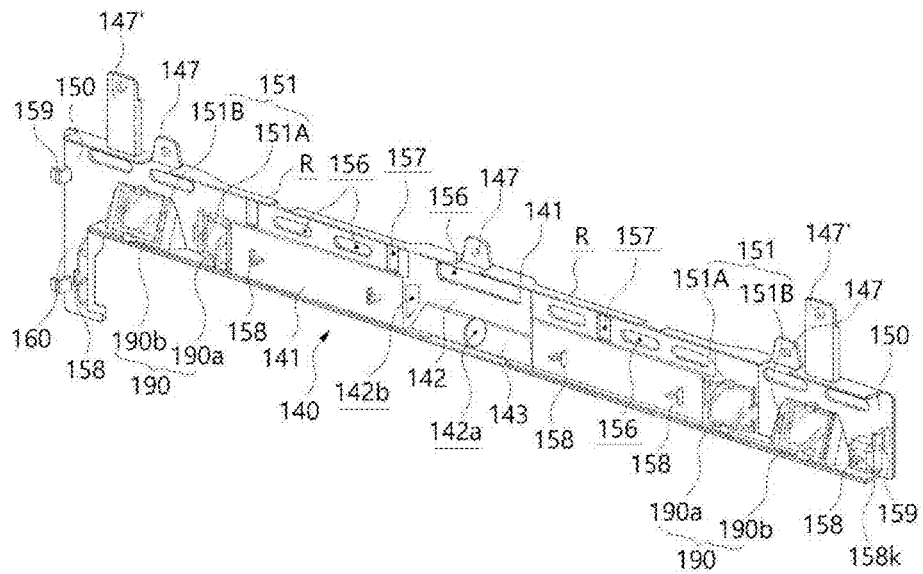
FIG. 59 is a perspective view illustrating the structure of the second housing at a different angle from FIG. 58.

Referring to FIG. 59, to efficiently cool the image sensing device 170, a sensor cooling hole 142b may be open on either side of the inclination plate 143. The sensor cooling hole 142b may be formed by penetrating the inclination plate 143. The sensor cooling hole 142b may be provided on either side with the sensing hole 142a as the center. The sensor cooling hole 142b may be open in a different direction from the sensing hole 142a, more specifically, sideways.

The cover body 141 may include the second fastening part 147. The second fastening part 147 may be provided on an upper end portion of the cover body 141. The second fastening part 147 may be disposed at a location corresponding to the first fastening part 117 of the first housing 110. The second fastening part 147 may be assembled to the upper frame part 77 with the first fastening part 117.

Reference numeral 147' is a sub-fastening part. The sub-fastening part 147' may be disposed at a location different from the second fastening part 147. In some implementations, the sub-fastening part 147' may be provided at either side of the cover body 141. The sub-fastening part 147' may be provided to be longer than the second fastening part 147. Accordingly, the sub-fastening part 147' may be assembled to the upper frame part 77 at a height different from the height of the second fastening part 147. As another example, the sub-fastening part 147' may be omitted.

Figure 60:
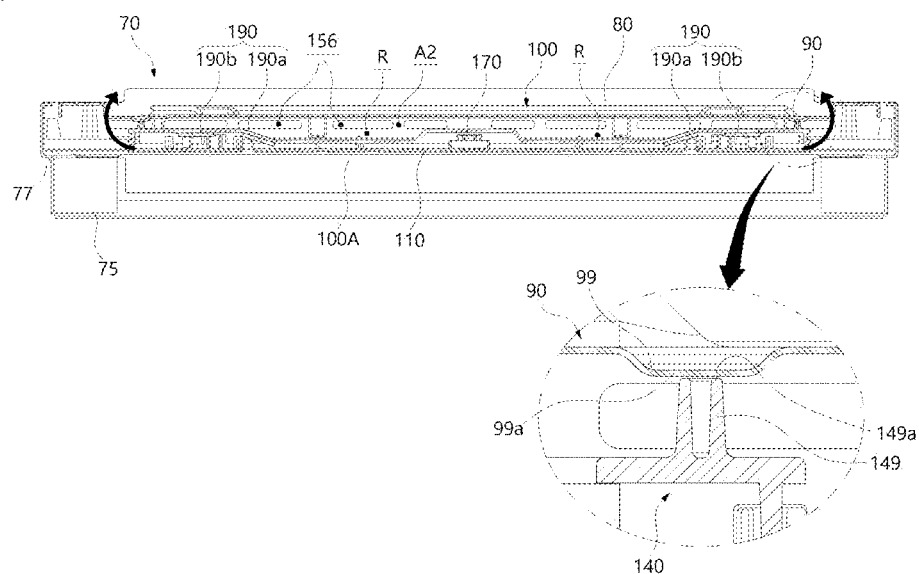
FIG. 60 is a sectional view taken along line LX-LX' of FIG. 15.

Referring to FIGS. 60 and 61, the second housing 140 may include the support protrusion 149. The support protrusion 149 may protrude on a surface of the second housing 140 toward the inner frame part 90. The support protrusion 149 may have roughly a cylindrical shape. The support protrusion 149 may be provided on either side portion of the second housing 140.

In some implementations, the support protrusion 149 protrudes on the first surface of the image acquisition module 100, and the second surface of the image acquisition module 100 provided opposite to the first surface may be in close contact with the surface of the second front panel G2a which is one of the plurality of panels. In other words, the support protrusion 149 may be understood to protrude opposite to the adhesive surface with the image acquisition module 100. Herein, the second surface of the image acquisition module 100 may adhere to the surface of the front panel G2a disposed at the foremost side of the plurality of panels. The adhesive surface is indicated as K1 and K2 in FIG. 11.

Herein, the first surface of the image acquisition module 100 may be located behind the second surface on the basis of the longitudinal direction in which the plurality of panels is disposed. In other words, the support protrusion 149 may be disposed behind of the adhesive surfaces (K1 and K2). The support protrusion 149 may serve to prevent deformation at a location away from the adhesive surfaces (K1 and K2).

The support protrusion 149 may be provided at a location facing the deformation prevention part 99 of the inner frame part 90. The support protrusion 149 and the deformation prevention part 99 may protrude in facing directions. In other words, the deformation prevention part 99 may protrude in a direction facing the protruding direction of the support protrusion 149. When the module housing 110, 140 is deformed due to conditions such as high temperature heat, etc., the support protrusion 149 may prevent excessive deformation of the module housing 110, 140 by being in contact with the deformation prevention part 99.

Figure 61A:
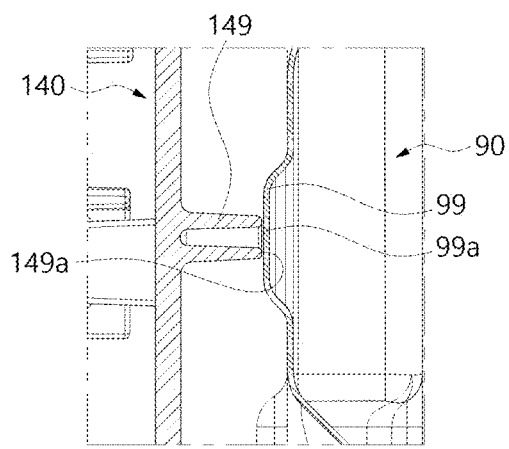
FIG. 61A is a cross-sectional view taken along line LXI-LXI' of FIG. 15, and FIGS. 61B and 61C are cross-sectional views each showing an example of the deformation prevention part.
Figure 61B:
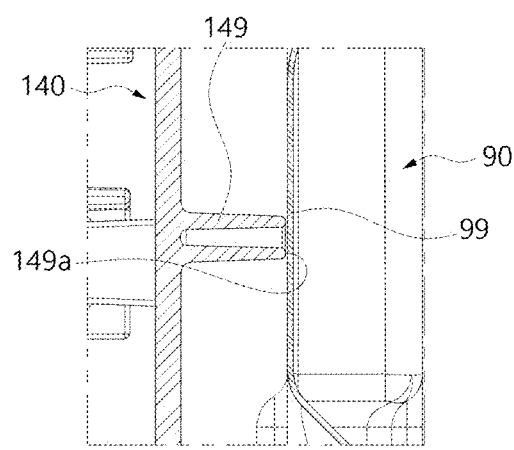
Figure 61C:
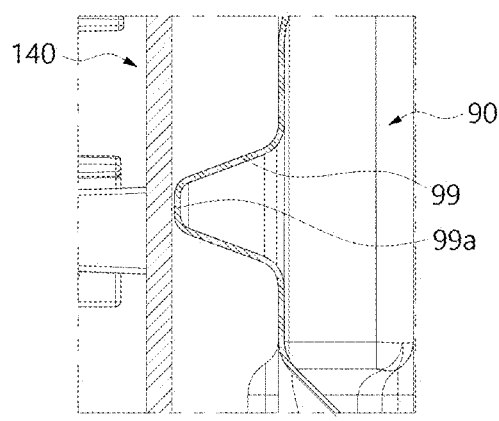

FIG. 61A illustrates the support protrusion 149 protruding longer than the deformation prevention part 99. Since the support protrusion 149 may be formed into an injection object, the form of the support protrusion 149 may be realized easier than the deformation prevention part 99. Therefore, when the support protrusion 149 is formed longer than the deformation prevention part 99, processing of the inner frame part 90 may relatively facilitate.

Herein, a sectional region of the deformation prevention part 99 may be wider than a sectional region of the support protrusion 149. Accordingly, even when the location of the support protrusion 149 is changed due to deformation of the image acquisition module 100, a terminal end portion 149a of the support protrusion 149 may be brought into contact with a surface 99a of the deformation prevention part 99, and the deformation prevention function may be stably implemented.

As shown in the enlarged view of FIG. 60 and FIG. 61A, the support protrusion 149 may protrude to a location spaced apart at a predetermined distance from the deformation prevention part 99. More specifically, a first supporting surface 99a of the deformation prevention part 99 may be spaced apart at a predetermined distance from a second supporting surface 149a of the support protrusion 149. As described above, the spacing is shortened as the module housing 110, 140 is deformed. Eventually, the first supporting surface 99a and the second supporting surface 149a are brought into contact with each other, thereby preventing the module housing 110, 140 from being no longer deformed.

Furthermore, when the first supporting surface 99a, i.e., a terminal end portion of the deformation prevention part 99, and the second supporting surface 149a of the support protrusion 149 are spaced apart from each other, vibrations usually generated in an operational process of the door may be reduced from being transmitted toward the image acquisition module 100.

As another example, referring to FIG. 61B, the image acquisition module 100 includes the support protrusion 149, and the deformation prevention part 99 may be omitted at the inner frame part 90. Herein, the length of the support protrusion 149 may be formed longer than the length of the support protrusion 149 of a previous implementation (referring to FIG. 61A). In addition, referring to FIG. 61C, the support protrusion 149 is omitted at the image acquisition module 100, and the inner frame part 90 may include the deformation prevention part 99. Herein, the length of the deformation prevention part 99 may be formed longer than the length of the deformation prevention part 99 of the previous implementation (referring to FIG. 61A). As another example, the inner frame part 90 may include the support protrusion 149, and the image acquisition module 100 may include the deformation prevention part 99.

Figure 62:
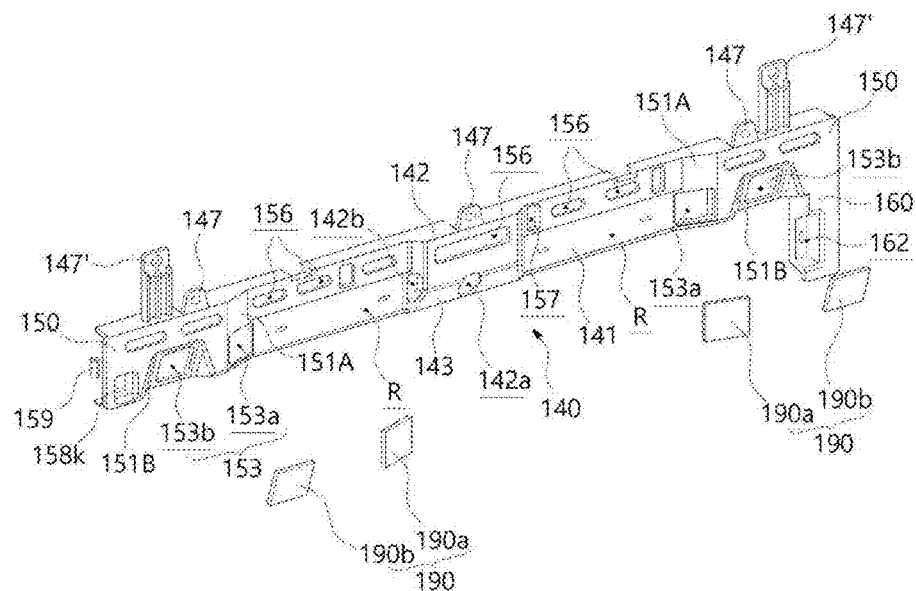
FIG. 62 is a perspective view illustrating an example of a cover plate exploded from FIG. 59.

Referring to FIG. 62, the cover body 141 may include each lighting cover 151. Each lighting cover 151 may cover the lighting parts to prevent the lighting parts from being exposed. Each lighting cover 151 may cover both the first lighting part 180a and the second lighting part 180b. In some examples, each lighting cover 151 may include the first lighting cover 151A covering the first lighting part 180a, and the second lighting cover 151B covering the second lighting part 180b.

A cover hole 153 may be open on each of the first lighting cover 151A and the second lighting cover 151B. The cover plate 190 may be disposed at the cover hole 153. In some implementations, the cover hole 153 may include the first cover hole 153a and the second cover hole 153b. The first cover plate 190a and the second cover plate 190b may be disposed at the first cover hole 153a and the second cover hole 153b respectively.

Figure 63:
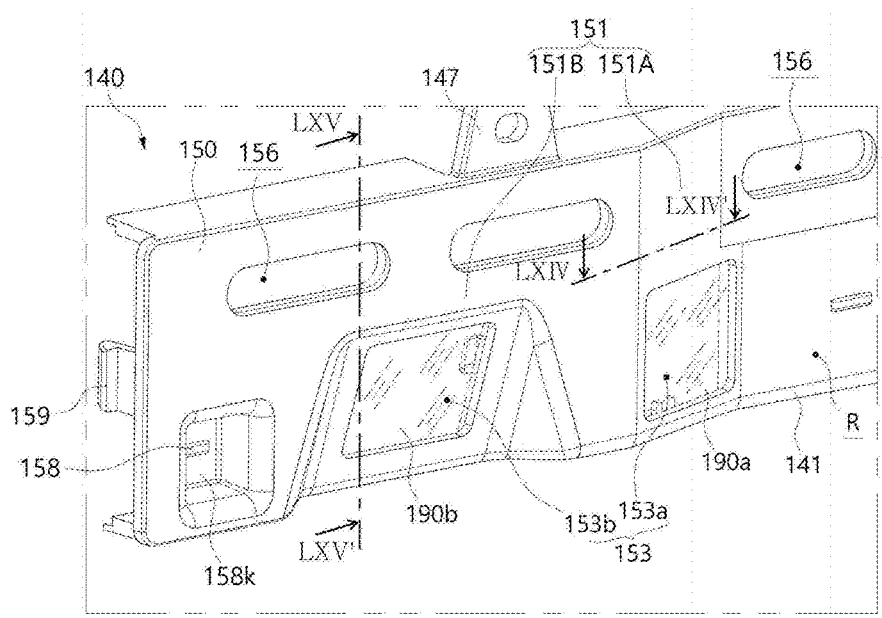
FIG. 63 is a perspective view enlarging and illustrating the structure of the second housing and the cover plate.

Referring to FIG. 63, the first lighting cover 151A may be provided at a boundary portion of the module flow path part R. The first lighting cover 151A may be provided in an inclined direction. More specifically, the first lighting cover 151A may not be formed in a direction facing the main body 10 of the home appliance in front thereof, but have a shape rotated at a predetermined angle on a shaft extending in the vertical direction (height direction, Z-axial direction of FIG. 1). In some implementations, the first lighting cover 151A may be turned toward the central portion of the lower storage space 41.

Figure 64:
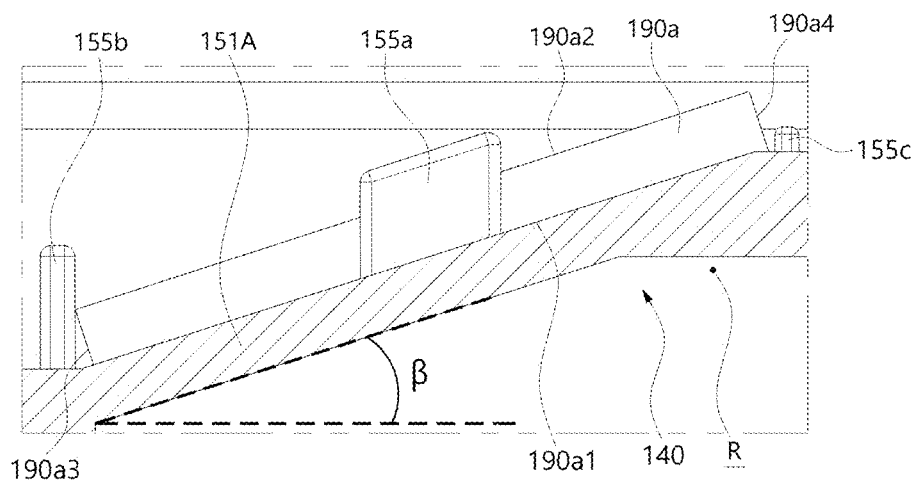
FIG. 64 is a sectional view taken along line LXIV-LXIV' of FIG. 63.

Referring to FIG. 64, the first lighting cover 151A is turned counterclockwise at an angle of β on a vertical line extending in the vertical direction (height direction, Z-axial direction of FIG. 1). Accordingly, the first cover plate 190a disposed at the first lighting cover 151A may also be turned counterclockwise at the angle of β on the vertical line. When the first cover plate 190a is disposed in the inclined direction, light of the first lighting part 180a emitted through the first cover plate 190a may be diffused in the inclined direction of the first cover plate 190a. In some implementations, the angle of β may be equal to the angle of α2 described above.

The second lighting cover 151B may be disposed to a location outside the first lighting cover 151A, i.e., closer to a terminal end portion of the cover body 141. The second lighting cover 151B may protrude toward the main body 10 of the home appliance more than the module flow path part R, with the first lighting cover 151A. Accordingly, the first lighting cover 151A and the second lighting cover 151B may form the bottleneck region BN in the second cooling flow path A2.

Referring to FIG. 63, the second lighting cover 151B may be formed to be inclined in a different direction from the first lighting cover 151A. More specifically, the second lighting cover 151B may not be formed in a direction facing the main body 10 of the home appliance in front thereof, but have a shape rotated at a predetermined angle on a shaft extending in the longitudinal direction of the second housing 140, i.e., the transverse direction (Y-axial direction of FIG. 1). In some implementations, the second lighting cover 151B may be turned toward the central portion of the lower storage space 41.

Figure 65:
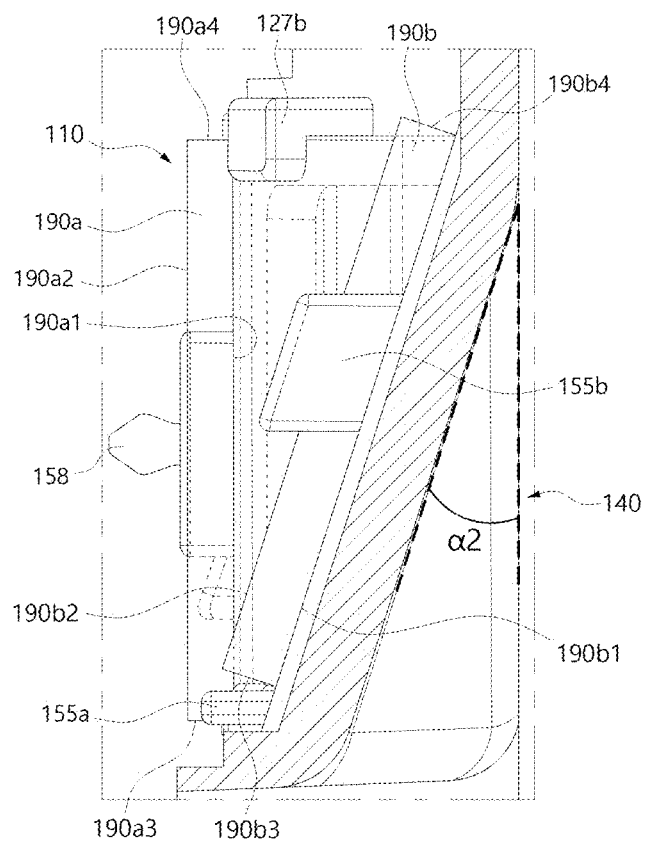
FIG. 65 is a sectional view taken along line LXV-LXV' of FIG. 63.

Referring to FIG. 65, the second lighting cover 151B is turned clockwise at the angle of α2 on a horizontal line extending in the transverse direction (Y-axial direction of FIG. 1). Accordingly, the second cover plate 190b disposed at the second lighting cover 151B may also be turned counterclockwise at the angle of α2 on the horizontal line. When the second cover plate 190b is disposed in the inclined direction, light of the second lighting part 180b emitted through the second cover plate 190b may be diffused in the inclined direction of the second cover plate 190b.

Figure 66:
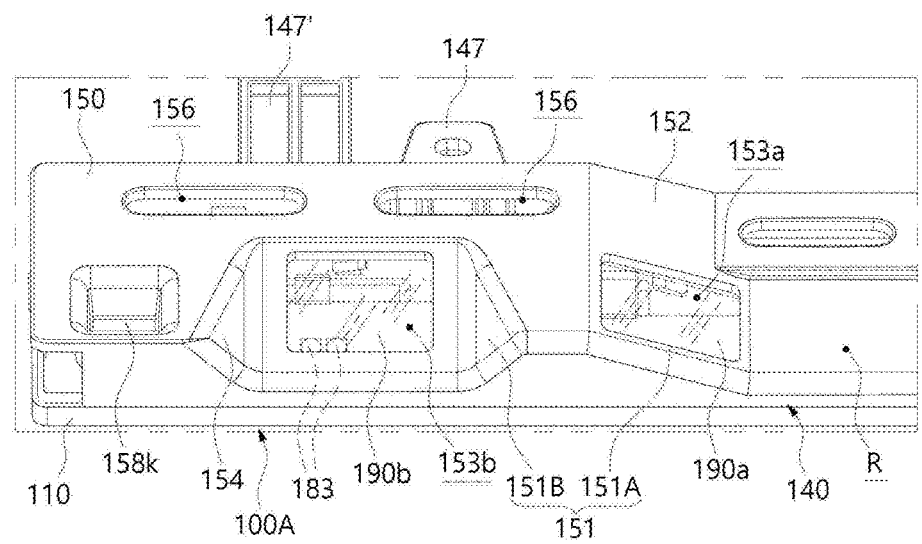
FIG. 66 is a perspective view enlarging and illustrating the structure of the second housing and the cover plate at a different angle from FIG. 63.

Referring to FIG. 66, the second lighting cover 151B may include a lighting guide surface 154. The lighting guide surface 154 may be formed into an inclined surface structure at either side of the second cover hole 153b with the second cover hole 153b, to which the second cover plate 190b is mounted, as the center. The lighting guide surface 154 may guide a direction in which the light emitted from the second lighting part 180b is diffused. To efficiently diffuse and reflect light, the lighting guide surface 154 may include a reflective coating part.

Figure 67:
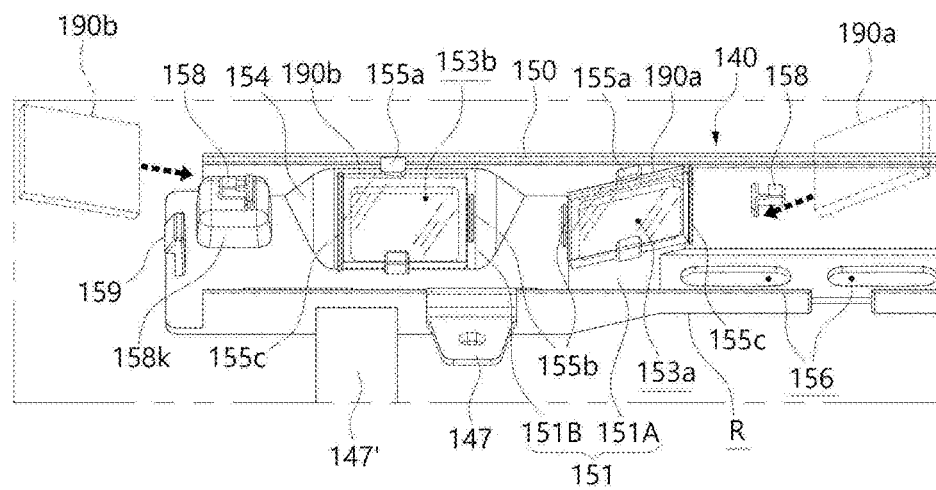
FIG. 67 is a concept view illustrating the cover plate coupled to the second housing.
Figure 68:
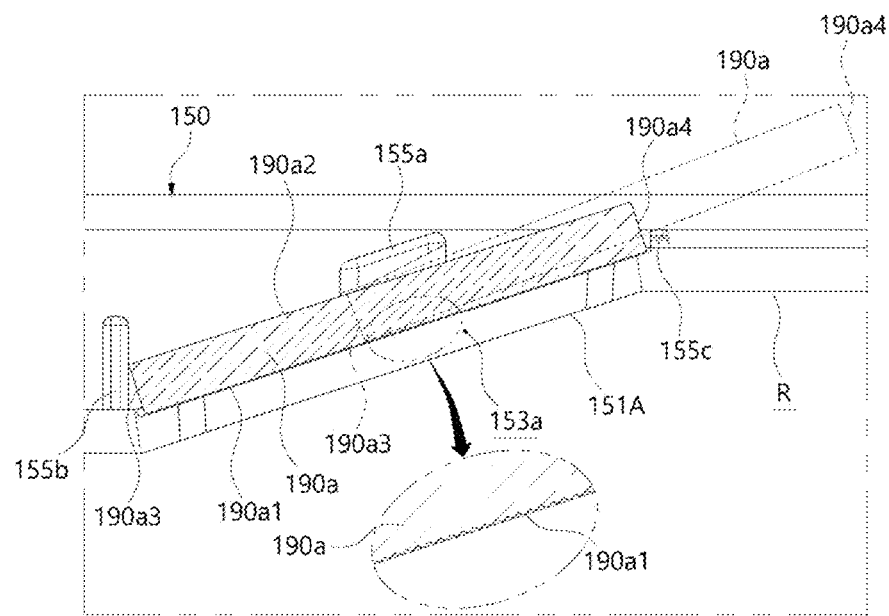
FIG. 68 is a concept view expressed in a sectional form, the view illustrating the cover plate coupled to the second housing.

FIGS. 67 and 68 illustrate a structure in which the cover plate 190 is mounted to each lighting cover 151. For reference, the mounting structures of the first lighting cover 151A and the second lighting cover 151B to the cover plate 190 are similar, so the same reference numeral is assigned. FIG. 67 illustrates the cover body 141 from above the cover body 141.

For convenience, describing the structure of the cover plate 190 first, a first surface 190a1 of the cover plate 190 may face forward, i.e., toward the storage space 31, 41, and a second surface 190a2 opposite to the first surface 190a1 may face rearward, i.e., toward the second front panel G2a. Furthermore, in both end portions of the cover plate 190, a first end portion 190a3 may be a front portion when the cover plate 190 is mounted to each lighting cover 151, and a second end portion 190a4 may be a rear portion when the cover plate 190 is mounted to each lighting cover 151.

Based on the first lighting cover 151A, the first lighting cover 151A may include cover holding parts 155a holding both side surface portions of the first cover plate 190a. A pair of cover holding parts 155a facing each other may hold opposite portions of the first cover plate 190a, respectively. Each of the cover holding parts 155a may have roughly a "]"-shaped section. Accordingly, the cover holding parts 155a may support the two different surfaces of the first cover plate 190a. In some implementations, the cover holding parts 155a may support the upper surface and the side surfaces of the first cover plate 190a, thereby guiding sliding of the first cover plate 190a.

Furthermore, a cover stopper 155b may be provided at the first end portion 190a3 of the first cover plate 190a without the support of the pair of cover holding parts 155a. The cover stopper 155b is a portion by which the first end portion 190a3 is caught when the first cover plate 190a is inserted deepest.

Furthermore, a temporary assembly step 155c may be provided at the second end portion 190a4 of the first cover plate 190a without the pair of the cover holding parts 155a and the cover stopper 155b. The temporary assembly step 155c may be disposed at an entrance where the first cover plate 190a is mounted to the first lighting cover 151A. Since the protruding height of the temporary assembly step 155c is low, the first end portion 190a3 of the first cover plate 190a may be moved over the temporary assembly step 155c to be mounted to the first lighting cover 151A.

In FIGS. 67 and 68, the first cover plate 190a and the second cover plate 190b expressed with the dotted lines indicate a pre-mounted state thereof. In the arrow directions of FIG. 67, the first cover plate 190a and the second cover plate 190b may be mounted to the first lighting cover 151A and the second lighting cover 151B respectively.

Herein, since the protruding height of the temporary assembly step 155c is low, it is apprehended that the second end portion 190a4 of the first cover plate 190a is moved back over the temporary assembly step 155c to be separated. To prevent the separation, as described above, the first housing 110 may include the first cover supporting arm 126a. Referring to FIG. 69, the first cover supporting arm 126a supports one end portion of the first cover plate 190a, i.e., the second end portion 190a4. The first cover supporting arm 126a may supplement the holding function of the temporary assembly step 155c. In some implementations, the temporary assembly step 155c may have a protruding height lower than the cover holding parts 155a.

A length between both end portions of the first cover plate 190a, i.e., the first end portion 190a3 and the second end portion 190a4, may be shorter than a distance between the cover holding part 155a and the temporary assembly step 155c. Accordingly, the first cover plate 190a may be easily mounted between the cover holding part 155a and the temporary assembly step 155c.

A second end portion 190b4 of the second cover plate 190b illustrated on the left side of FIG. 69 may be caught by the second cover supporting arm 126b and fixed. The second cover supporting arm 126b may catch the second end portion 190b4 of the second cover plate 190b, thereby supplementing the holding function of the temporary assembly step 155c. The second cover supporting arm 126b may protrude on the first housing 110 toward the second lighting cover 151B.

Eventually, when the first housing 110 is assembled with the second housing 140, the first housing 110 may supplement the second housing 140 to implement the mounting structure of the first cover plate 190a and the second cover plate 190b. Accordingly, in some implementations, the installation convenience of the first cover plate 190a and the second cover plate 190b is improved, and the separation of the first cover plate 190a and the second cover plate 190b can be efficiently prevented.

Since the first cover plate 190a and the second cover plate 190b transmit light, the first cover plate 190a and the second cover plate 190b may be made of transparent or translucent materials. In some implementations, the first cover plate 190a and the second cover plate 190b may be made of translucent materials or may be made of completely transparent materials such as glass.

In the first cover plate 190a and the second cover plate 190b, one surface may have different surface roughness from the other surface. Based on the first cover plate 190a, a first surface of the first cover plate 190a may have higher surface roughness than a second surface. In some implementations, in the first cover plate 190a, the surface roughness of the first surface of the first cover plate 190a facing the second storage space 41 may be higher than the surface roughness of the second surface of the first cover plate 190a facing the front side of the door 50, 70. Then, the first cover plate 190a may induce irregular reflection of light emitted from the first lighting part 180a, so the first lighting part 180a may emit light uniformly to the wider region in the second storage space 41. As with the first cover plate 190a, in the second cover plate 190b, the surface roughness of a first surface of the second cover plate 190b facing the second storage space 41 may be formed higher than the surface roughness of a second surface of the second cover plate 190b facing the front side of the door 50, 70.

FIG. 68 illustrates a section of the first cover plate 190a. As described above, the first surface 190a1 of the first cover plate 190a faces the lower side based on the drawing, and a second surface 190a2 opposite to the first surface faces the upper side. At this point, based on the drawing, the lower side may be a direction toward the storage space 31, 41 (not illustrated in FIG. 68), and the upper side may be a direction toward the second front panel G2a (not illustrated in FIG. 68).

At this point, the first surface 190a1 of the first cover plate 190a may include a plurality of protrusion structures. More specifically, the first surface 190a1 may be a rough surface formed by a repeated fine concave-convex structure. Describing the enlarged portion in FIG. 68, the first surface 190a1 of the first cover plate 190a may be formed in the concave-convex structure. Accordingly, surface roughness of the first surface 190a1 of the first cover plate 190a may increase. Thereafter, the first surface 190a1 of the first cover plate 190a may induce irregular reflection of light emitted from the first lighting parts 180a, and may prevent light from the first lighting parts 180a from emitting light locally to the storage space 31, 41.

Otherwise, the second surface 190a2 of the first cover plate 190a may have a smooth surface unlike the first surface 190a1. Accordingly, when light emitted from the first lighting parts 180a passes through the second surface 190a2, irregular reflection may be prevented. In addition, when light emitted from the first lighting parts 180a arrives at the first surface 190a1, the light may be irregularly reflected and be uniformly diffused to a wider region in the storage space 31, 41. As another example, the second surface 190a2 of the first cover plate 190a has also a fine concave-convex structure like the first surface 190a1 of the first cover plate 190a, and surface roughness thereof may be formed less than the first surface 190a1.

In some implementations, referring to FIG. 62 again, the second housing 140 may include a plurality of heat dissipation holes 156. The plurality of heat dissipation holes 156 may be formed by penetrating the second housing 140 in the longitudinal direction. The plurality of heat dissipation holes 156 may be formed at a location higher than the central portion of the second housing 140 in a height direction of the second housing 140. Accordingly, air with increased temperature in the mounting space between the first housing 110 and the second housing 140 may flow upward and then be discharged outward through the heat dissipation holes 156.

The plurality of heat dissipation holes 156 may be formed in a long hole. Based on FIG. 62, the plurality of heat dissipation holes 156 may be formed long in the transverse direction. The heat dissipation holes 156 may be provided not only in the sensor cover 142, each lighting cover 151, but also the cover body 141 corresponding to the upper portion of the module flow path part R. In some implementations, the heat dissipation holes 156 formed in the sensor cover 142 may be formed to be larger than the heat dissipation holes 156 formed in each lighting cover 151 or the upper portion of the module flow path part R.

As shown in FIG. 62, the second housing 140 may include a close contact portion 158k, 162. The close contact portion 158k, 162 may be a portion protruding on the second housing 140 toward the first housing 110. Accordingly, when viewed from the front side of the second housing 140, the close contact portion 158k, 162 may be expressed in a recessed shape. The close contact portion 158k, 162 may reduce a distance between the second housing 140 and the first housing 110. In some implementations, the close contact portion 158k, 162 may be provided at each of the lighting mounting part 151B and the second connection body 160. Since the lighting mounting part 151B and the second connection body 160 may be portions protruding on the second housing 140 toward the lower storage space 41, a distance of each of the lighting mounting part 151B and the second connection body 160 against the first housing 110 and. In some examples, the close contact portion 158k, 162 may be provided.

The contact portion 158k among the close contact portions 158k, 162 may include the fastening protrusion 158 (referring to FIG. 59). Furthermore, the contact portion 162 among the close contact portions 158k and 162 may include the fastening arm 159 (referring to FIG. 59). The close contact portions 158k, 162 may reduce a distance between each of the fastening protrusion 158 and the fastening arm 159 toward the surface of the first housing 110.

Figure 71:
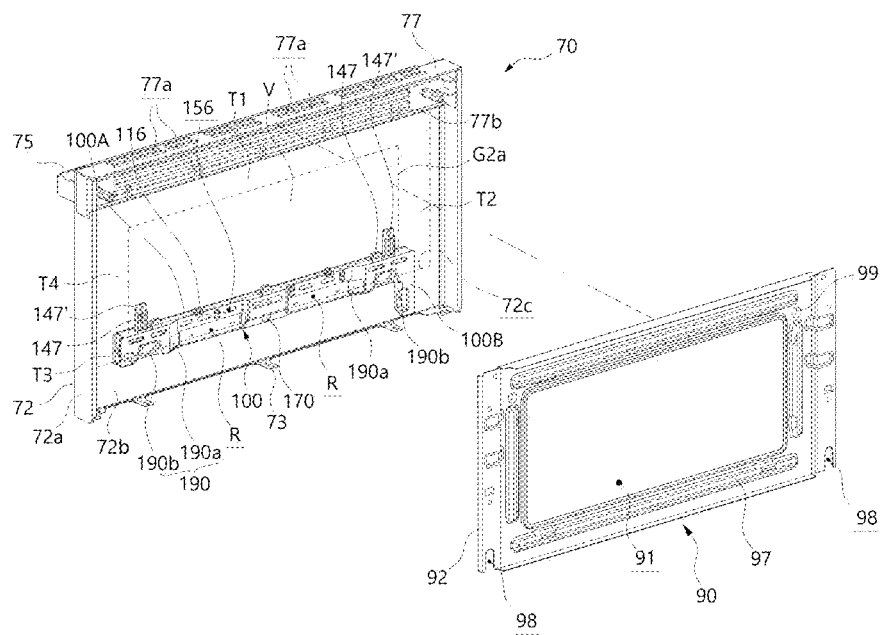
FIGS. 71-79 are perspective views illustrating examples of the image acquisition module.

FIG. 71 illustrates an example of the present disclosure. As shown in the drawing, the image acquisition module 100 may be disposed in the third installation region T3 corresponding to the lower portion among the installation region T1 to T4. In this case, the connector module 200 is omitted, and the fabricator may directly approach the connection unit 100B to maintain the image acquisition module 100.

Figure 72:
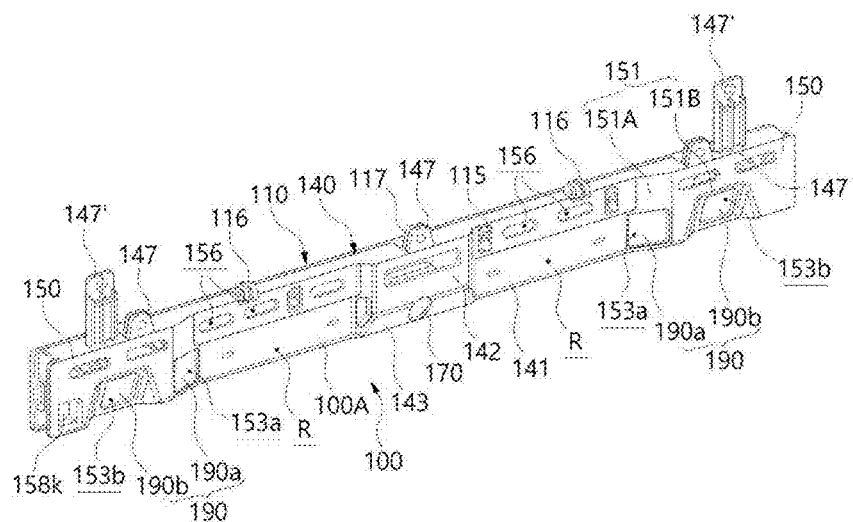

FIG. 72 illustrates an example of the present disclosure. In some examples, the image acquisition module 100 may not include the connection unit 100B but may include only the main unit 100A. The connection unit 100B may be integrated with the main unit 100A, or the connector module 200 may perform the function of the connection unit 100B.

In some implementations, although not shown in the drawing, the image sensing device 170 and the lighting device 180 may be disposed in different regions among the installation regions T1 to T4. For example, the image sensing device 170 may be disposed in the first installation region T1, T3, and the lighting device 180 may be disposed in the second installation region T2, T4.

FIG. 73 illustrates an example of the image acquisition module 100. For convenience, the structure equal to the above-described implementation is assigned with the same reference numeral and a detailed description thereof will be omitted. Describing the structure of the image acquisition module 100, the image sensing device 170 and the lighting device 180 may be disposed in the installation region T1 to T4 while being separated from each other. As shown in the drawing, the image sensing device 170 is disposed in the central portion, and the pair of lighting devices 180 may be disposed either side of the image sensing device 170. For reference, in the drawing, the lighting device 180 is disposed in the housing not to be exposed, and only the cover plate 190 is exposed.

In some examples, the main unit 100A1, 100A2 constituting the image acquisition module 100 may include a plurality of housing parts separated from each other. Specifically, the main unit 100A1, 100A2 constituting the image acquisition module 100 may include the capturing unit 100A1 and the lighting unit 100A2 separated from each other. The image acquisition module 100 may include the capturing unit 100A1 in which the image sensing device 170 is disposed, and the lighting unit 100A2 in which the lighting device 180 is disposed. The capturing unit 100A1 and the lighting unit 100A2 may have independent housings and may be disposed to be spaced apart from each other.

In some implementations, a flow path expansion part EP1, i.e., an empty space may be formed between the capturing unit 100A1 and the lighting unit 100A2. The flow path expansion part EP1 may expand the width of the air circulation path BN, EP formed between the second front panel G2a and the second inner panel G2c, thereby facilitating the circulation of air. The flow path expansion part EP1 may be formed between the capturing unit 100A1 and the pair of the lighting units 100A2 disposed at either side of the capturing unit 100A1.

Although not described in detail, as described above, the capturing unit 100A1 may include the two housings, i.e., the first housing and the second housing. Furthermore, the image sensor mounting part and the lighting mounting part of the first housing may be separated from each other. Furthermore, the sensor cover and the lighting cover of the second housing may also be separated from each other.

Herein, FIG. 73 illustrates the capturing unit 100A1 and the lighting unit 100A2 disposed in the same installation region, i.e., the first installation region T1. As another example, the capturing unit 100A1 and the lighting unit 100A2 may be disposed in different installation regions.

Figure 74:
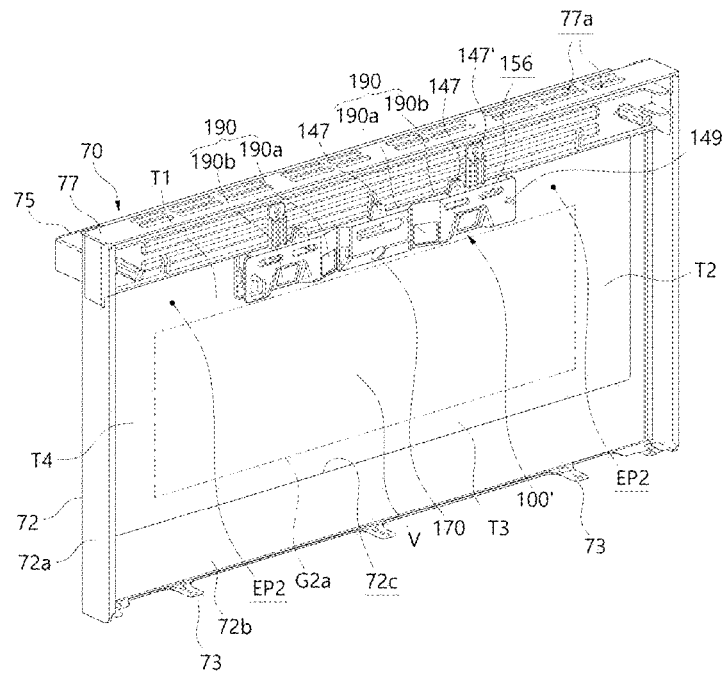

FIG. 74 illustrates an example of the image acquisition module. For convenience, the structure equal to the above-described implementation is assigned with the same reference numeral and a detailed description thereof will be omitted. As shown in the drawing, the image acquisition module 100' may include the image sensing device 170 and the lighting device 180. Herein, the module flow path part R (referring to FIG. 26) may be omitted between the image sensing device 170 and the lighting device 180, and the image sensing device 170 and the lighting device 180 may be provided to be in contact with each other. For reference, in FIG. 74, since the lighting device 180 is embedded in the image acquisition module 100', only the cover plate 190 covering the lighting device 180 may be illustrated.

A part of the installation region T1 is occupied by the image acquisition module 100, and the remaining empty space of the installation region T1 may include an air circulation path connected to the second cooling flow path A2, i.e., a flowing space. In some implementations, the air circulation path may be the flow path expansion part EP2 provided between the image acquisition module 100' and each of left and right end portions of the installation regions T1. In other words, the flow path expansion part EP2 formed in an empty space at either side of the image acquisition module 100' may be the air circulation path. As described above, in some implementations, the flow path expansion part EP2 may be secured wide, so air may be smoothly circulated.

Figure 75:
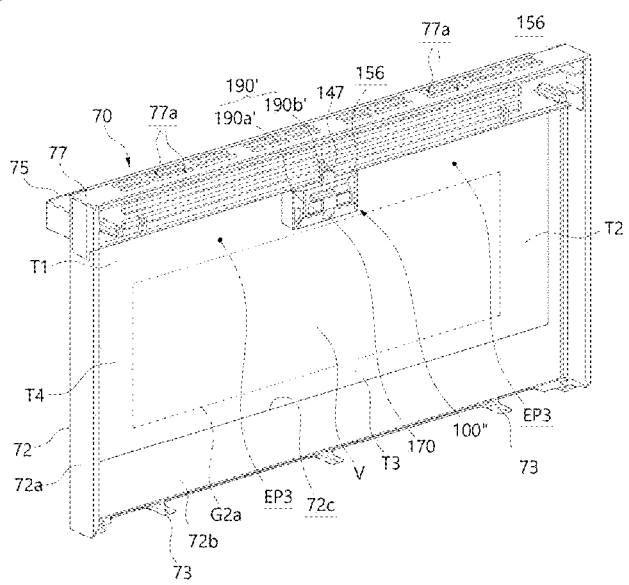

FIG. 75 illustrates an example of the image acquisition module. For convenience, the structure equal to the above-described implementation is assigned with the same reference numeral and a detailed description thereof will be omitted. As shown in the drawing, the image sensing device 170 and the lighting device 180 constituting the image acquisition module 100" may be embedded in one housing together. In some implementations, the image sensing device 170 may be provided in the image acquisition module 100" at a different height from the lighting device 180. For reference, in FIG. 75, since the lighting device 180 is embedded in the image acquisition module 100', only the cover plate 190 covering the lighting device 180 may be illustrated.

The lighting device 180 may be disposed at the upper portion of the image sensing device 170. The lighting device 180 may include the pair of lighting devices 180. FIG. 75 illustrates the pair of cover plates 190a' and 190b' covering the pair of lighting devices 180.

A part of the installation region T1 may be occupied with the image acquisition module 100", and the remaining space of the installation region T1 may be formed into an air circulation path connected to the second cooling flow path A2, i.e., the flow space. In some implementations, the air circulation path may be a flow path expansion part EP3 provided between the image acquisition module 100' and each of left and right end portions of the installation regions T1.

Accordingly, the flow path expansion part EP3, i.e., an empty space, may be secured wide at either side of the image acquisition module 100". The flow path expansion part EP3 constituting the air circulation path may be secured between the image acquisition module 100" and each of the left and right end portions of the installation regions T1. As described above, in some implementations, the flow path expansion part EP3 may be secured wide, so air may be smoothly circulated.

Figure 76:
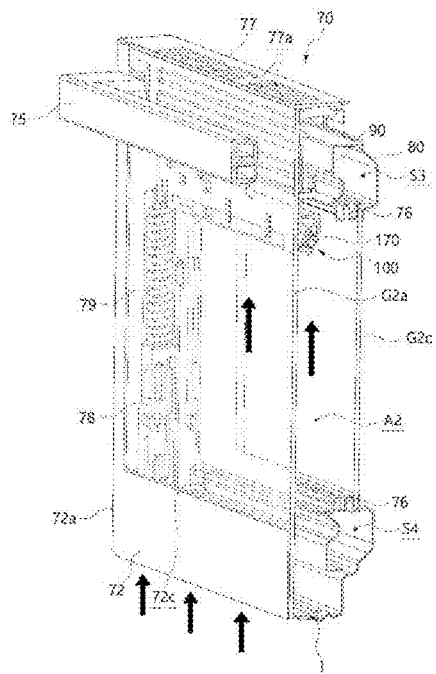

FIG. 76 illustrates an example of the image acquisition module. For convenience, the structure equal to the above-described implementation is assigned with the same reference numeral and a detailed description thereof will be omitted. As described above, the lower door panel may include the two panels G2a and G2c. The image acquisition module 100 may be disposed between the two panels G2a and G2c. A gap between the two panels G2a and G2c may be in a vacuum. When the gap between the two panels G2a and G2c is in a vacuum, the two panels G2a and G2c may perform an insulation function blocking heat of the lower storage space.

The image acquisition module 100 may be disposed on a surface of one of the two panels G2a and G2c. FIG. 76 illustrates the image acquisition module 100 disposed on the second front panel G2a of the two panels G2a and G2c. In some implementations, the image acquisition module 100 may be disposed on the second front panel G2a where the influence of heat of the lower storage space is small.

Figure 77:
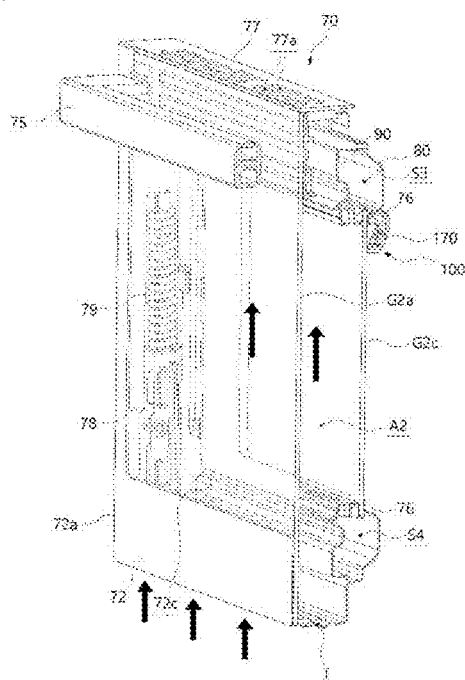

FIG. 77 illustrates an example of the image acquisition module. For convenience, the structure equal to the above-described implementation is assigned with the same reference numeral and a detailed description thereof will be omitted. As described above, a lower door panel may include a plurality of panels G2a and G2c. The image acquisition module 100 may be disposed on a surface of one of the plurality of panels G2a and G2c. The image acquisition module 100 may be disposed on a surface of the rear panel G2c of the plurality of panels G2a and G2c which is closer to the lower storage space.

The installation region where the image acquisition module 100 is disposed may not be the cooling flow path A2 between the two panels G2a and G2c, but may be a part outside the cooling flow path A2. As shown in FIG. 77, the image acquisition module 100 may be disposed between the surface of the rear panel G2c and the rear frame part 80 constituting the door frame. As another example, the image acquisition module 100 may be separated from the rear panel G2c and may be disposed on the surface of the rear frame part 80.

Figure 78:
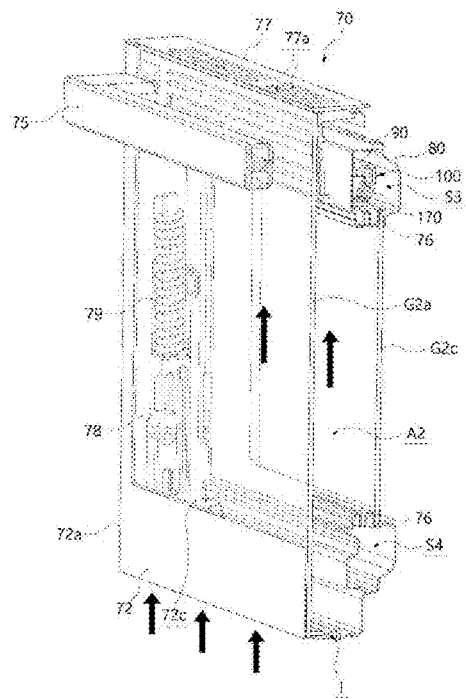

FIG. 78 illustrates an example of the image acquisition module. For convenience, the structure equal to the above-described implementation is assigned with the same reference numeral and a detailed description thereof will be omitted. As described above, a lower door panel may include a plurality of panels G2a and G2c. A door frame may be disposed on edge parts of the plurality of panels G2a and G2c. The door frame may include a plurality of parts 80 and 90. An insulation space S3, S4 may be formed between the plurality of frame parts 80 and 90.

The image acquisition module 100 may be disposed in the insulation space S3, S4 in the door frame. As shown in FIG. 78, the image acquisition module 100 may be disposed in the insulation space S3 formed by the rear frame part 80 and the inner frame part 90.

Figure 79:
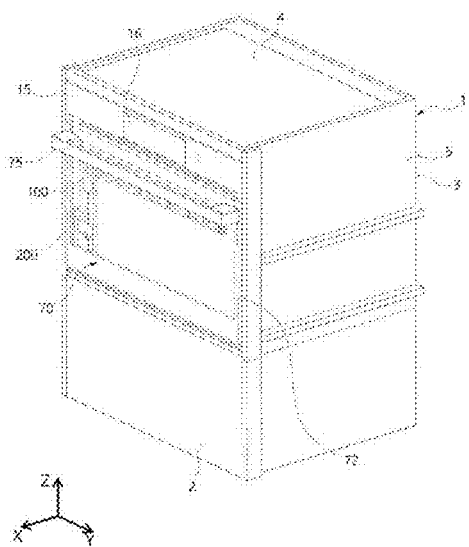

In some implementations, FIG. 79 illustrates an example of an image acquisition module. As shown in the drawing, the home appliance may be a built-in type of home appliance. For example, the home appliance may be a cooking appliance installed in a built-in manner. As shown in the drawing, the cooking appliance of the implementation may be installed in kitchen furniture 1, etc., and the front surface of the cooking appliance may only be exposed forward. A lower portion, a rear surface 3, an upper surface 4, and a side surface 5 of the kitchen furniture 1 may shield portions of the home appliance excluding an operation part or the upper panel 15, a display or the operating part 16, a door 70, etc. that are disposed on the front surface of the home appliance.

The window may be omitted in the door 70. The door 70 does not expose the inside space of the cooking appliance, and the inside space of the cooking appliance may be checked only by the image acquisition module 100. Since the image acquisition module 100 may not be exposed forward of the cooking appliance through the window, the image acquisition module 100 may be disposed in a central region in the door 70.

Although some implementations of the present disclosure have been described for illustrative purposes, those skilled in the art will appreciate that various modifications, additions and substitutions are possible, without departing from the scope and spirit of the present disclosure as disclosed in the accompanying claims. Therefore, the implementations described above have been described for illustrative purposes, and should not be intended to limit the technical spirit of the present disclosure, and the scope and spirit of the present disclosure are not limited to the implementations. The protective scope of the present disclosure should be interpreted by the accompanying claims, and all technical spirits within the equivalent scope should be interpreted as being included in the scope and spirit of the present disclosure.

What is claimed is:

1. A door for an appliance, the door comprising:
   a door body configured to be disposed at a front of a storage space of the appliance; and
   a lighting device disposed in the door body,
   wherein the lighting device comprises:
      a lighting housing that defines an installation space therein,
      a light source disposed in the installation space and configured to emit light toward the storage space, and
      a cover plate disposed in the lighting housing and configured to transmit the light from the light source,
   wherein the lighting device comprises a plurality of lighting parts that are configured to be disposed at a same height in the door based on the door being closed, and
   wherein the cover plate is one of a plurality of cover plates that are disposed at the plurality of lighting parts, respectively, the plurality of cover plates being directed in a plurality of directions that are different from one another.

2. The door of claim 1, wherein the lighting housing comprises:
a first housing that accommodates the light source; and
a second housing coupled to the first housing,
wherein the cover plate is disposed at the second housing, and
wherein the first housing and the second housing comprise a cover supporting arm and a cover stopper, respectively, that protrude toward each other and support opposite end portions of the cover plate.

3. The door of claim 2, wherein the cover stopper supports a first end portion of the cover plate,
wherein the cover supporting arm supports a second end portion of the cover plate disposed opposite to the first end portion, and
wherein the cover supporting arm protrudes from a surface of the first housing toward a surface of the second housing.

4. The door of claim 2, wherein the second housing comprises a pair of cover holding parts that support opposite side surfaces of the cover plate.

5. The door of claim 4, wherein the pair of cover holding parts support two different surfaces of the cover plate.

6. The door of claim 4, wherein the cover plate is configured to slide between the pair of cover holding parts and is coupled to the pair of cover holding parts.

7. The door of claim 3, wherein the second housing comprises an assembly step that protrudes from the surface of the second housing and is configured to support the second end portion of the cover plate, and
wherein a protruding length of the assembly step from the surface of the second housing is less than a protruding length of the cover stopper from the surface of the second housing.

8. The door of claim 7, wherein the cover supporting arm is disposed at a position farther from the second end portion of the cover plate than the assembly step.

9. The door of claim 7, wherein the second housing further comprises a pair of cover holding parts that support opposite side surfaces of the cover plate, and
wherein the first end portion of the cover plate passes through the assembly step and is configured to slide between the pair of cover holding parts and be supported by the cover stopper.

10. The door of claim 7, wherein a distance between the first end portion and the second end portion of the cover plate is less than a distance between the cover stopper and the assembly step.

11. The door of claim 2, wherein the lighting device further comprises a lighting substrate that supports the light source, and
wherein the first housing comprises a lighting mounting part that supports the lighting device, the lighting mounting part comprising:
a lighting holding hook configured to lock and fix an end of the lighting substrate, and
a lighting angle adjusting part that supports the lighting substrate in an inclined direction with respect to a front surface of the door body.

12. The door of claim 1, wherein the plurality of lighting parts are configured to emit light in the plurality of directions that are different from one another.

13. The door of claim 1, wherein the plurality of cover plates comprise:

a first cover plate that is inclined in a first direction with respect to a front surface of the door body, the first cover plate being rotated by a first predetermined angle about a vertical axis extending in a height direction of the door body; and
a second cover plate that is inclined in a second direction with respect to the front surface of the door body, the second cover plate being rotated by a second predetermined angle about a longitudinal axis that is transverse to the vertical axis and passes through the lighting device.

14. The door of claim 1, wherein the lighting device further comprises:
an image sensing device disposed between the plurality of lighting parts and configured to capture an image of the storage space.

15. The door of claim 2, wherein the cover plate is disposed in the installation space, and
wherein the lighting housing defines a cover hole that exposes a part of the cover plate to an outside of the installation space.

16. The door of claim 1, wherein the cover plate has:
a first surface that faces an outside of the lighting housing, the first surface having a first roughness; and
a second surface that is located opposite to the first surface and faces the light source, the second surface having a second roughness different from the first roughness.

17. The door of claim 16, wherein the first roughness of the first surface is greater than the second roughness of the second surface.

18. The door of claim 1, wherein the door body comprises:
a door frame; and
a door panel coupled to the door frame, the door panel comprising a plurality of panels, and
wherein the lighting device is disposed between the plurality of panels.

19. An appliance comprising:
a cabinet that defines a storage space therein;
a door connected to the cabinet and configured to open and close the storage space; and
a lighting device disposed in the door,
wherein the lighting device comprises:
a lighting housing that defines an installation space therein,
a light source disposed in the installation space and configured to emit light toward the storage space, and
a cover plate disposed in the lighting housing and configured to transmit the light from the light source,
wherein the lighting device comprises a plurality of lighting parts that are configured to be disposed at a same height in the door based on the door being closed, and
wherein the cover plate is one of a plurality of cover plates that are disposed at the plurality of lighting parts, respectively, the plurality of cover plates being directed in a plurality of directions that are different from one another.

20. A door for an appliance, the door comprising:
a door body configured to be disposed at a front of a storage space of the appliance; and
a lighting device disposed in the door body,
wherein the lighting device comprises:
a lighting housing that defines an installation space therein, a light source disposed in the installation space and configured to emit light toward the storage space, and a cover plate disposed in the lighting housing and configured to transmit the light from the light source, wherein the cover plate has:

a first surface that faces an outside of the lighting housing, the first surface having a first roughness, and a second surface that is located opposite to the first surface and faces the light source, the second surface having a second roughness different from the first roughness, and wherein the first roughness of the first surface is greater than the second roughness of the second surface.

* * * * *